US011497160B2

(12) United States Patent
Wataya et al.

(10) Patent No.: US 11,497,160 B2
(45) Date of Patent: Nov. 15, 2022

(54) WORKING MACHINE

(71) Applicant: KUBOTA CORPORATION, Osaka (JP)

(72) Inventors: Ryo Wataya, Osaka (JP); Tsuyoshi Gono, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 105 days.

(21) Appl. No.: 16/437,977

(22) Filed: Jun. 11, 2019

(65) Prior Publication Data

US 2019/0373805 A1 Dec. 12, 2019

(30) Foreign Application Priority Data

Jun. 12, 2018 (JP) ............................ JP2018-112254
Jun. 12, 2018 (JP) ............................ JP2018-112257
Jun. 12, 2018 (JP) ............................ JP2018-112259

(51) Int. Cl.

*A01D 34/00* (2006.01)
*G06F 3/04812* (2022.01)
*G06F 3/04847* (2022.01)
*B60K 35/00* (2006.01)

(52) U.S. Cl.

CPC ............ *A01D 34/006* (2013.01); *B60K 35/00* (2013.01); *G06F 3/04812* (2013.01); *G06F 3/04847* (2013.01); *B60K 2370/115* (2019.05); *B60K 2370/52* (2019.05)

(58) Field of Classification Search

None
See application file for complete search history.

(56) References Cited

U.S. PATENT DOCUMENTS 6,661,437 B1 * 12/2003 Miller .................... H04N 21/47 715/810
10,088,035 B2 * 10/2018 Park ...................... F16H 59/044
(Continued)

FOREIGN PATENT DOCUMENTS

EP 3214229 A1 9/2017
JP 09009716 1/1997
JP 2005-080550 A 3/2005
(Continued)

OTHER PUBLICATIONS

Official Communication issued in European Patent Office (EPO) Patent Application No. 19179542.6, dated Dec. 2, 2019.
(Continued)

*Primary Examiner* — Stella Higgs
(74) *Attorney, Agent, or Firm* — Greenblum & Bernstein, P.L.C.

(57) ABSTRACT

A display device for a working machine, includes: a plurality of candidate boxes in which candidate setting information to be set to the working machine is represented, the candidate boxes being displayed on a screen; and a contents display portion in which a setting item relating to the working machine is displayed. The display device includes a display control portion to move a display box to a position corresponding to the contents display portion in performing the setting to the working machine, the display box being one of the plurality of candidate boxes in which candidate setting information corresponding to the setting is displayed.

11 Claims, 52 Drawing Sheets

(56) References Cited

U.S. PATENT DOCUMENTS

| | | | | |
|---|---|---|---|---|
| 2016/0029549 A1* | 2/2016 | Dammen | ................ | A01C 1/00 47/57.6 |
| 2018/0143733 A1* | 5/2018 | Ochenas | .............. | B66F 9/0759 |

FOREIGN PATENT DOCUMENTS

| | | | |
|---|---|---|---|
| JP | 2010004847 | A | 1/2010 |
| JP | 2014-157523 | | 8/2014 |
| JP | 2015-118482 | A | 6/2015 |
| JP | 2016034237 | | 3/2016 |
| JP | 2016-084694 | A | 5/2016 |
| JP | 2017-149392 | A | 8/2017 |
| WO | 2016/063803 | A1 | 4/2016 |

OTHER PUBLICATIONS

Office Action issued in Corresponding European Patent Application No. 19179542.6, dated Aug. 4, 2022.

* cited by examiner

FIG.8A
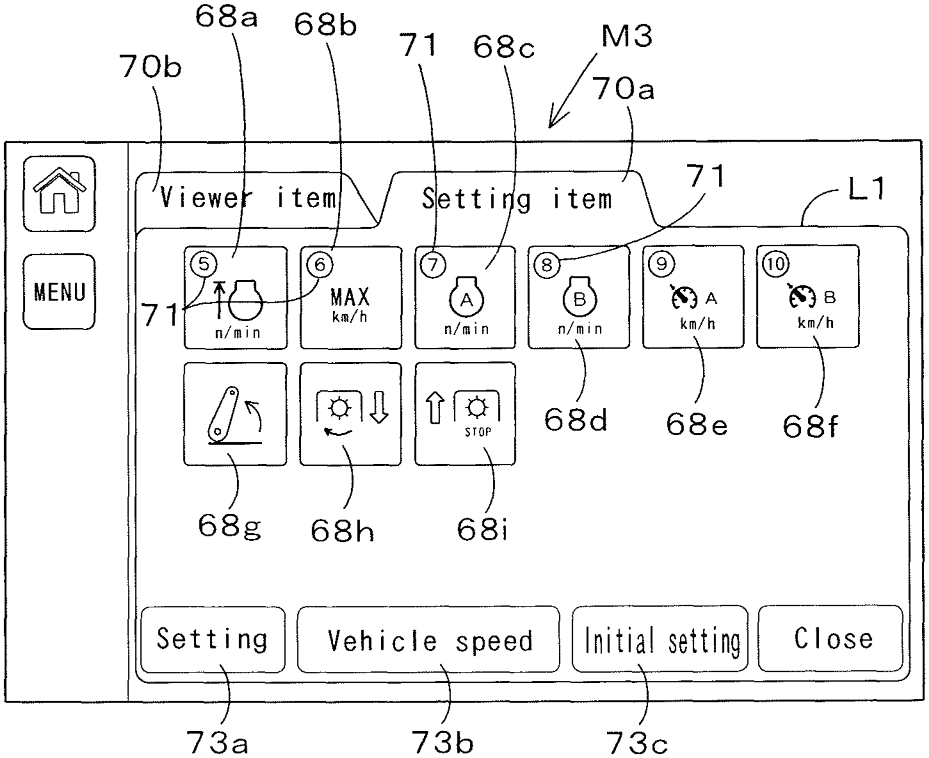
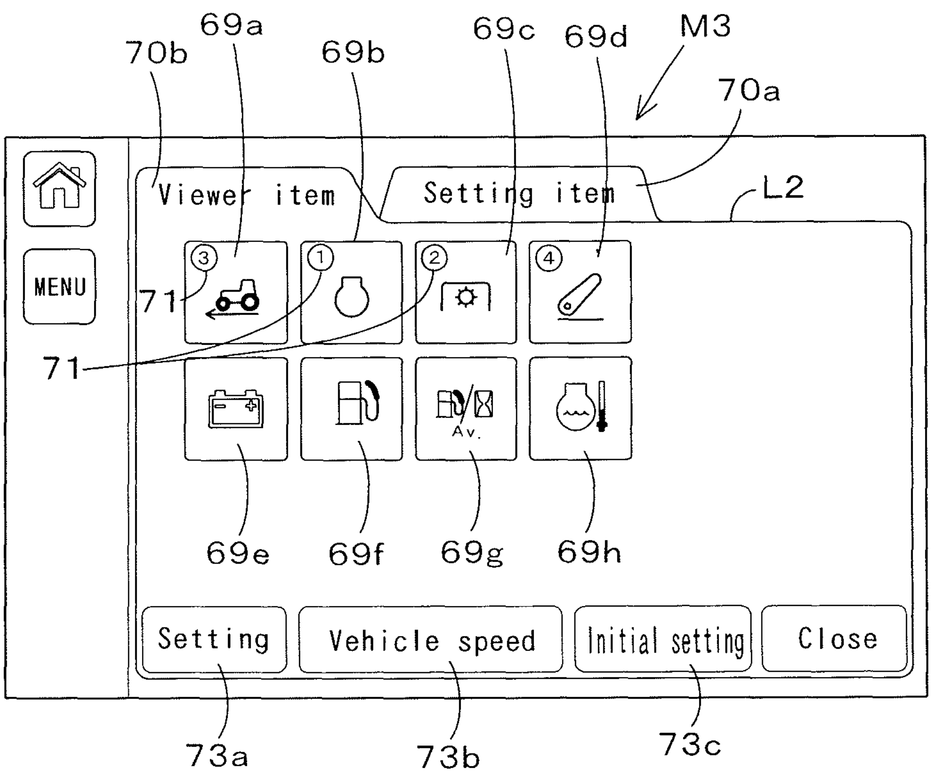

FIG.8B
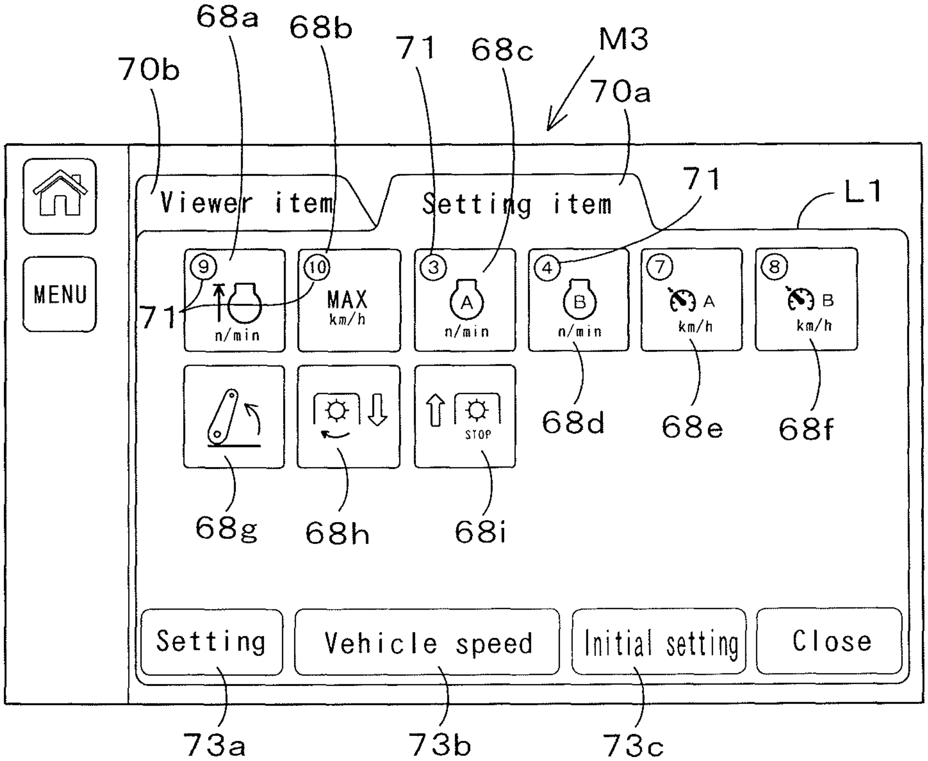
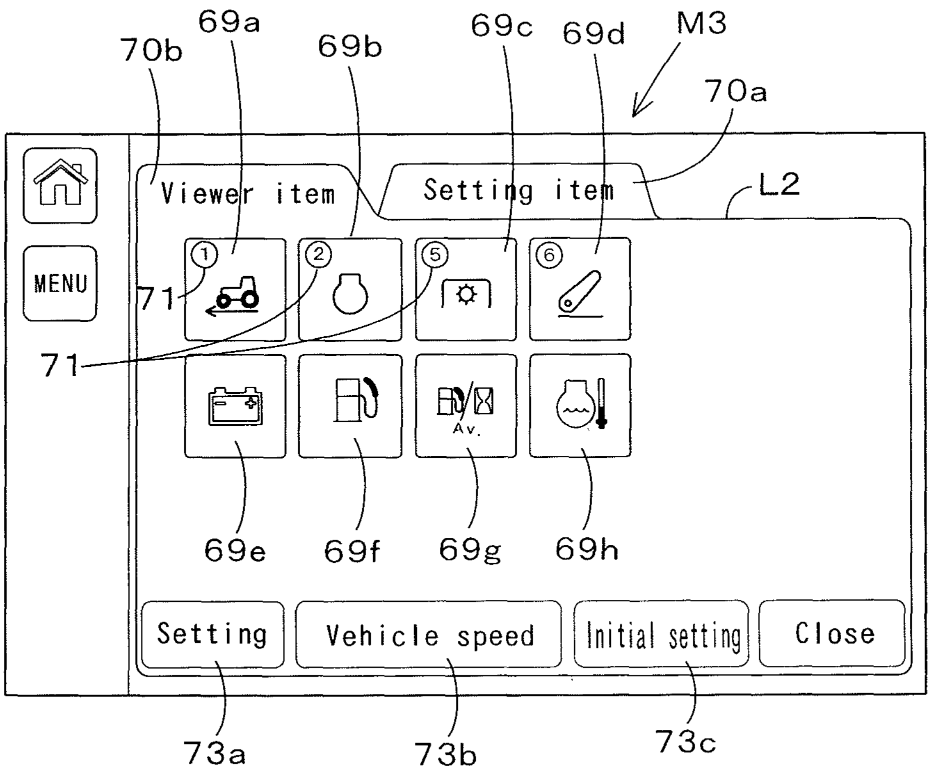

| Item | Group1 | Group2 | Group3 |
|---|---|---|---|
| Lifting setting item W1 | 3P position | 3P auto | 3P position |
| Posture setting item W2 | Position mode | Horizontal mode | Position mode |
| Traveling setting item W3 | 2WD | 4WD | 2WD |
| Rev. upper limit setting item W4 | 2400rpm | 2500pm | 2400rpm |
| Doubled speed setting item W5 | Doubled speed invalid (AD off) | Doubled speed invalid (AD on) | Doubled speed valid (AD on) |
| Auto up item W6 | Auto up invalid (Auto up off) | Auto up valid (Auto up on) | Auto up invalid (Auto up off) |
| Back up item W7 | Back up invalid (Back up off) | Back up valid (Back up on) | Back up valid (Back up on) |
| Auto shift setting item W8 | Auto shift invalid (Auto shift off) | Auto shift invalid (Auto shift off) | Auto shift valid (Auto shift on) |

| | Authentication established | Authentication non established |
|---|---|---|
| Meter display device | Operation (permitted) | No operation (not-permitted) |
| Terminal display device | Operation (permitted) | No operation (not-permitted) |
| Authentication display device | Operation (permitted) | |

FIG.28B

| | Authentication established | Authentication non established |
|---|---|---|
| Meter display device | Operation (permitted) | |
| Terminal display device | Operation (permitted) | No operation (not-permitted) |
| Authentication display device | Operation (permitted) | |

WORKING MACHINE

CROSS-REFERENCE TO RELATED APPLICATIONS

The present application claims priority under 35 U.S.C. § 119 to Japanese Patent Application No. 2018-112254, filed Jun. 12, 2018, to Japanese Patent Application No. 2018-112257, filed Jun. 12, 2018, and to Japanese Patent Application No. 2018-112259, filed Jun. 12, 2018. The contents of these applications are incorporated herein by reference in their entirety.

BACKGROUND OF THE INVENTION

Field of the Invention

The present invention relates to a working machine such as a tractor.

Description of Related Art

A technique disclosed in Japanese Unexamined Patent Application No. 2016-34237 is previously known as a technique which can perform the setting regarding working machine such as a tractor. In the working machine disclosed in Japanese Unexamined Patent Application No. 2016-34237, a plurality of setting items are displayed on a display arranged in the vicinity of an operator seat, and a plurality of buttons for changing setting values and the like for each setting item are displayed.

As for a working machine such as a tractor or the like, a technique disclosed in Japanese Unexamined Patent Application No. H09-9716 is previously known as a technique for lifting and lowering the working device arranged in the working machine. The working machine disclosed in Japanese Unexamined Patent Application No. H09-9716 includes a lifting lever and a lifting device for lifting a working device, and is configured to operate the lifting device according to the operation amount of the lifting lever.

SUMMARY OF THE INVENTION

A display device for a working machine, includes: a plurality of candidate boxes in which candidate setting information to be set to the working machine is represented, the candidate boxes being displayed on a screen; and a contents display portion in which a setting item relating to the working machine is displayed. The display device includes a display control portion to move a display box to a position corresponding to the contents display portion in performing the setting to the working machine, the display box being one of the plurality of candidate boxes in which candidate setting information corresponding to the setting is displayed.

A working machine includes the display device described above.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8A is a first view illustrating a state where an icon is selected in the registration screen according to the embodiments;

FIG. 8B is a second view illustrating the state where an icon is selected in the registration screen according to the embodiments;

FIG. 20 is a view illustrating a plurality of setting items stored in a storage portion according to the embodiments;

FIG. 28A is a view illustrating a relation between an item relating to certification of certification information and an operation of the display device according to the embodiments;

FIG. 28B is a view changing the relation between the item relating to certification of certification information and the operation of the display device according to the embodiments;

DESCRIPTION OF THE EMBODIMENTS

Figure 1A:
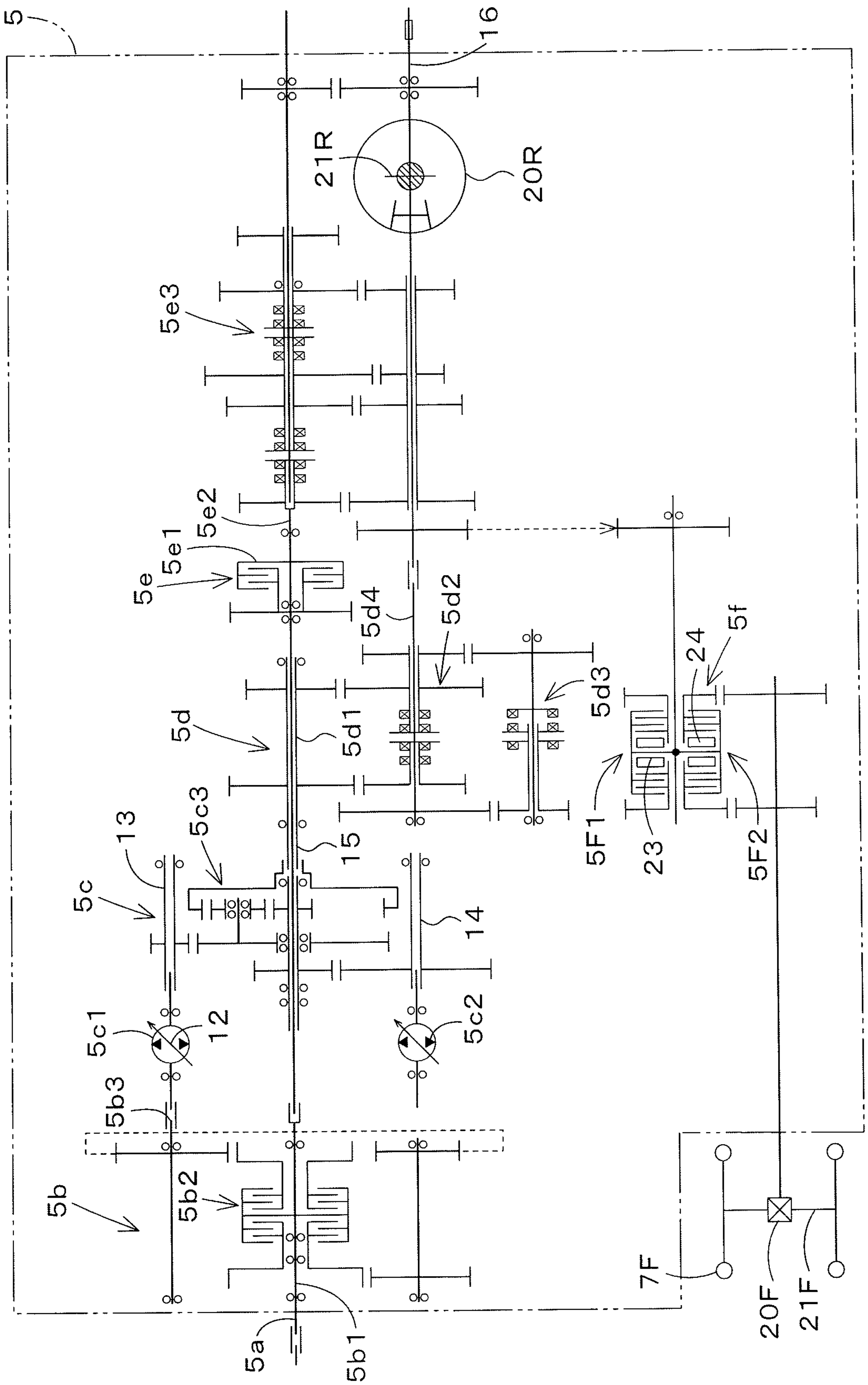
FIG. 1A is a configuration view of a speed-changing device according to embodiments of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings as appropriate.

First Embodiment

Figure 33:
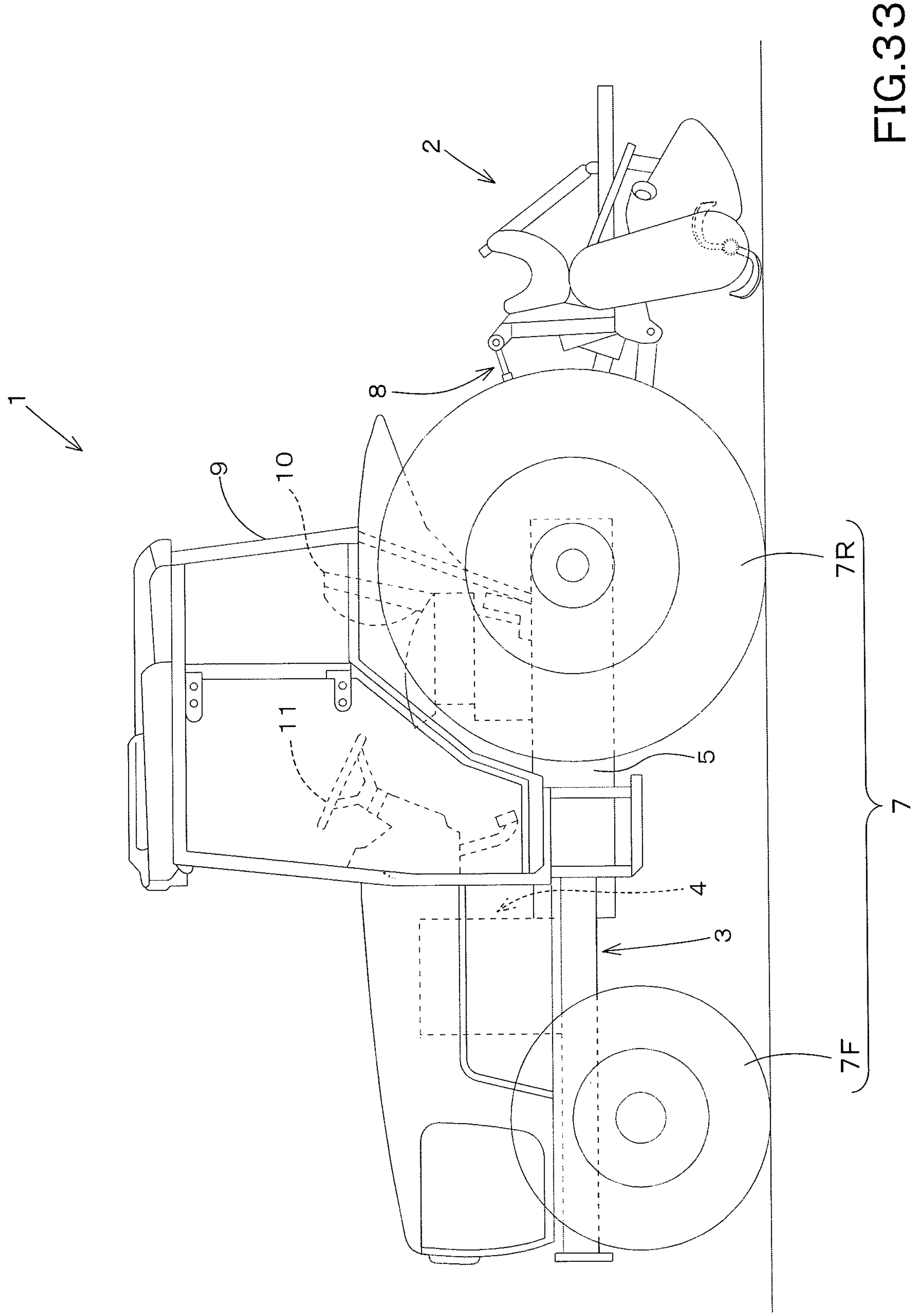
FIG. 33 is a whole view of a tractor according to the embodiments.

FIG. 33 shows a tractor 1 which is an example of a working machine. Although the tractor 1 is described as an example, the working machine is not limited to the tractor, but is an agricultural machine such as a rice transplanter.

As shown in FIG. 33, the tractor 1 includes a traveling vehicle (a machine frame) 3 having a traveling device 7, a prime mover 4, a transmission device 5, and a steering device 11. The traveling device 7 is a device having a front wheel 7F and a rear wheel 7R. The front wheel 7F may be a tire-wheel type or a crawler type.

The rear wheel 7 may also be of a tire-wheel type or a crawler type. The prime mover 4 is an internal combustion engine such as a gasoline engine or a diesel engine, an electric prime mover or the like. In this embodiment, the prime mover 4 is a diesel engine.

The transmission device 5 can switch the thrust force of the traveling device 7 by shifting, and can be switched between forward traveling and reverse traveling of the traveling device 7. A cabin 9 is provided in the machine body 3, and an operator seat 10 is provided in the cabin 9.

In addition, a lifting device 8 is provided at the rear portion of the machine body 3. The working device 2 is removable from the lifting device 8.

In addition, the lifting device 8 can lift the mounted working device 2. The working device 2 includes a tilling device for cultivating, a fertilizer spraying device for spraying fertilizer, an agrichemical spraying device for spraying agrichemical, a harvesting device for harvesting, a mowing device for mowing grass and the like, a diffusing device for diffusing grass and the like, a raking device for raking the grass and the like, and a bailing device for bailing the grass and the like.

In addition, in FIG. 33, the example which the tilling device is attached as the working device 2 is shown.

As shown in FIG. 1A, the transmission device 5 includes a main shaft (a thrust shaft) 5*a*, a shuttle portion 5*b*, a main speed-changing portion 5*c*, an auxiliary speed-changing portion 5*d*, a PTO power transmission portion 5*e*, and a front speed-changing portion 5*f*.

The thrust shaft 5*a* is rotatably supported by the housing case of the transmission device 5, and power from the crankshaft of the prime mover 4 is transmitted to the thrust shaft 5*a*.

The shuttle portion 5*b* has a shuttle shaft 5*b*1 and a forward-reverse traveling switching portion 5*b*2. The power from the thrust shaft 5*a* is transmitted to the shuttle shaft 5*b*1. The front-rear switching portion 5*b*2 is constituted of, for example, a hydraulic clutch, and switches the rotational direction of the shuttle shaft 5*b*1, that is, forward and reverse traveling of the tractor 1, by turning on and off the hydraulic clutch.

The main speed-changing portion 5*c* is a continuously variable transmission mechanism that changes input power continuously. The continuously variable transmission mechanism includes a hydraulic pump 5*c*1, a hydraulic prime mover 5*c*2, and a planetary gear mechanism 5*c*3. The hydraulic pump 5*c*1 is rotated by the power from the output shaft 5*b*3 of the shuttle portion 5*b*.

The hydraulic pump 5$c$1 is, for example, a variable displacement pump having a swash plate 12, and changes the flow rate of the hydraulic fluid discharged from the hydraulic pump 5$c$1 by changing the angle (a swash plate angle) of the swash plate 12.

The hydraulic prime mover 5$c$2 is a prime mover that is rotated by hydraulic fluid discharged from the hydraulic pump 5$c$1 via a fluid line circuit such as a pipe. The revolving speed of the hydraulic prime mover 5$c$2 can be changed by changing the swash plate angle of the hydraulic pump 5$c$1 or changing the power input to the hydraulic pump 5$c$1.

The planetary gear mechanism 5$c$3 is a mechanism including a plurality of gears and a power transmission shaft such as an input shaft and an output shaft, and includes the input shaft 13 to which the power of the hydraulic pump 5$c$1 is input, an input shaft 14 to which the power of 5$c$2 is input, and an output shaft 15 for outputting the power.

The planetary gear mechanism 5$c$3 transmits, to the output shaft 15, a power obtained by combining the power of the hydraulic pump 5$c$1 and the power of the hydraulic prime mover 5$c$2.

Thus, according to the main speed-changing portion 5$c$, the power output to the auxiliary speed-changing portion 5$d$ can be changed by changing the swash plate angle of the swash plate 12 of the hydraulic pump 5$c$1, the revolving speed of the prime mover 4, and the like. In addition, although the main speed-changing part 5$c$ is comprised with the continuously variable transmission mechanism, the main speed-changing part 5$c$ may be a stepped transmission mechanism which performs the gear changing by gears.

The auxiliary speed-changing portion 5$d$ is a speed-changing mechanism having a plurality of stepped gears for shifting power, and by appropriately changing the connection (engagement) of the plurality of gears, the power inputted from the output shaft 15 of the planetary gear mechanism 5$c$3 to the auxiliary speed-changing portion 5$d$ is changed and outputted (shifted).

The auxiliary speed-changing portion 5$d$ includes an input shaft 5$d$1, a first speed-changing clutch 5$d$2, a second speed-changing clutch 5$d$3, and an output shaft 5$d$4. The input shaft 5$d$1 is a shaft to which the power of the output shaft 15 of the planetary gear mechanism 5$c$3 is input, and the inputted power is input to the first speed-changing clutch 5$d$2 and the second speed-changing clutch 5$d$3 via gears or the like.

The input power is changed by switching the connection and disconnection of each of the first speed-changing clutch 5$d$2 and the second speed-changing clutch 5$d$3, and the input power is outputted to the output shaft 5$d$4. The power output to the output shaft 5$d$4 is transmitted to the rear wheel differential device 20R. The rear wheel differential device 20R rotatably supports a rear axle 21R to which the rear wheel 7R is attached.

The PTO power transmission portion 5$e$ has a PTO clutch 5$e$1, a PTO thrust shaft 5$e$2, and a PTO transmission portion 5$e$3. The PTO clutch 5$e$1 is formed of, for example, a hydraulic clutch or the like, and does not transmit the power of the thrust shaft 5$a$ to the PTO thrust shaft 5$e$2, and the state of transmitting the power of the thrust shaft 5$a$ to the PTO thrust shaft 5$e$2 and the state of not transmitting the power of the thrust shaft 5$a$ to the PTO thrust shaft 5$e$2 are switched by turning on and off the hydraulic clutch.

The PTO transmission portion 5$e$3 includes a speed-changing clutch, a plurality of gears, and the like, and changes and outputs the power (the revolving speed) inputted from the PTO thrust shaft 5$e$2 to the PTO transmission portion 5$e$3. The power of the PTO transmission portion 5$e$3 is transmitted to the PTO shaft 16 via a gear or the like.

The front speed-changing portion 5$f$ includes a first front speed-changing clutch 5$f$1 and a second front speed-changing clutch 5$f$2. The first front speed-changing clutch 5$f$1 and the second front speed-changing clutch 5$f$2 can transmit power from the auxiliary speed-changing portion 5$d$, and for example, the power of the output shaft 5$d$4 is transmitted through the gear and the speed-changing shaft.

Power from the first front speed-changing clutch 5$f$1 and the second front speed-changing clutch 5$f$2 can be transmitted to the front axle 21F via the front speed-changing shaft 22. In particular, the front speed-changing shaft 22 is connected to the front wheel differential device 20F, and the front wheel differential device 20F rotatably supports a front axle 21F to which the front wheel 7F is attached.

The first front shift clutch 5$f$1 and the second front shift clutch 5$f$2 are configured by hydraulic clutches and the like. A fluid tube is connected to the first front speed-changing clutch 5$f$1, and the fluid tube is connected to a control valve 23 to which hydraulic fluid discharged from a hydraulic pump is supplied. The first front speed-changing clutch 5$f$1 is switched between the connected state and the disconnected state according to the degree of opening of the control valve 23.

An fluid tube is connected to the second front speed-changing clutch 5$f$2, and the fluid tube is connected to the control valve 24. The second front speed-changing clutch 5$f$2 switches between the connected state and the disconnected state according to the degree of opening of the control valve 24. The control valve 23 and the control valve 24 are, for example, two-position switching valves with solenoid valves, and are switched to the connected state or the disconnected state by exciting or demagnetizing solenoids of the solenoid valves.

When the first front speed-changing clutch 5$f$1 is in the disengaged state and the second front speed-changing clutch 5$f$2 is in the connected state, the power of the auxiliary speed-changing portion 5$d$ is transmitted to the front wheel 7F through the second front speed-changing clutch 5$f$2. As a result, in the four-wheel drive (4WD) in which the front wheels and the rear wheels are driven by power, the revolving speeds of the front wheels and the rear wheels become substantially the same (4WD constant speed state).

On the other hand, when the first front speed-changing clutch 5$f$1 is in the connection state and the second front speed-changing clutch 5$f$2 is in the disconnection state, the four-wheel drive is performed and the revolving speed of the front wheel is faster than the revolving speed of the rear wheel (4WD fast speed state).

In addition, when the first front speed-changing clutch 5$f$1 and the second front speed-changing clutch 5$f$2 are in the connected state, the power of the auxiliary speed-changing portion 5$d$ is not the front wheel 7F, so the rear wheel becomes two-wheel drive (2WD).

Figure 1B:
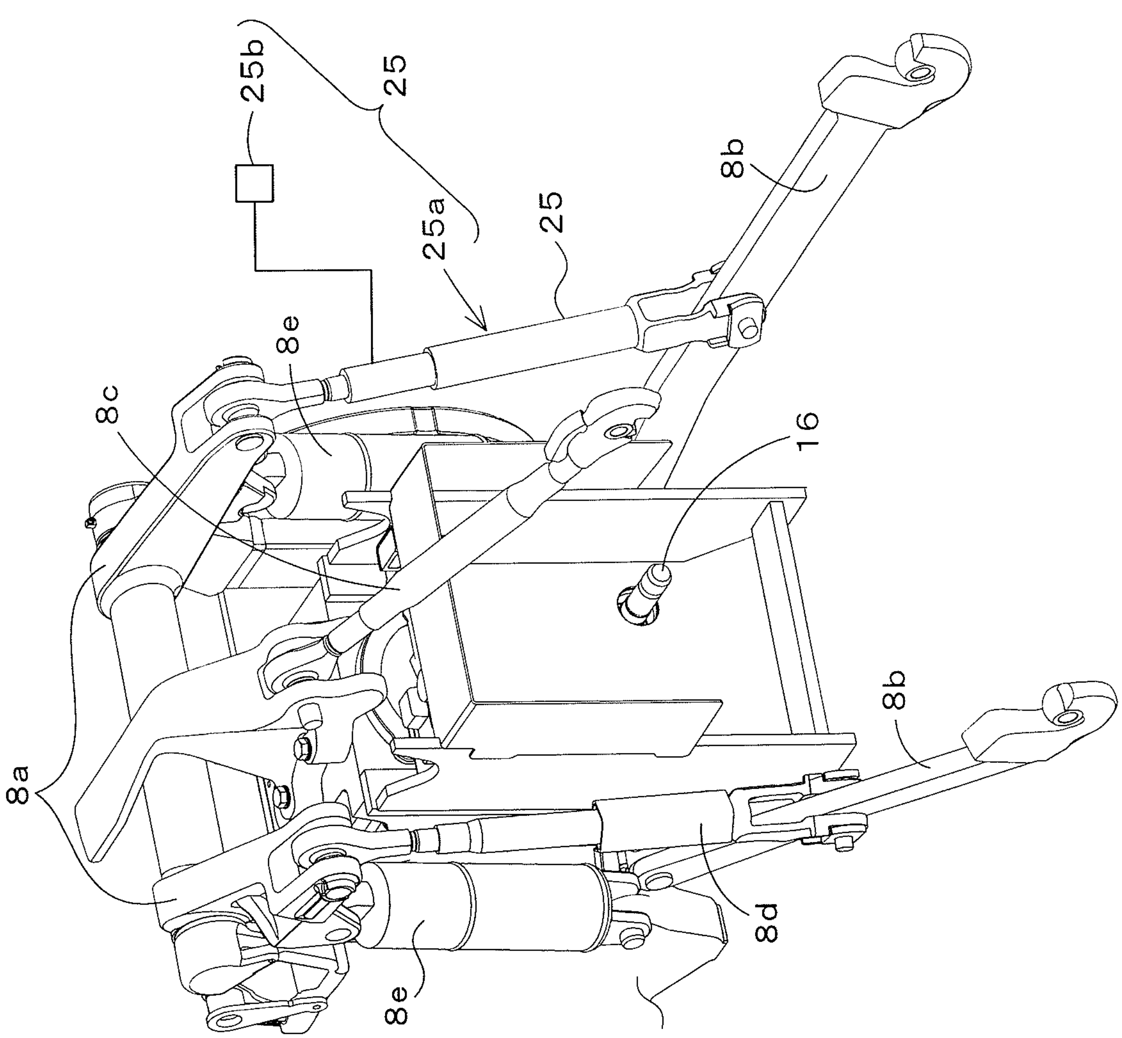
FIG. 1B is a perspective view of a lifting device according to the embodiments.
Figure 1C:
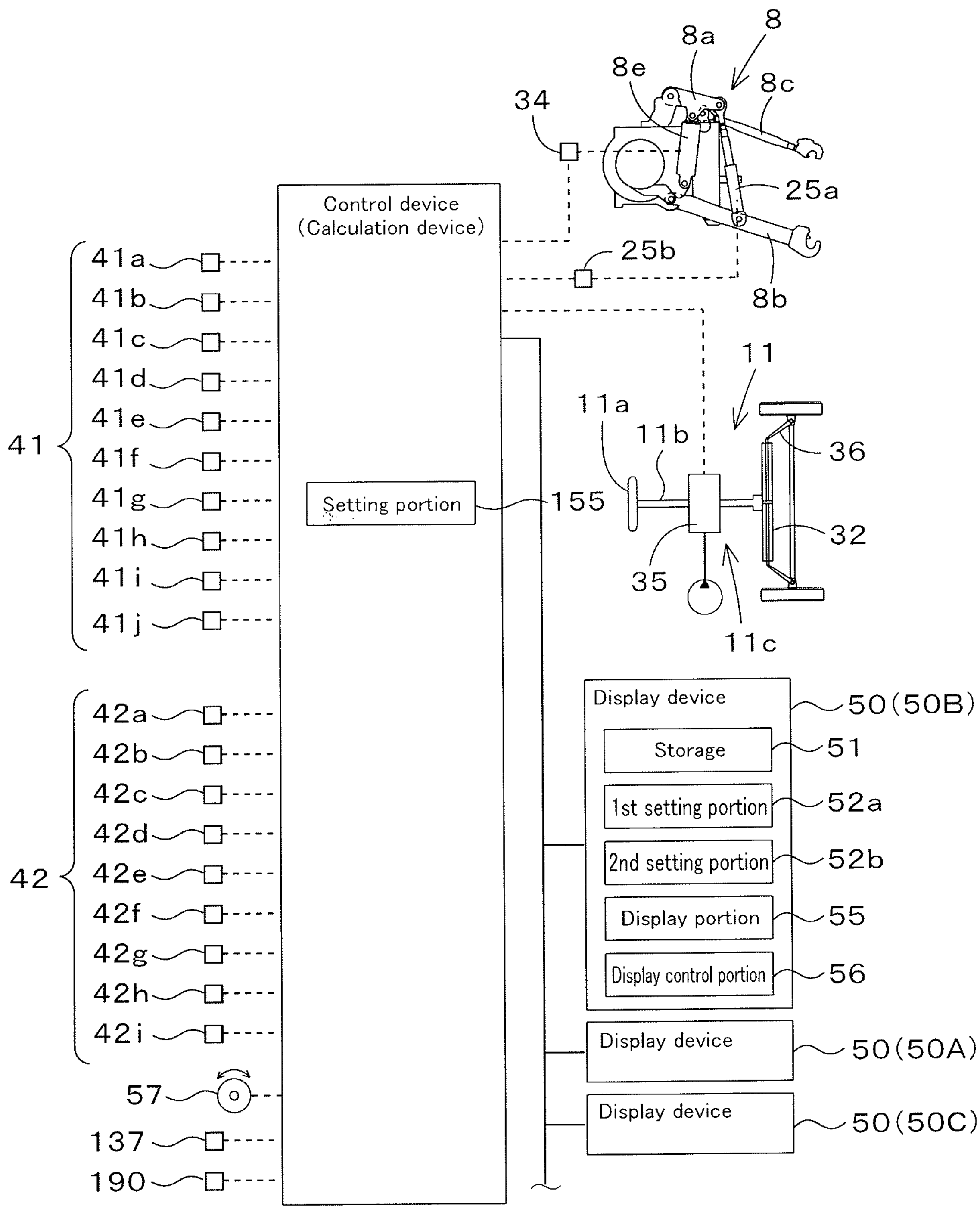
FIG. 1C is a view illustrating a control block diagram of a working machine according to the embodiments.

As shown in FIG. 1B and FIG. 1C, the lifting device 8 has a lift arm 8$a$, a lower link 8$b$, a top link 8$c$, a lift rod 8$d$, and a lift cylinder 8$e$. The front end portion of the lift arm 8$a$ is supported swingably upward or downward at a rear upper portion of a case (a speed-changing case) accommodating the transmission device 5.

The lift arm 8$a$ is swung (lifted) by the drive of the lift cylinder 8$e$. The lift cylinder 8$e$ is composed of a hydraulic cylinder. The lift cylinder 8$e$ is connected to the hydraulic pump via the control valve 34. The control valve 34 is a solenoid valve or the like and extends and retracts the lift cylinder 8$e$.

The front end portion of the lower link 8*b* is supported at the rear lower portion of the transmission device 5 so as to be capable of swinging upward or downward. The front end portion of the top link 8*c* is supported swingably upward or downward at the rear of the transmission device 5 above the lower link 8*b*.

The lift rod 8*d* connects the lift arm 8*a* and the lower link 8*b*. The working device 2 is connected to the rear of the lower link 8*b* and the rear of the top link 8*c*. When the lift cylinder 8*e* is driven (expanded), the lift arm 8*a* is raised and lowered, and the lower link 8*b* connected to the lift arm 8*a* via the lift rod 8*d* is moved upward and downward.

As a result, the working device 2 swings (lifts) upward or downward with the front of the lower link 8*b* as a fulcrum.

The lifting device 8 is provided with a posture changing device 25. The posture changing device 25 is a device that changes the posture of the working device 2 mounted on the machine body 3. The attitude changer 25 includes a change cylinder 25*a* formed of a hydraulic cylinder and a control valve 25*b*.

The change cylinder 25*a* is connected to the hydraulic pump via the control valve 25*b*. The control valve 25*b* is a solenoid valve or the like and extends and retracts the change cylinder 25*a*. The change cylinder 25*a* connects the lift arm 8*a* and the lower link 8*b*.

As shown in FIG. 1C, the steering device 11 includes a steering wheel 11*a*, a rotation shaft (steering shaft) 11*b* that rotates with the rotation of the steering wheel 11*a*, and an assist mechanism (power steering mechanism) 11*c* that assists steering of the steering wheel 11*a*.

The assist mechanism 11*c* includes a control valve 35 and a steering cylinder 32. The control valve 35 is, for example, a three-position switching valve that can be switched by movement of a spool or the like. The control valve 35 can also be switched by steering the steering shaft 11*b*. The steering cylinder 32 is connected to an arm (knuckle arm) 36 that changes the direction of the front wheel 7F.

Thus, when the steering wheel 11*a* is operated, the switching position and the opening degree of the control valve 35 are switched according to the steering wheel 11*a*, and the steering cylinder 32 extends or contracts to the left or right according to the switching position and the opening degree of the control valve 35. By doing this, the steering direction of the front wheel 7F can be changed. In addition, the steering mechanism 11 mentioned above is an example, and is not limited to the structure mentioned above.

As shown in FIG. 1C, the tractor 1 includes a control device 40. The control device 40 is a device that performs various controls of the tractor 1. A plurality of detection devices 41 are connected to the control device 40.

The plurality of detection devices 41 are devices that detect the state of the tractor 1, and for example, a water temperature sensor 41*a* that detects water temperature, a fuel sensor 41*b* that detects the remaining amount of fuel, and a prime mover rotation sensor (a revolving sensor) 41*c* that detects the revolving speed of the prime mover 4, an accelerator pedal sensor 41*d* for detecting the operation amount of the accelerator pedal, a steering angle sensor 41*e* for detecting the steering angle of the steering mechanism 11, an angle sensor 41*f* for detecting the angle of the lift arm 8*a*, an inclination detection sensor 41*g* for detecting inclination (rightward or leftward) of the machine body 3 in a width direction, a speed sensor 41*h* for detecting the vehicle speed (speed) of machine body 3, a PTO rotation sensor (a revolving sensor) 41*i* for detecting the number of rotations of PTO shaft, and a battery sensor 41*j* for detecting the voltage of the storage battery such as a battery.

The speed sensor 41*h* detects the vehicle speed by converting into the vehicle speed, for example, the number of rotations of the front axle 21F, the number of rotations of the rear axle 21R, the number of rotations of the front wheels 7F, the number of rotations of the rear wheels 7R, and the like.

In addition, the speed sensor 41*h* can also detect the rotational direction of any of the front axle 21F, the rear axle 21R, the front wheel 7F and the rear wheel 7R, and the tractor 1 (machine body 3) is moving forward or backward. The above-described detection device 41 is an example, and is not limited to the above-described sensor.

In addition, a plurality of operation members (operation devices) 42 are connected to the control device 40.

A plurality of operating members 42 are a shuttle lever 42*a* for switching forward or reverse of the machine body 3, an ignition switch 42*b* for starting the prime mover 4 and the like, a PTO shift lever 42*c* for setting the number of rotations of the PTO shaft, a shift switching switch 42*d* for switching between the automatic shift and the manual shift, a shift lever 42*e* for manually switching the shift position (a shift level) of transmission device 5, an accelerator 42*f* for increasing and decreasing a vehicle speed, a pompa switch 42*g* for operating elevation of lifting device 8, an upper limit setting dial 42*h* for setting an upper limit of the lifting device 8, a vehicle speed lever 42*i* for setting the vehicle speed, and the like.

In addition, the detection device 41 mentioned above is an example, and is not limited to the sensor mentioned above.

When the shuttle lever 42*a* is operated in the forward direction, the control device 40 advances the machine body 3 by switching the forward-reverse switching portion 5*b*2 of the shuttle portion 5*b* to the forward direction. In addition, when the shuttle lever 42*a* is operated in reverse, the control device 40 reverses the machine body 3 by switching the forward-backward switching portion 5*b*2 of the shuttle portion 5*b* to the backward direction.

The control device 40 starts the prime mover 4 through predetermined processing when the ignition switch 42*b* is operated to ON, and stops the driving of the prime mover 4 when the ignition switch 42*b* is operated to OFF. When the PTO speed-changing lever 42*c* is operated, the control device 40 changes the PTO speed-changing gear incorporated in the transmission device 5 to change the revolving speed of the PTO shaft (referred to as PTO revolving speed).

When the gear change switch 42*d* is switched to the automatic gear shift, the control device 40 automatically switches either the main speed-changing portion 5*c* or the auxiliary speed-changing portion 5*d* according to the state of the tractor 1, and the level is automatically changed to a predetermined shift speed (shift level).

The control device 40 automatically switches one of the main speed-changing portion 5*c* and the auxiliary speed-changing portion 5*d* according to the shift speed (shift level) set by the shift lever 42*e* when the shift switch 42*d* is switched to manual shift, and changes the gear position of the transmission device 5.

When the accelerator 42*f* is operated, the control device 40 changes the speed of the machine body 3 by changing the number of revolutions of the prime mover 4 (referred to as prime mover revolution number) according to the operation amount of the accelerator 42*f*.

The control device 40 controls the control valve 34 to extend the lift cylinder 8*e* when the pump switch 42*g* is operated in the lifting direction (lifting side) to extend the rear end portion of the lift arm 8*a* (the end portion on the working device 2 side).

The control device 40 controls the control valve 34 to contract the lift cylinder 8*e* to operate the rear end portion of the lift arm 8*a* (the end portion on the working device 2 side) when the pompa switch 42*g* is operated in the lowering direction (downward side).

In the case where the control device 40 raises the working device 2 by the lift device 8, when the control device 40 reaches the position of the working device 2, that is, the upper limit (height upper limit) at which the angle of the lift arm 8*a* is set by the upper limit setting dial 42*h*, the lifting operation of the lifting device 8 is stopped.

The tractor 1 is provided with a plurality of display devices 50. The plurality of display devices 50 are devices that display various information regarding the tractor 1. The plurality of display devices 50 are set around the operator seat 10, and can confirm information displayed by a worker (operator) seated on the operator seat 10.

The plurality of display devices 50 are a meter display device 50A, a terminal display device 50B, and an authentication display device 50C. The meter display device 50A is a display device disposed in front of the operator seat 10 and in front of the steering wheel 11*a*, and displays at least the operation (operation information) related to the operation.

The terminal display device 50B is a display device different from the meter display device 50A, and is disposed, for example, in front of or to the side of the operator seat 10.

The terminal display device 50B displays at least information on the setting of the tractor 1. The authentication display device 50C is a display device which is disposed around the operator seat 10 and displays authentication information.

For convenience of description, the meter display device 50A may be referred to as "display device 50A". The terminal display device 50B may be referred to as a "display device 50B". The authentication display device 50C may be referred to as a "display device 50C". The tractor 1 does not have to have all the display devices of the display device 50A, the display device 50B, and the display device 50C, and the number of display devices can be arbitrarily changed.

The display device 50B can be operated by a touch operation with a finger or an operation of the operation tool by the operation tool 57. The operation tool 57 is, for example, a rotary selector switch that can be pressed.

The display device 50B includes a display portion 55 that displays information and a display control portion 56 that controls display. The display portion 55 is configured of a liquid crystal, an organic EL panel, or the like. The display control portion 56 is configured of a CPU, electric/electronic parts, and the like.

The display control portion 56 is a device that performs various processes in the display device 50B, and, for example, displays various information on the display portion 55 by controlling the display portion 55 such as a panel. Hereinafter, the display of the display portion 55 will be described as being controlled by the display control portion 56.

Figure 2:
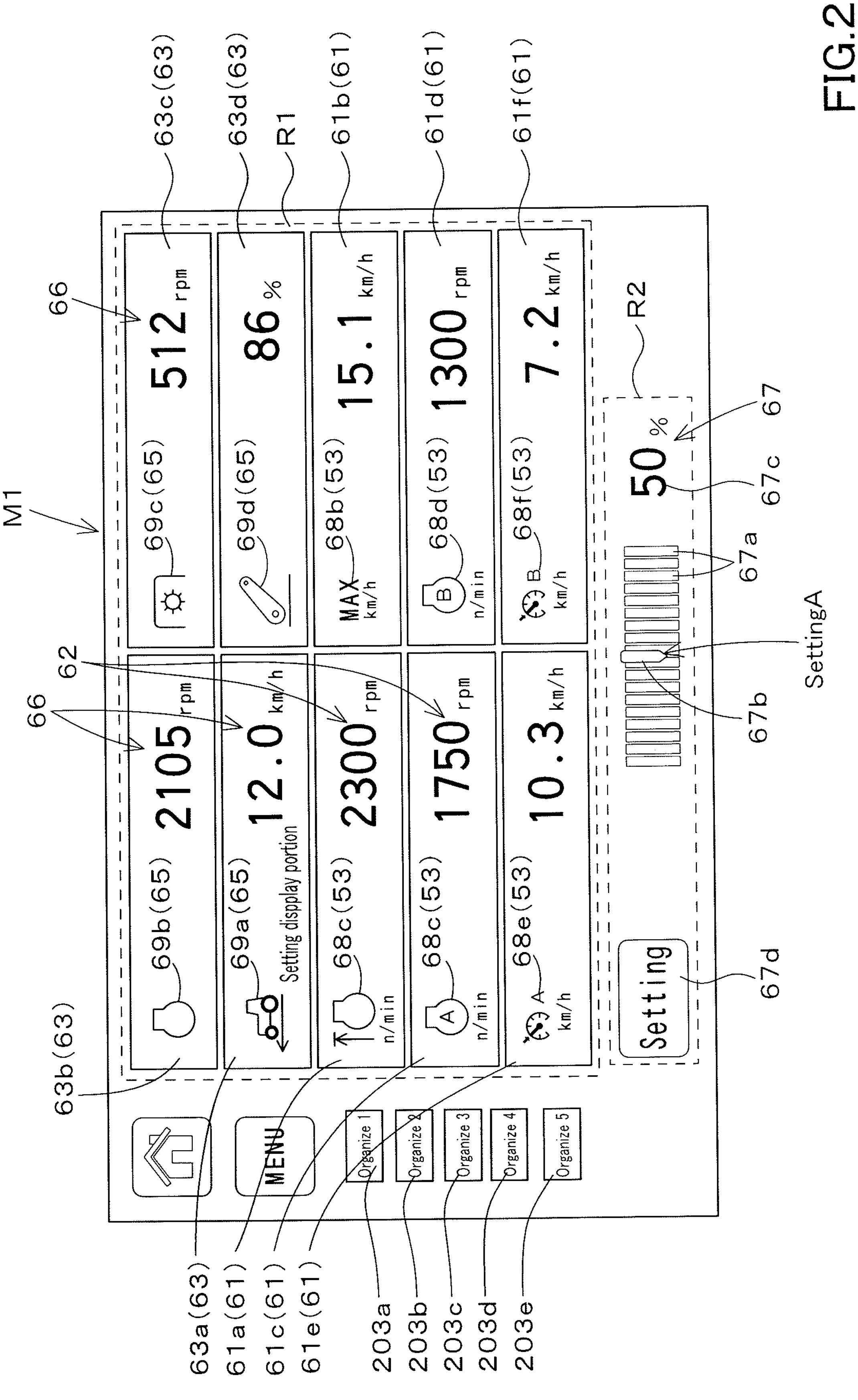
FIG. 2 is a view illustrating an example of a setting viewer screen according to the embodiments.

FIG. 2 is a screen after activation of the display device 50B, and shows a setting viewer screen (first screen) M1 in which a predetermined operation is performed on the display device 50B after activation. The display device 50B displays a plurality of setting boxes 61 on the setting viewer screen M1.

Figure 3A:
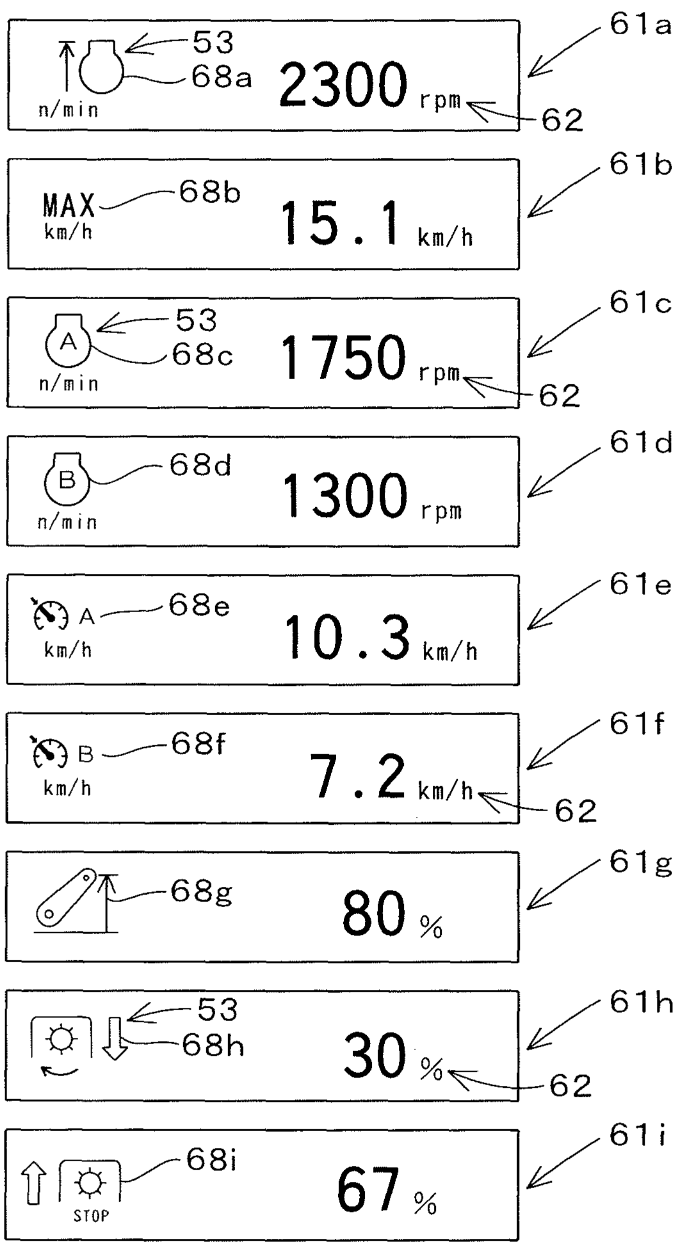
FIG. 3A is a view illustrating a list of a plurality of setting boxes according to the embodiments.

FIG. 3A shows a list of a plurality of setting boxes 61 that can be displayed on the setting viewer screen M1. First, the setting box 61 will be described in detail.

As shown in FIG. 3A, the plurality of setting boxes 61 are boxes for displaying setting information regarding the setting of the tractor 1 respectively. The plurality of setting boxes 61 includes a first setting box 61*a*, a second setting box 61*b*, a third setting box 61*c*, a fourth setting box 61*d*, a fifth setting box 61*e*, a sixth setting box 61*f*, and a sixth setting box. A seventh setting box 61*g*, an eighth setting box 61*h*, and a ninth setting box 61*i* are included.

The first setting box 61*a* is a box indicating the upper limit value (upper limit revolving speed) of the prime mover revolving speed as setting information. The second setting box 61*b* is a box indicating the upper limit of the vehicle speed as setting information.

The third setting box 61*c* is a box indicating the first prime mover revolving speed as setting information. The fourth setting box 61*d* is a box indicating the second prime mover revolving speed as setting information. The fifth setting box 61*e* is a box indicating the first vehicle speed as setting information.

The sixth setting box 61*f* is a box indicating the second vehicle speed as setting information. The seventh setting box 61*g* is a box indicating the upper limit position (height upper limit value) of the working device 2 as setting information.

The eighth setting box 61 *h* is a box indicating the height (rotation start height) of the working device 2 at the start of rotation of the PTO shaft when the working device 2 is lowered. The ninth setting box 61*i* is a box that indicates the height (rotation stop height) of the working device 2 that stops the rotation of the PTO shaft when the working device 2 is lifted.

Each of the plurality of setting boxes 61 includes an item display portion 53 for displaying setting items, and a setting display portion 62 for displaying setting information corresponding to the item display portion 53.

The item display portion 53 of the first setting box 61*a* displays an icon (first setting icon) 68*a* indicating that the upper limit value of the prime mover revolving speed is a setting item. The setting display portion 62 of the first setting box 61*a* displays the upper limit revolving speed as a number (character).

The item display portion 53 of the second setting box 61*b* displays an icon (second setting icon) 68*b* indicating that the upper limit value of the vehicle speed is a setting item. The setting display portion 62 of the second setting box 61*b* displays the upper limit value of the vehicle speed by a number.

The item display portion 53 of the third setting box 61*c* displays an icon (third setting icon) 68*c* indicating that the first prime mover revolving speed is a setting item. The setting display portion 62 of the third setting box 61*c* displays the first prime mover revolving speed in numbers.

The item display portion 53 of the fourth setting box 61*d* displays an icon (fourth setting icon) 68*d* indicating that the second prime mover revolving speed is a setting item. The setting display portion 62 of the fourth setting box 61*d* displays the second prime mover revolving speed in numbers.

The item display portion 53 of the fifth setting box 61*e* displays an icon (fifth setting icon) 68*e* indicating that the first vehicle speed is a setting item. The setting display portion 62 of the fifth setting box 61*e* displays the first vehicle speed as a number.

The item display portion 53 of the sixth setting box 61*f* displays an icon (sixth setting icon) 68 *f* indicating that the second vehicle speed is a setting item. The setting display portion 62 of the sixth setting box 61*f* displays the second vehicle speed in numbers.

The item display portion 53 of the seventh setting box 61*g* displays an icon (seventh setting icon) 68*g* indicating that the height upper limit value of the working device 2 is a setting item. The setting display portion 62 of the seventh setting box 61*g* displays the height upper limit value of the working device 2 as a number.

The item display portion 53 of the eighth setting box 61*h* displays an icon (eighth setting icon) 68*h* indicating that the rotation start height is a setting item. The setting display portion 62 of the eighth setting box 61*h* displays the rotation start height in numbers.

The item display portion 53 of the ninth setting box 61*i* displays an icon (ninth setting icon) 68*i* indicating that the rotation stop height is a setting item. The setting display portion 62 of the ninth setting box 61*i* displays the rotation stop height as a number.

Figure 3B:
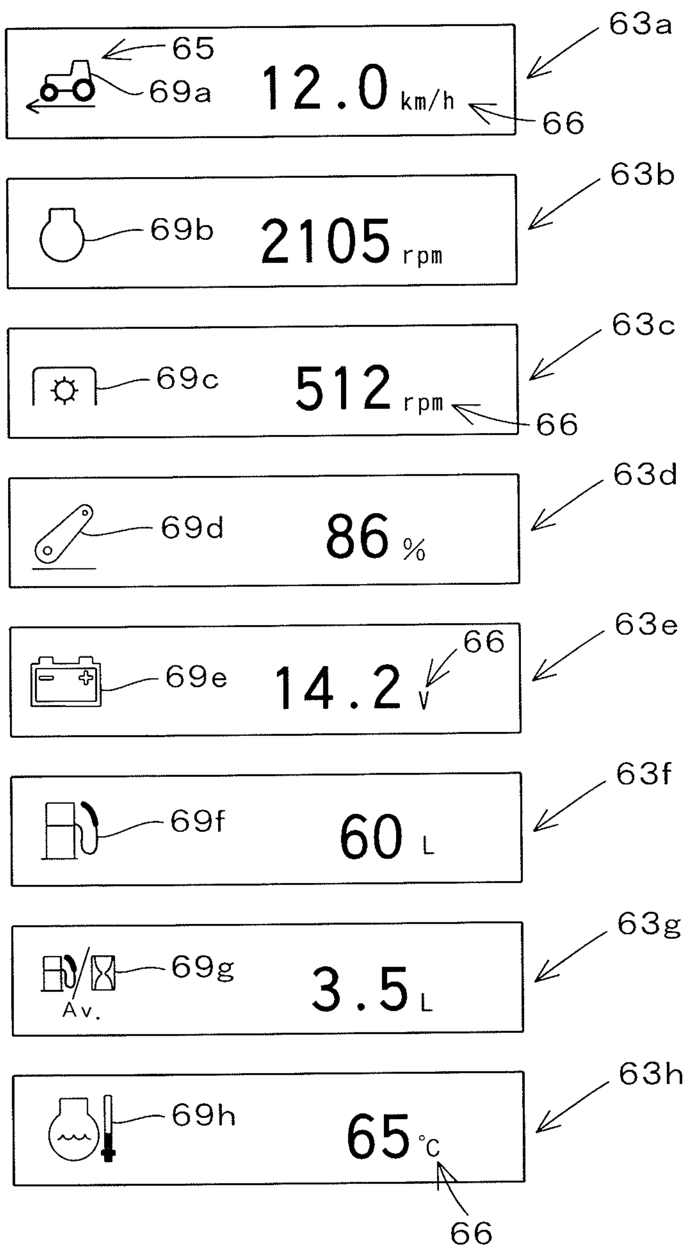
FIG. 3B is a view illustrating a list of a plurality of viewer boxes according to the embodiments.

The display device 50B displays a plurality of viewer boxes 63 on the setting viewer screen M1. FIG. 3B shows a list of a plurality of viewer boxes 63 that can be displayed on the setting viewer screen M1.

First, the setting box 63 will be described in detail. As shown to FIG. 3B, several viewer box 61 is a box which displays the status information regarding the status of the tractor 1, respectively. The plurality of viewer boxes 61 includes a first viewer box 63*a*, a second viewer box 63*b*, a third viewer box 63*c*, a fourth viewer box 63*d*, a fifth viewer box 63*e*, a sixth viewer box 63*f*, a seventh viewing box 63*g*, and an eighth viewing box 63*h*.

The first viewing box 63*a* is a box indicating the current vehicle speed as the state information. The second viewer box 63*b* is a box indicating the current prime mover revolving speed as status information.

The third viewing box 63*c* is a box indicating the current PTO revolving speed as the state information. The fourth viewer box 63*d* is a box indicating the height of the working device 2 as state information.

The fifth viewer box 63*e* is a box indicating the voltage of the storage battery as the state information. The sixth viewing box 63*f* is a box indicating the remaining amount of fuel as state information.

The seventh viewing box 63*g* is a box indicating fuel consumption per hour as status information. The eighth viewing box 63*h* is a box indicating the current water temperature.

Each of the plurality of viewer boxes 63 includes an item display portion 65 for displaying viewer items, and a status display portion 66 for displaying state information corresponding to the item display portion 65.

The item display portion 65 of the first viewer box 63*a* displays an icon (first viewer icon) 69*a* indicating that the current vehicle speed is a viewer item. The status display portion 66 of the first viewer box 63*a* displays the vehicle speed detected by the speed sensor 41*h* in numerical form as the current vehicle speed.

The item display portion 65 of the second viewer box 63*b* displays an icon (second viewer icon) 69*b* indicating that the current prime mover revolving speed is a viewer item. The status display portion 66 of the second viewer box 63*b* displays the number of rotations detected by the prime mover rotation sensor (rotation sensor) 41*c* in numerical form as the current number of prime mover rotations.

The item display portion 65 of the third viewer box 63*c* displays an icon (third viewer icon) 69*c* indicating that the current PTO revolving speed is a viewer item. The status display portion 66 of the third viewer box 63*c* displays the number of rotations detected by the PTO rotation sensor (rotation sensor) 41*i* in numerical form as the current PTO revolving speed.

The item display portion 65 of the fourth viewer box 63*d* displays an icon (fourth viewer icon) 69*d* indicating that the height of the working device 2 is a viewer item. The status display portion 66 of the fourth viewer box 63*d* displays the angle (height) detected by the angle sensor 41*f* in numerical form.

The item display portion 65 of the fifth viewer box 63*e* displays an icon (fifth viewer icon) 69*e* indicating that the voltage of the storage battery is a viewer item. The status display portion 66 of the fifth viewer box 63*e* displays the voltage detected by the battery sensor 41*j* in numbers.

The item display portion 65 of the sixth viewer box 63*f* displays an icon (sixth viewer icon) 69*f* indicating that the remaining amount of fuel is a viewer item. The status display portion 66 of the sixth viewer box 63*f* displays the remaining amount of fuel detected by the fuel sensor 41*b* in numbers.

The item display portion 65 of the seventh viewer box 63*g* displays an icon (seventh viewer icon) 69*g* indicating that the fuel consumed per hour is a viewer item. The status display portion 66 of the seventh viewer box 63*g* displays the fuel consumption per hour in numbers.

The item display portion 65 of the eighth viewer box 63*h* displays an icon (eighth viewer icon) 69*h* indicating that the current water temperature is a viewer item. The status display portion 66 of the eighth viewing box 63*h* displays the water temperature detected by the water temperature sensor 41*a* in numerical form as the current water temperature.

Now, as shown in FIG. 2, the display device 50B (display control portion 56) sets an area R1 for displaying a box (setting box 61, viewer box 63) in the setting viewer screen M1, and sets the area R1 vertically. Display n boxes on the side and m boxes on the side.

In this embodiment, the display device 50B displays a total often boxes, five vertically and two horizontally, on the setting viewer screen M1. The setting box 61 displayed on the setting viewer screen M1 can be selected.

For example, the setting box 61 can be selected by touching the setting box 61 of the setting viewer screen M1 with a finger or performing a rotation operation and a pressing operation of the operation tool 57.

The display device 50B (display control portion 56) displays the setting input portion 67 in the area R2 different from the area R1 on the setting viewer screen M1. That is, the display device 50B displays the setting input portion 67 separately from the setting box 61 on the setting viewer screen M1.

The setting input portion 67 is a portion that inputs setting information corresponding to the setting item indicated in the item display portion 53 of the plurality of setting boxes 61. The setting input portion 67 includes a scale portion 67*a*, an index portion 67*b*, and a numerical value display portion 67*c*. The scale portion 67*a*, the index portion 67*b*, and the numerical value display portion 67*c* are arranged in a line in the lateral direction.

The scale portion 67*a* is a scale indicating the magnitude of the setting value (numerical value) in the setting information, and is configured, for example, by arranging a plurality of vertical bars (gauges) in the horizontal direction. In the scale portion 67*a*, one side in the parallel direction of the vertical bars, for example, the left side is the minimum value, and the other in the parallel direction, for example, the right side is the maximum value.

The index portion 67*b* is a part that indicates setting information, that is, a setting value with respect to the scale portion 67*a*, and is movable along the parallel direction of the vertical bars. The index portion 67*b* can be moved along the scale portion 67*a* by touching the scale portion 67*a* with a finger (touch operation) or by rotating and pressing the operation tool 57.

As shown in FIG. 2, when the current setting value is "setting A", the setting value can be made smaller by moving the index portion 67*b* to the left than "setting A", and the setting value can be smaller than "setting value A". The set value can be increased by moving the index portion 67*b* to the right.

The numerical value display portion 67*c* is a portion that displays the value (set value) instructed by the index portion 67*b* in numbers. The setting input portion 67 preferably includes a setting determination button 67*d*. When the setting input portion 67 includes the setting determination button 67*d*, when the setting determination button 67*d* is selected, the value indicated by the index portion 67*b* is determined as the setting value.

The setting input portion 67 can input setting information in a plurality of setting boxes 61 displayed on the setting viewer screen M1. When an arbitrary setting box 61 is selected among the plurality of setting boxes 61 displayed on the setting viewer screen M1, the setting input portion 67 can input the setting information corresponding to the selected box which is the selected setting box 61.

As shown in FIG. 2, in the setting viewer screen M1, the first setting box 61*a*, the second setting box 61*b*, the third setting box 61*c*, the fourth setting box 61*d*, the fifth setting box 61*e*, and the sixth setting box 61*f* are displayed. When the first setting box 61*a* is selected under the situation where the first setting box 61*a* is selected, the first setting box 61*a* is recognized as a selection box. As a result, the upper limit value of the prime mover revolving speed, which is a setting item of the first setting box 61*a*, can be input by the setting input portion 67.

When any of the second setting box 61*b*, the third setting box 61*c*, the fourth setting box 61*d*, the fifth setting box 61*e*, and the sixth setting box 61*f* is selected in the setting viewer screen M1, the setting information of the selected box (the second setting box 61*b*, the third setting box 61*c*, the fourth setting box 61*d*, or the fifth setting box 61) can be inputted.

That is, the setting input portion 67 is a part of the plurality of setting boxes 61 displayed on the setting viewer screen M1 in which the input interface of each setting box 61 is shared.

According to the above, when the setting value is input to the setting input portion 67 after the second setting box 61*b* is selected, the upper limit value of the vehicle speed can be set. If the setting value is input to the setting input portion 67 after the selection of the third setting box 61*c*, the first prime mover revolving speed can be set.

When the setting value is input to the setting input portion 67 after the fourth setting box 61*d* is selected, the second prime mover revolving speed can be set. When the setting value is input to the setting input portion 67 after the fifth setting box 61*e* is selected, the first vehicle speed can be set.

When the setting value is input to the setting input portion 67 after the sixth setting box 61*f* is selected, the second vehicle speed can be set. When the setting value is input to the setting input portion 67 after the seventh setting box 61*g* is selected, the height upper limit value can be set.

When a setting value is input to the setting input portion 67 after the eighth setting box 61*g* is selected, the rotation start height can be set. When the setting value is input to the setting input portion 67 after the ninth setting box 61*i* is selected, the rotation stop height can be set.

Note that, as described later, the rotation start height and the rotation stop height can be set on another screen.

As described above, the setting values set on the setting view screen M1 (upper limit value of prime mover revolving speed, upper limit value of vehicle speed, first prime mover revolving speed, second prime mover revolving speed, first vehicle speed, second vehicle speed, height upper limit, the rotation start height, and the rotation stop height) are stored in the storage portion 51 configured of a non-volatile memory or the like, as shown in FIG. 1C.

In this embodiment, the storage portion 51 is provided in the display device 50B. However, the storage portion 51 may be provided in the control device 40 or in both the display device 50B and the control device 40.

The setting input portion 67 is in an inactive state in which the input (acceptance) of the setting information can not be performed when the input (acceptance) of the setting information in the selected selection box among the plurality of setting boxes 61 can not be performed.

For example, in the case where either the control device 40 or the display device 50B does not permit the change of the setting information in the setting box 61 such as a case where the tractor 1 is driven and the tractor 1 is not stopped, the input (acceptance) of the setting information of the selection box is not permitted, or a case where the change of the setting information of the selection box is not permitted under predetermined conditions, the setting input portion 67 is in an inactive state.

In the inactive state, the setting input portion 67 can not move the index portion 67*b* at least with respect to the scale portion 67*a*.

On the other hand, when the setting input portion 67 can receive (input) setting information in the selected selection box among the plurality of setting boxes 61, the setting input portion 67 enters an active state in which the setting information can be input (accepted). When the setting input portion 67 is in the active state, the setting input portion 67 can move the index portion 67*b* with respect to the scale portion 67*a*.

Figure 4A:
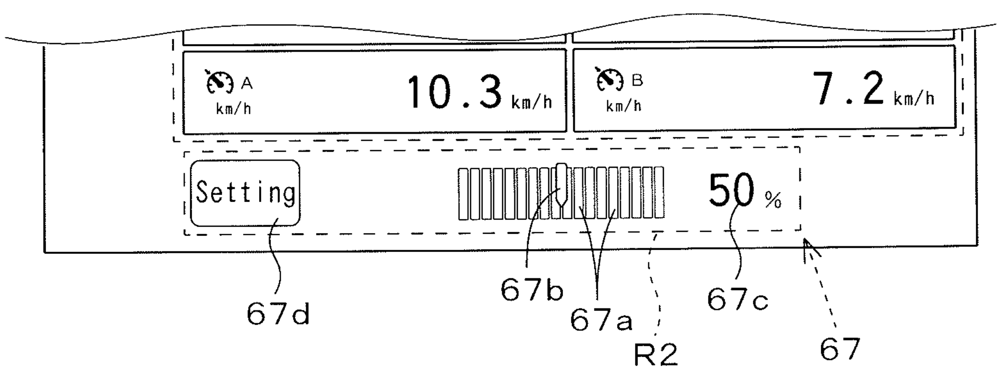
FIG. 4A is a view illustrating the setting viewer screen under a condition where a setting input portion is in an active state according to the embodiments.
Figure 4B:
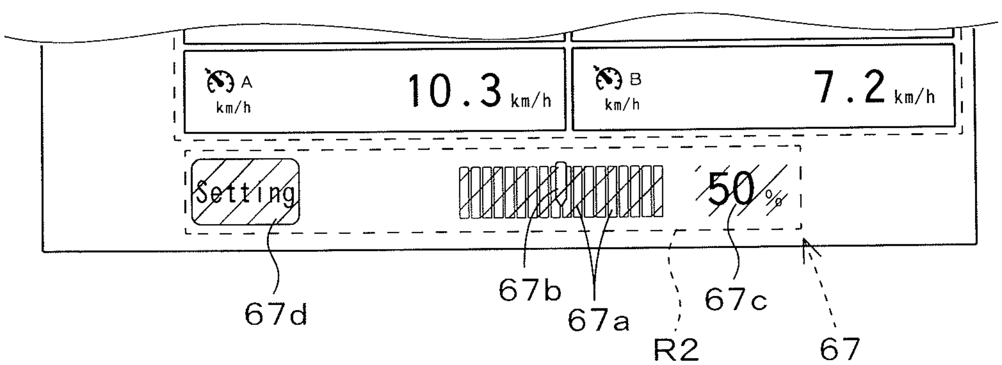
FIG. 4B is a view illustrating the setting viewer screen under a condition where the setting input portion is in an inactive state according to the embodiments.
Figure 4C:
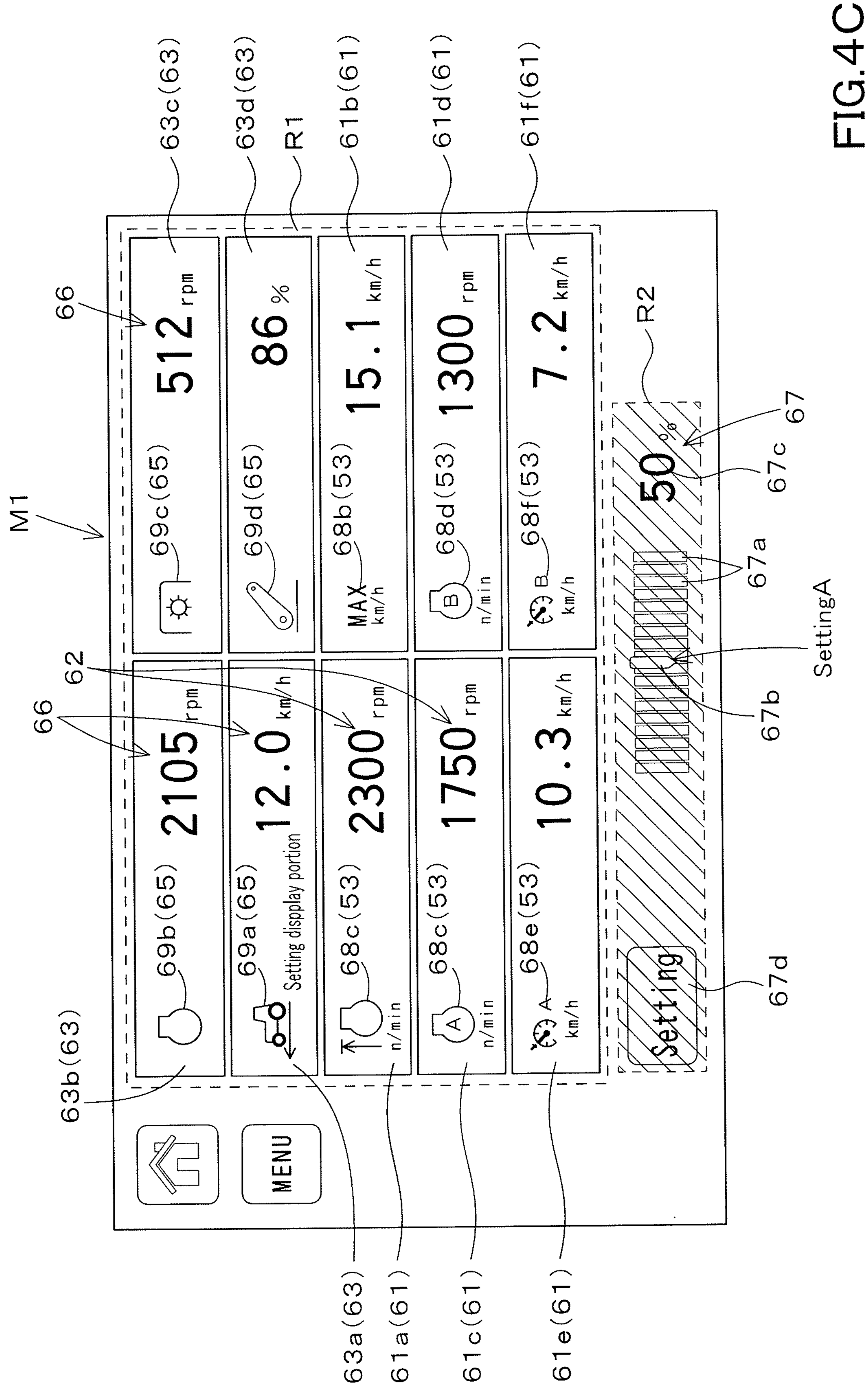
FIG. 4C is a view illustrating another setting viewer screen under the condition where the setting input portion is in the inactive state according to the embodiments.

The display device 50B makes the display form different between when the setting input portion 67 is in the active state and when it is in the inactive state. FIG. 4A to FIG. 4C show states in which the brightness is different as the display mode. In FIG. 4A to FIG. 4C, the hatching interval indicates the magnitude of the brightness, and the narrower the interval, the smaller the brightness.

As shown in FIG. 4A, for example, when setting the setting input portion 67 in the active state, the display device 50B sets the brightness of the setting input portion 67 to the same as the setting box 61 displayed on the setting viewer screen M1 (no hatching).

As shown in FIG. 4B, when setting the setting input portion 67 in the inactive state, the display device 50B makes the brightness of the setting input portion 67 lower than the setting box 61 displayed on the setting viewer screen M1 (with hatching). That is, in the active state, the setting input portion 67 makes the brightness higher than the brightness in the inactive state.

As shown in FIG. 4C, when the display device 50B places the setting input portion 67 in the inactive state, the brightness of the area R2 displaying the scale portion 67*a*, the index section 67*b*, and the numerical value display portion 67*c* is compared to the brightness of the area R1. If the setting input portion 67 is activated, the brightness of the area R2 is set to be substantially the same as the brightness of the area R1 (no hatching).

At this time, the setting input portion 67 can check the current setting information (the setting value of the numerical value display portion 67*c*) even in the inactive state. Here, the brightness of the setting input portion 67, that is, the brightness of the area R2 can be changed.

Figure 5:
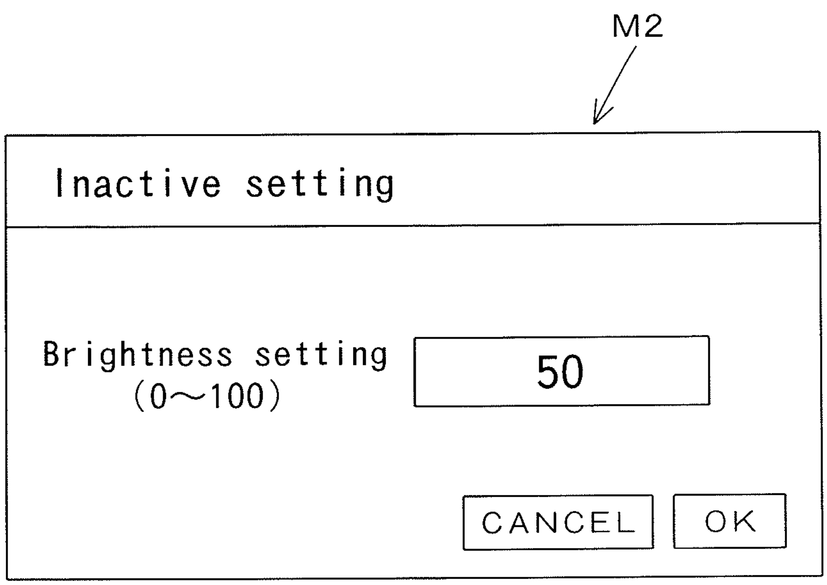
FIG. 5 is a view illustrating an embodiment of a brightness setting screen according to the embodiment.
Figure 6:
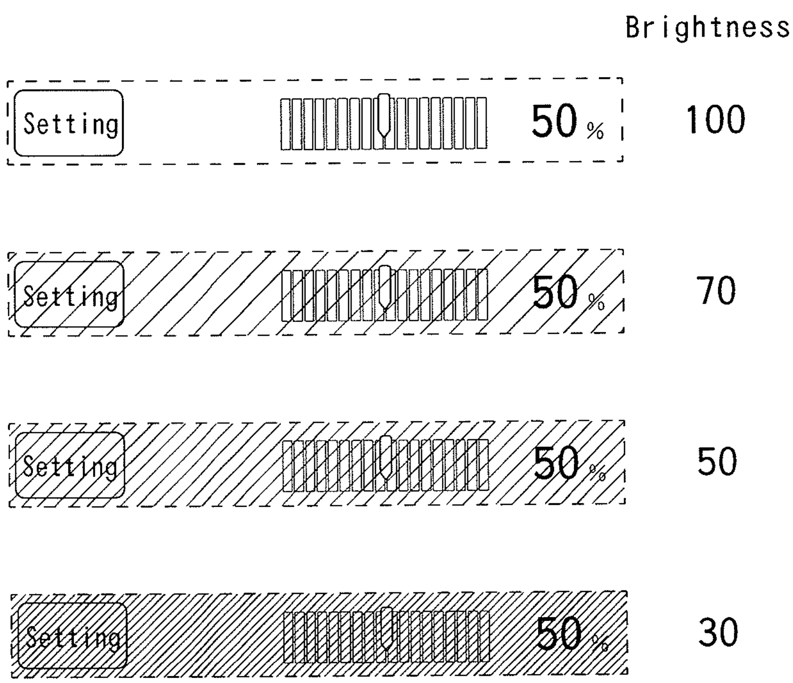
FIG. 6 is a view illustrating an example where brightness of the setting input portion (an area) is changed according to the embodiments.

As shown in FIG. 5, the brightness setting screen (second screen) M2 is displayed on the display device 50B by performing a predetermined operation. In the brightness setting screen M2, at least the brightness of the setting input portion 67 (area R2) can be set. As shown in FIG. 6, the display form of the inactive state in the setting input portion 67 can be changed by changing the brightness of the setting input portion 67 (area R2).

The display device 50B of the working machine is a setting box 61 including an item display portion 53 for displaying setting items related to the working machine 1 and a setting display portion 62 for displaying setting information of the setting items, and the display device 50B includes a plurality of setting boxes 61 to be displayed on the screen and a setting input portion 67 for inputting setting information corresponding to setting items of the plurality of setting boxes 61 in addition to the plurality of setting boxes 61.

According to this, since the setting input portion 67 corresponding to the plurality of setting boxes 61 is provided, the space (ratio) of the setting input portion 67 for inputting setting information for the screen can be reduced, and the setting boxes 61 can be displayed more on the screen.

The setting input portion 67 inputs setting information corresponding to the selection box which is the selected setting box 61 among the plurality of setting boxes 61. According to this, after the setting box 61 is selected, setting information is input to the setting input portion 67, whereby the setting information corresponding to the setting box 61 selected from among the plurality of setting boxes 61 can be changed.

Setting input portion 67 is in an active state in which setting information can be received when setting information can be received in selection box 61, and when setting information can not be received in selection box 61, the inactive state in which setting information cannot be received is established.

According to this, only in the state in which the setting can be performed, that is, in the state in which the setting information can be accepted, the active state is established, and thus the careless setting can be prevented.

The setting input portion 67 makes the display mode different between the active state and the inactive state. The operator (worker) or the like can easily know whether or not the setting information of the setting box 61 can be set simply by looking at the state of the setting input portion 67.

The setting input portion 67, as a display mode, makes the display brightness higher than the inactive state brightness in the active state. According to this, it can be easily known by the brightness of the display whether it is in the active state or the inactive state.

The setting input portion 67 displays current setting information when in the inactive state. According to this, the current setting information of the predetermined selection box 61 can be confirmed also in the predetermined selection box 61 in which the setting can not be performed in the inactive state.

The setting input portion 67 includes a scale portion 67*a* indicating the scale of the setting information, and an index portion 67*b* indicating the set information set in association with the scale portion 67*a*. According to this, it is easy to set the value of the setting information according to the relationship between the scale portion 67*a* and the index portion 67*b*.

The display device 50B can change a plurality of boxes (setting box 61, viewer box 63) displayed on the setting viewer screen M1. Hereinafter, the settings of the plurality of boxes displayed on the setting viewer screen M1 will be described in detail.

The setting of the plurality of boxes displayed on the setting viewer screen M1 is performed by the selection of the first identification information identifying the setting box 61 and the selection of the second identification information identifying the viewer box 63.

As shown in FIG. 1B, the storage portion 51 of the display device 50B is configured to store a plurality of first identification information identifying each of the plurality of setting boxes 61 and a plurality of second identification information identifying each of the plurality of viewer boxes 63.

As shown in FIG. 3, the storage portion 51 stores icons (symbol marks) indicating the setting boxes 61 as first identification information of the plurality of setting boxes 61.

For example, the storage portion 51 stores, as the first identification information, a first setting icon 68*a* for identifying the first setting box 61*a*, a second setting icon 68*b* for identifying the second setting box 61*b*, and a third setting box 61*c* for identifying the third setting box 61*c*, and a fourth setting icon 68*d* for identifying the fourth setting box 61*d*.

The storage portion 51 in addition stores, as the first identification information, a fifth setting icon 68*e* for identifying the fifth setting box 61*e*, a sixth setting icon 68*f* for identifying the sixth setting box 61*f*, and a seventh setting icon 68*g* for identifying a seventh setting box 61*g*, an eighth setting icon 68*h* for identifying an eighth setting box 61*h*, and a ninth setting icon 68*i* for identifying a ninth setting box 61*i*.

In addition, the storage portion 51 stores, as second identification information of the plurality of viewer boxes 63, icons (symbol marks) indicating the respective viewer boxes 63.

For example, the storage portion 51 stores, as second identification information, a first viewer icon 69*a* for identifying the first viewer box 63*a*, a second viewer icon 69*b* for identifying the second viewer box 63*b*, and a third viewer icon 69*c* for identifying a third viewer box 63*c*, and a fourth viewer icon 69*d* for identifying the fourth viewer box 63*d*.

The storage portion 51 in addition stores, as second identification information, a fifth viewer icon 69*e* for identifying the fifth viewer box 63*e*, a sixth viewer icon 69*f* for identifying the sixth viewer box 63*f*, a seventh viewer icon 69*g* for identifying a seventh viewer box 63*g*, and an eighth viewer icon 69*h* for identifying an eighth viewer box 63*h*.

The storage portion 51 in addition stores, as second identification information, a fifth viewer icon 69*e* for identifying the fifth viewer box 63*e*, a sixth viewer icon 69*f* for identifying the sixth viewer box 63*f*, a seventh viewer icon 69*g* for identifying the seventh viewer box 63*g*, and an eighth viewer icon 69*h* for identifying an eighth viewer box 63*h*.

The first setting portion 52*a* includes a plurality of first identification information, that is, a plurality of setting icons (a first setting icon 68*a*, a second setting icon 68*b*, a third setting icon 68*c*, a fourth setting icon 68*d*, and a fifth setting icon 68*e*). Of the sixth setting icon 68*f*, the seventh setting icon 68*g*, the eighth setting icon 68*h*, and the ninth setting icon 68*i*), the user is made to select any first identification information (icon).

The second setting portion 52*b* includes a plurality of second identification information, that is, a plurality of setting icons (a first viewer icon 69*a*, a second viewer icon 69*b*, a third viewer icon 69*c*, a fourth viewer icon 69*d*, a fifth viewer icon 69*e*, a sixth viewer icon 69*f*, the seventh viewer icon 69*g*, and the eighth viewer icon 69*h*), the user is allowed to select any second identification information (icon).

Figure 7A:
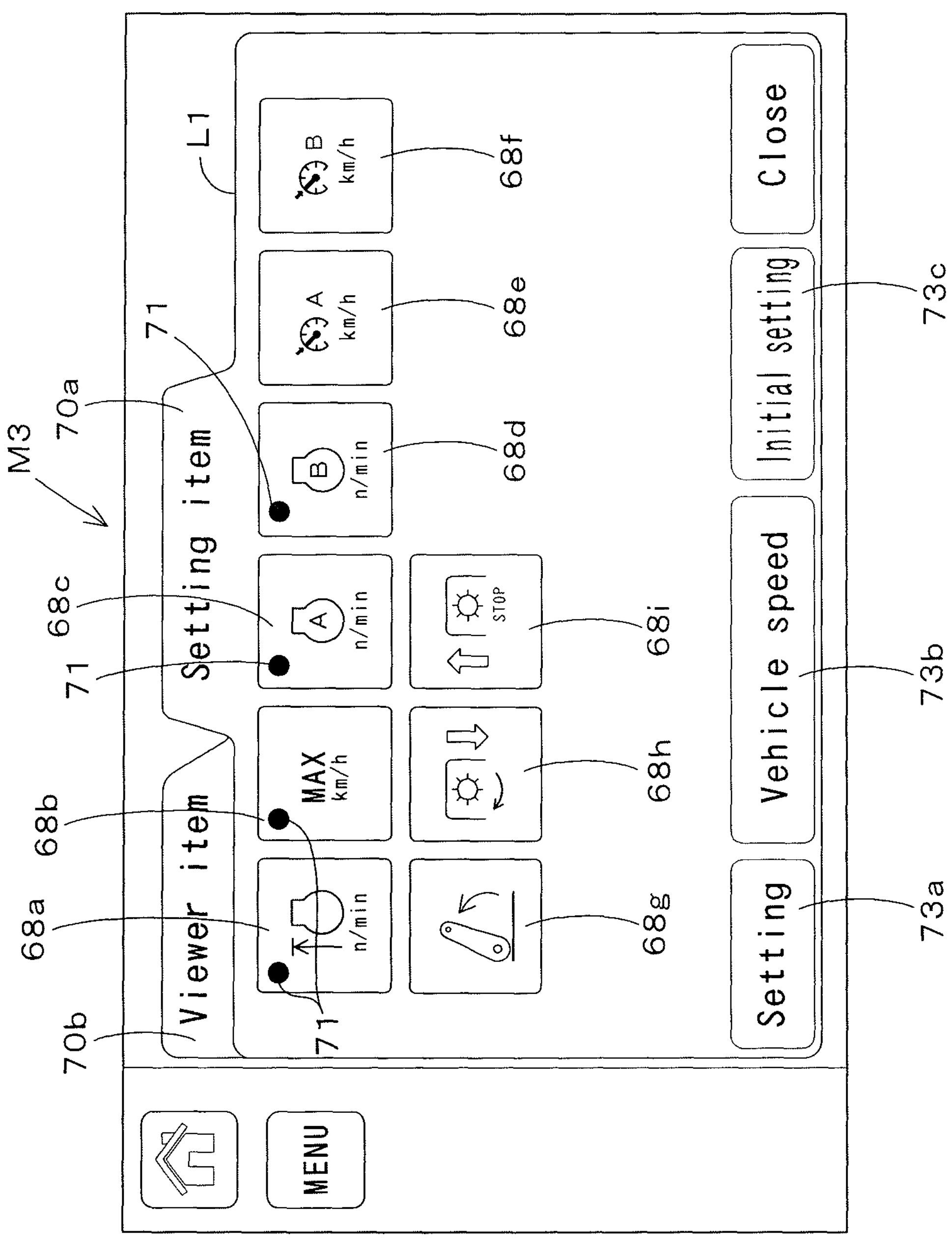
FIG. 7A is a view illustrating a registration screen of a case where a label of a setting item is selected according to the embodiments.
Figure 7B:
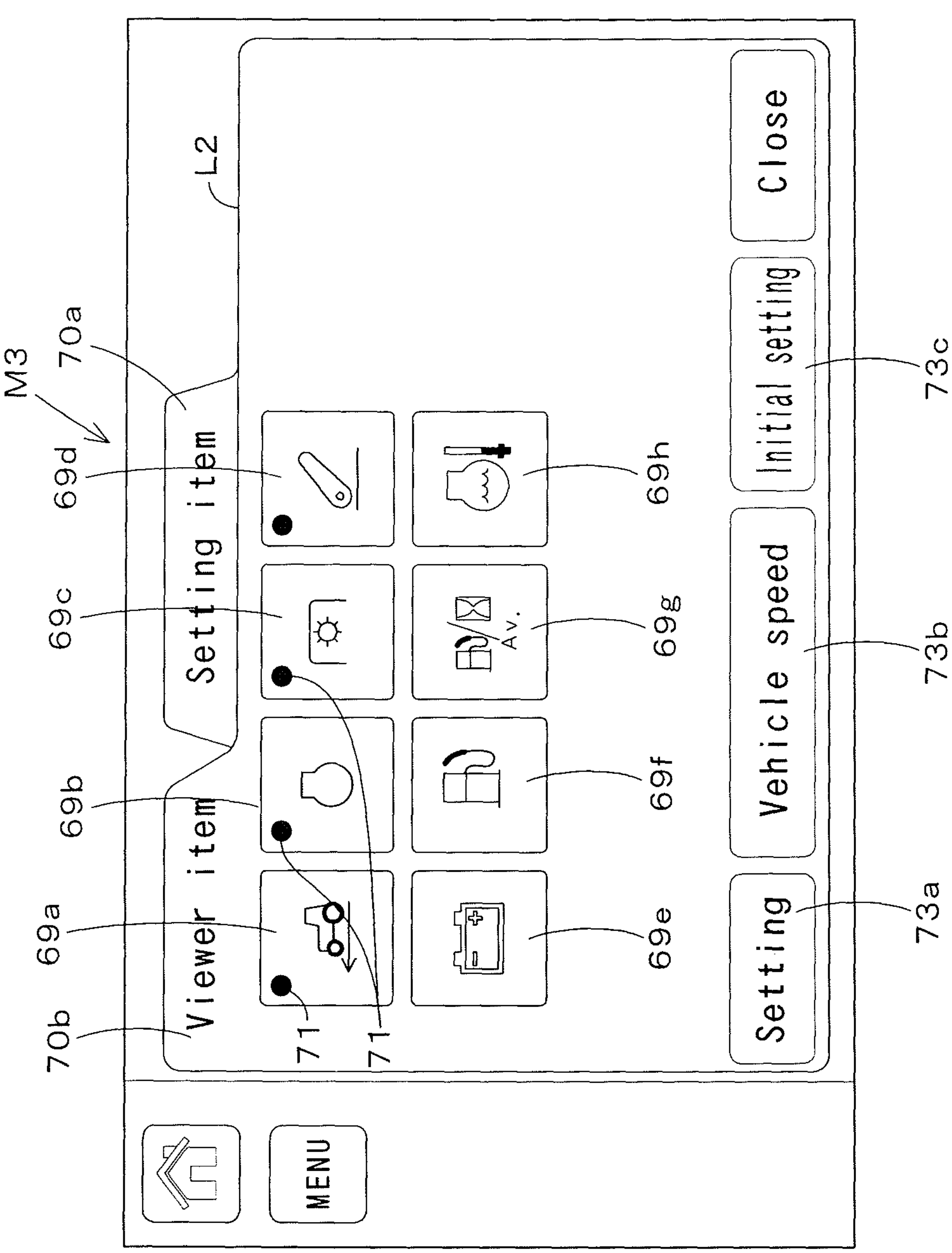
FIG. 7B is a view illustrating the registration screen of a case where a label of a viewer item is selected according to the embodiments.

As shown in FIG. 7A and FIG. 7B, when a predetermined operation is performed on the display device 50B, the display device 50B displays a registration screen (third screen) M3. In the registration screen M3, a label 70*a* for the setting item and a label 70*b* for the viewer item are displayed.

As shown in FIG. 7A, when the label 70*a* of the setting item is selected, the first setting portion 52*a* refers to the storage portion 51, and a plurality of setting icons corresponding to the plurality of setting boxes 61 stored in the storage portion 51, and calls the plurality of setting icons 68*a* to 68*i*. In addition, the first setting portion 52*a* displays the plurality of setting icons 68*a* to 68*i* which have been called, in a frame L1 following the label 70*a*.

In addition, the first setting portion 52*a* receives an arbitrary one of the plurality of setting icons 68*a* to 68*i* displayed on the registration screen M3 (inside the frame L1). For example, when one of the plurality of setting icons 68*a* to 68*i* is selected on the registration screen M3, the first setting portion 52*a* receives the selected setting icon. The first setting portion 52*a* displays on the setting icon received by the first setting portion 52*a* that the reception is completed.

When the first setting portion 52*a* receives the selection of the first setting icon 68*a*, the second setting icon 68*b*, the third setting icon 68*c*, and the fourth setting icon 68*d*, the selected setting is displayed as the indication that the reception is completed. The mark portion 71 is displayed superimposed on the icon.

In the registration screen M3, final determination after selection of a plurality of setting icons is performed by the setting button 73*a* displayed on the registration screen M3. In addition, when selecting a plurality of setting icons, the message portion 73*b* can display what the setting icons mean.

In addition, by selecting the initial setting button 73*c*, it is possible to automatically select a plurality of setting icons determined in advance by default.

As described above, when an arbitrary setting icon is selected from the plurality of setting icons by the first setting portion 52*a*, the setting box 61 corresponding to the selected arbitrary setting icon is registered as the setting box 61 to be displayed on the setting viewer screen M1.

That is, the setting box 61 corresponding to the setting icon whose acceptance has been completed by the first setting portion 52*a* is held as the setting box 61 to be displayed on the setting viewer screen M1.

As shown in FIG. 7B, when the label 70*b* of the viewer item is selected, the second setting portion 52*b* refers to the storage portion 51 and calls the plurality of viewer icons 69*a* to 69*h* corresponding to the plurality of viewer boxes 63 stored in the storage portion 51.

In addition, the second setting portion 52*b* displays the plurality of read viewer icons 69*a* to 69*h* in the frame L2 following the label 70*b*. In addition, the second setting portion 52*b* receives an arbitrary icon among the plurality of viewer icons 69*a* to 69*h* displayed on the registration screen M3 (inside the frame L2).

For example, when one of the plurality of viewer icons 69*a* to 69*h* is selected on the registration screen M3, the second setting portion 52*b* receives the selected viewer icon. The second setting portion 52*b* displays, on the viewer icon received by the second setting portion 52*b*, a message indicating that the acceptance has been completed.

When the second setting portion 52*b* receives the selection of the first viewer icon 69*a*, the second viewer icon 69*b*, the third viewer icon 69*c*, and the fourth viewer icon 69*d*, the selected icon is displayed as the indication that the reception is completed. And the mark portion 71 is displayed on the selected icon.

In the registration screen M3, final determination after selection of a plurality of viewer icons is performed by the setting button 73*a* displayed on the registration screen M3.

In addition, when a plurality of viewer icons are selected, the message portion 73*b* can display what the viewer icons mean. In addition, by selecting the initial setting button 73*c*, it is possible to automatically select a plurality of viewer icons determined in advance by default.

As described above, when any viewer icon is selected from the plurality of viewer icons by the second setting portion 52*b*, the viewer box 63 corresponding to the selected viewer icon is registered as the viewer box 63 to be displayed on the setting viewer screen M1.

That is, the viewer box 63 corresponding to the viewer icon whose acceptance has been completed by the second setting portion 52*b* is held as the viewer box 63 to be displayed on the setting viewer screen M1.

The display device 50B (the display portion 55) includes a setting box 61 corresponding to any first identification information selected by the first setting portion 52*a* among the plurality of setting boxes 61, and a second setting portion among the plurality of viewer boxes. The viewer box 63 corresponding to any second identification information selected by 52*b* is displayed on the setting viewer screen M1.

FIG. 8A and FIG. 8B show states in which icons (first identification information and second identification information) are selected on the registration screen M3. In the registration screen M3, numerical values (1, 2, 3 . . . ) shown in the mark section 71 indicate the order in which the icons are selected.

FIG. 8A and FIG. 8B show states in which icons (first identification information and second identification information) are selected on the registration screen M3. In the registration screen M3, numerical values (1, 2, 3 . . . ) shown in the mark section 71 indicate the order in which the icons are selected.

As shown in FIG. 8A, it is assumed that a second viewer icon 69*b*, a third viewer icon 69*c*, a first viewer icon 69*a*, a fourth viewer icon 69*d*, a first setting icon 68*a*, a second setting icon 68*b*, a third setting icon 68*c*, the fourth setting icon 68*d*, the fifth setting icon 68*e*, and the sixth setting icon 68*f* are selected in the order on the registration screen M3.

On the setting viewer screen M1, in the order of the icons selected in FIG. 8A, the second viewer box 63*b*, the third viewer box 63*c*, the first viewer box 63*a*, the fourth viewer box 63*d*, the first setting box 61*a*, the second setting box 61*b*, a third setting box 61*c*, a fourth setting box 61*d*, a fifth setting box 61*e*, and a sixth setting box 61*f* are displayed.

According to that, as shown in FIG. 2, the display device 50B (the display portion 55) can separately arrange the setting box 61 and the viewer box 63 in the setting viewer screen M1.

As shown in FIG. 8B, in the registration screen M3, a first viewer icon 69*a*, a second viewer icon 69*b*, a third setting icon 68*c*, a fourth setting icon 68*d*, a third viewer icon 69*c*, a second viewer icon 69*d*, a fifth setting icon 68*e*, the sixth setting icon 68*f*, the first setting icon 68*a*, and the second setting icon 68*b* can be selected in order.

Figure 9:
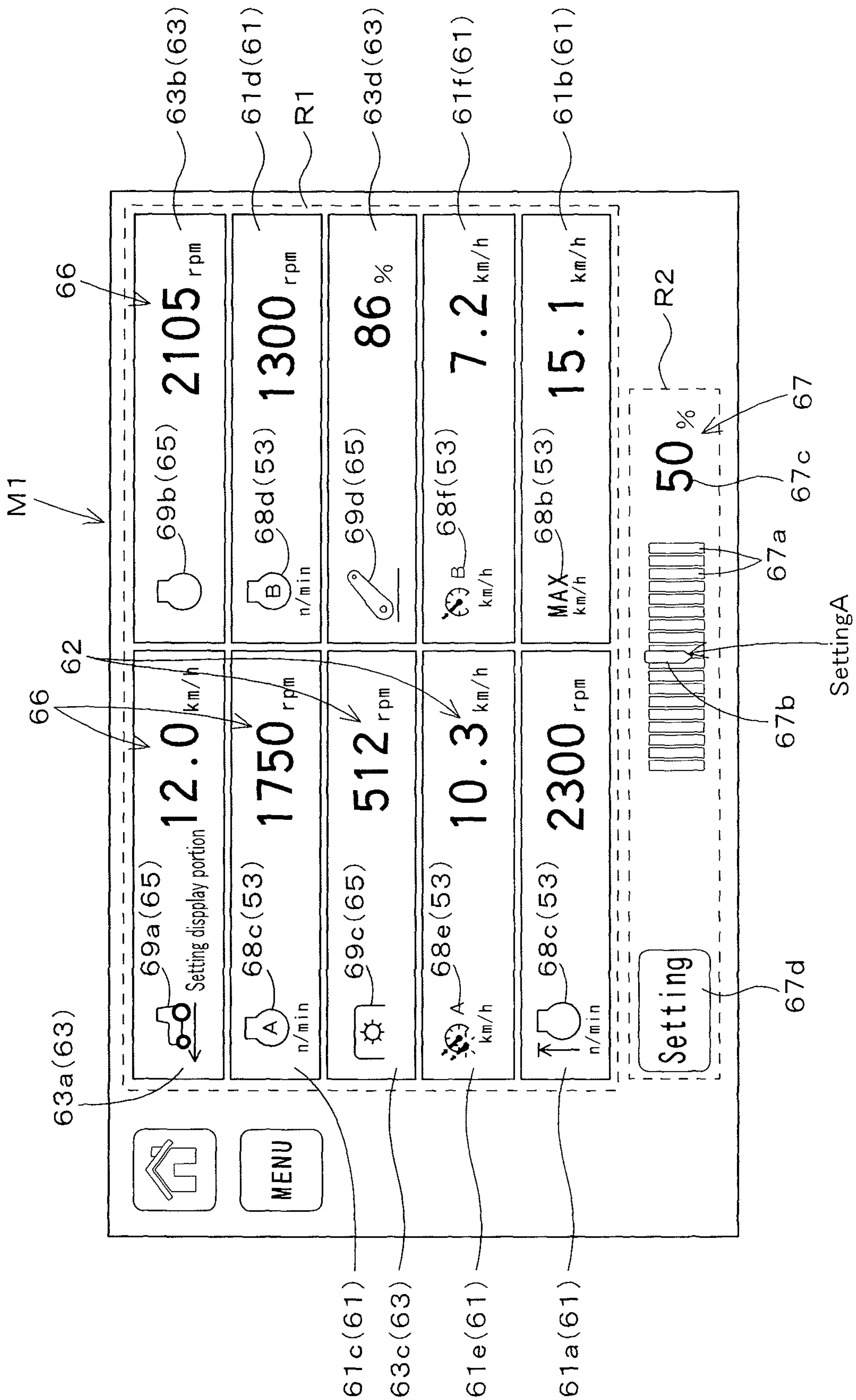
FIG. 9 is a view illustrating the setting viewer screen of the case where the icon is selected in the registration screen of FIG. 8B.

According to this, as shown in FIG. 9, the display device 50B (display portion 55) can arrange the order of the setting box 61 and the viewer box 63 on the setting viewer screen M1.

As described above, the display device 50B displays the detection information (detection value) detected by the detection device 41 as the state information of the tractor 1 by the viewer box 63. The viewing box 63 may display a detection value corresponding to a predetermined condition.

Figure 10:
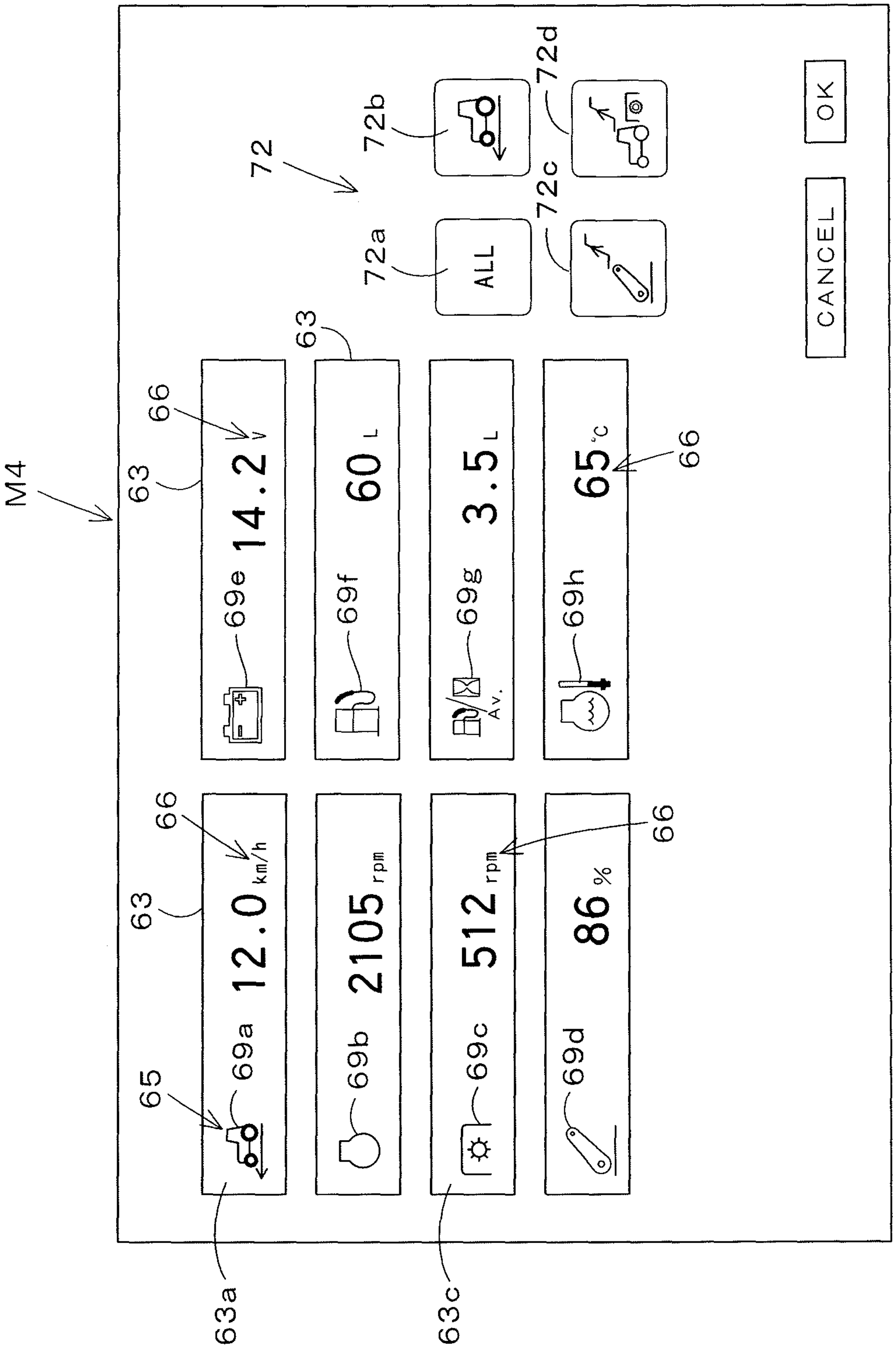
FIG. 10 is a view illustrating an example of a condition setting screen according to the embodiments.

As shown in FIG. 10, when a predetermined operation is performed on the display device 50B, the display device 50B displays a condition setting screen (fourth screen) M4 for setting conditions. In the condition setting screen M4, a plurality of viewer boxes 63 and a condition setting portion 72 are displayed.

The condition setting portion 72 is a portion capable of setting a condition for each of the plurality of viewer boxes 63. For example, when the viewer box 63 and the condition setting portion 72 are selected in the condition setting screen M4, the selected viewer box 63 displays detection information corresponding to the condition indicated by the condition setting portion 72 as the state of the tractor 1.

In particular, the condition setting portion 72 includes a first condition portion 72*a*, a second condition portion 72*b*, a third condition portion 72*c*, and a fourth condition portion 72*d*.

The first condition portion 72 *a* indicates a condition that the detection value detected by the detection device 41 is displayed on the viewing box 63 regardless of the state of the tractor 1.

Under the state where the tractor 1 is traveling (the vehicle speed is detected), the second condition portion 72*b* displays a condition that the detection value detected by the detection device 41 is held and the held detection value is displayed in the viewer box 63.

The third condition portion 72*c* indicates a condition that the detection value detected by the detection device 41 is held in a state in which the lifting device 8 of the tractor 1 is moving upward and downward (a state in which the working device 2 is moving upward and downward), and the held detection value is displayed in the viewing box 63.

The fourth condition portion 72*d* indicates a condition that the detection value detected by the detection device 41 is held in a state in which the PTO shaft 16 of the tractor 1 is rotating (a state in which the PTO revolving speed is detected), and displays the held detection value in the viewer box 63.

In other words, the first condition portion 72*a*, the second condition portion 72*b*, the third condition portion 72*c*, and the fourth condition portion 72*d* indicate conditions for holding the detection value.

For example, when the first viewer box 63*a* and the third condition portion 72*c* are selected on the condition setting screen M4, the vehicle speed detected by the speed sensor 41*h* (detection value) under the condition that the lifting device 8 is moving up and down is held, and the held vehicle speed is displayed in the first viewer box 63*a*.

In addition, when the third viewing box 63*c* and the first condition portion 72*a* are selected, the PTO revolving speed (detection value) detected by the PTO rotation sensor 41*i* is held under the situation where the tractor 1 is traveling, and the state of the tractor 1 is displayed in the third viewer box 63*c*.

In the embodiment described above, by arbitrarily selecting a plurality of setting icons and a plurality of viewer icons in the registration screen M3, in the setting viewer screen M1, in the order of the icons selected in the registration screen M3, the setting box 61, A viewing box 63 is displayed. In addition to this, after the icons are set on the registration screen M3, the positions of the boxes (setting box 61, viewer box 63) displayed on the setting viewer screen M1 may be automatically rearranged.

As shown in FIG. 2, on the setting viewer screen M1, for example, organizing buttons 202*a*, 202*b*, 202*c*, 202*d* and 202*e* are displayed. When the organizing button 202*a* is selected, the setting box 61 is aligned on the left side of the setting viewer screen M1, and the viewer box 63 is aligned on the right side.

When the organizing button 202*b* is selected, the setting box 61 is aligned on the right side of the setting viewer screen M1, and the viewer box 63 is aligned on the left side. When the arrangement button 202*c* is selected, the setting box 61 is aligned on the upper side of the setting viewer screen M1, and the viewer box 63 is aligned on the lower side. When the organizing button 202*d* is selected, the setting box 61 is arranged at the lower side of the setting viewer screen M1, and the viewer box 63 is arranged at the upper side.

When the organizing button 202 *e* is selected, the setting box 61 and the viewer box 63 are randomly arranged at an arbitrary position on the setting viewer screen M1. When the number of setting boxes 61 and the number of viewing boxes 63 are different, for example, a predetermined box is packed in a vacant space, such as shifting the box to the diagonal side of the screen.

The display device 50B of the working machine includes a storage portion 51 storing plural pieces of first identification information for identifying each of the plurality of setting boxes 61 for displaying setting information on the working machine and plural pieces of second identification information for identifying each of the plurality of viewer boxes 63 for displaying status on the working machine, the first setting portion 52*a* for selecting any first identification information from among the plurality of first identification information, the second setting portion 52*b* for selecting any second identification information from among the plurality of second identification information, and the display portion to display the setting box 61 corresponding to any first identification information selected by the first setting portion 52*a* from among the plurality of setting boxes 61 and display the viewer box 63 corresponding to any second identification information selected by the second setting portion 52*b* from among the information 63.

The display portion 55 can display the setting box 61 and the viewer box 63. According to this, the first setting portion 52*a* can select any first identification information among the plurality of first identification information, and the second setting portion 52*b* can select any second of the plurality of second identification information.

As the result, the setting box 61 corresponding to the selected first identification information and the viewer box 63 corresponding to the selected second identification information can be displayed. That is, while the setting information on the setting of the working machine and the state of the working machine can be displayed, the setting information displayed on the display portion 55 and the state of the working machine can be arbitrarily changed.

The first setting portion 52*a* displays a plurality of pieces of first identification information on the registration screen M3 and performs arbitrary reception of the plurality of pieces of displayed first identification information. The second setting portion 52*b* displays a plurality of pieces of second identification information on the registration screen M3 and performs arbitrary reception of the plurality of pieces of displayed second identification information.

The display portion 55 displays an optional setting box 61 corresponding to the first identification information received by the first setting portion 52*a*, and an optional viewer box 63 corresponding to the second identification information received by the second setting portion 52*b*.

According to this, on the registration screen M3, it is possible to easily receive arbitrary reception of a plurality of first identification information and a plurality of second identification information.

The display portion 55 displays that the acceptance is completed in the first identification information received by the first setting portion 52*a* among the plurality of first identification information, and displays that the acceptance is completed in the second identification information received by the second setting portion 52*b* among the plurality of second identification information.

According to this, it can be easily known whether acceptance of the setting box 61 and the viewer box 63 to be displayed has been performed.

The setting box 61 includes an item display portion 53 for displaying setting items related to the working machine, and a setting display portion 62 for displaying setting information corresponding to the setting item. A viewer box 63 includes an item display portion 65 for displaying the viewer item relating to the working machine, and includes a status display portion 66 for displaying the status of the working machine corresponding to the viewer item.

According to this, it is easy to comprehend the relationship between the setting item and the setting information simply by looking at the setting box 61, and it is easy to comprehend the relationship between the viewer item and the state of the working machine only by looking at the viewer box 63.

The plurality of viewer boxes 63 display the status of the working machine corresponding to the preliminarily set conditions. According to this, it is possible to confirm the state of the working machine under the preliminarily set conditions.

The display device 50B includes a condition setting portion 72 capable of setting conditions for each of the plurality of viewer boxes 63. According to this, it is possible to set conditions for each viewer box 63, that is, for each viewer item, and it is possible to display states corresponding to various conditions of the working machine.

The display device 50B can display the operating state of the operating portion (first operating portion) that operates based on the setting information. The operating portion is provided to the tractor 1 (traveling machine body 3). In this embodiment, the operating portion (first operating portion) will be described as the attitude changing device 25.

First, setting of setting information of the posture change device 25 and an operation of the posture change device 25 will be described.

Figure 11:
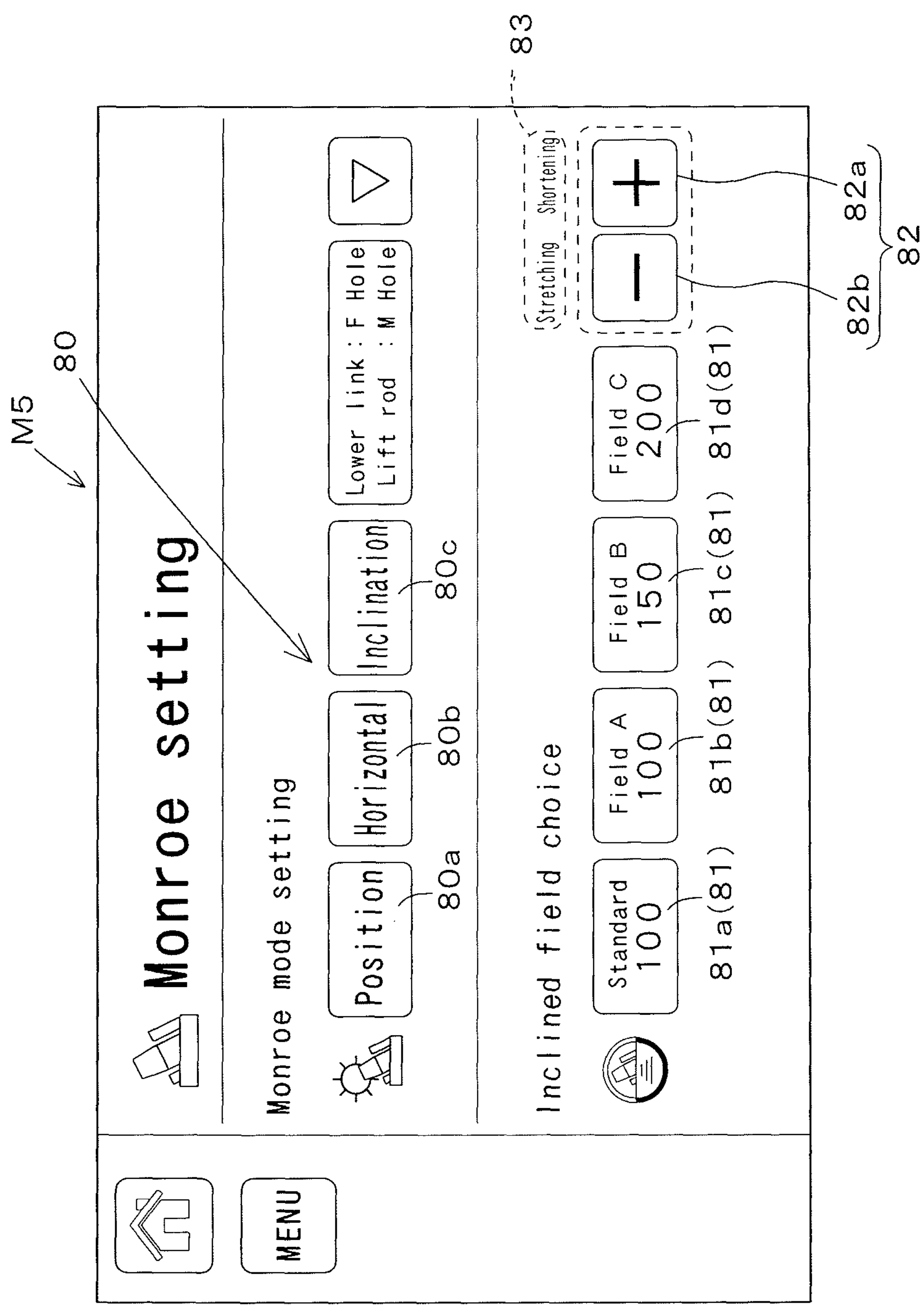
FIG. 11 is a view illustrating an example of a posture setting screen according to the embodiments.

As shown in FIG. 11, when a predetermined operation is performed on the display device 50B, the display device 50B displays a posture setting screen (fifth screen) M5. The display device 50B displays the mode setting portion 80 on the posture setting screen M5.

The mode setting portion 80 includes a first mode button 80*a*, a second mode button 80*b*, and a third mode button 80*c*. The first mode button 80 *a*, the second mode button 80*b*, and the third mode button 80*c* can be selected by a touch operation or an operation of the operation tool 57.

When the first mode button 80*a* is selected, the position mode (fixed mode) is set. When the second mode button 80*b* is selected, the horizontal mode is set. When selected, the third mode button 80*c* is set to the inclination mode.

In the position mode, the control device 40 fixes the length of the change cylinder 25*a* to a predetermined length by outputting a control signal to the control valve 25*b*. That is, the angle in the width direction of the working device 2 (the angle of the straight line connecting the lower link 8*a* and the lower link 8*b* with respect to the horizontal direction) set by the posture changing device 25 is fixed.

In the case of the horizontal mode, the control device 40 stretches and shortens the change cylinder 25*a* by outputting a control signal to the control valve 25*b*, and keeps the working device 2 set by the posture change device 25 horizontal.

In the case of the inclination mode, the control device 40 outputs the control signal to the control valve 25*b* to stretch or shorten the change cylinder 25*a* and maintains the working device 2 set by the posture change device 25 parallel to the field (ground).

The display device 50B displays a plurality of field selection portions 81 on the posture setting screen M5. The plurality of field selection portions 81 can also be selected by the touch operation or the operation of the operation tool 57, and setting information (setting value) is shown.

The setting values in the plurality of field selection portions 81 are values indicating the responsiveness when expanding and contracting the change cylinder 25*a*, and are, for example, values of the responsiveness (control gain) of the expansion and contraction operation.

In the plurality of field selection portions 81, the larger the set value is, the higher the responsiveness of the change cylinder 25*a* (the more sensitive movement) is, and the smaller the set value is, the lower the responsiveness of the change cylinder 25*a* (the insensitiveness) is.

The plurality of field selection portions 81 are a first field selection portion 81*a*, a second field selection portion 81*b*, a third field selection portion 81*c*, and a fourth field selection portion 81*d*. The setting value of the first field selection portion 81*a* is a default value, and is set to the default value when the first field selection portion 81*a* is selected.

The second field selection section 81*b* shows the setting value corresponding to the first field (field A), the third field selection section 81*c* shows the setting value corresponding to the second field (field B), and the fourth field selection portion 81*d* shows the setting values corresponding to the third field (field C).

When one of the second field selection portion 81*b*, the third field selection portion 81*c*, and the fourth field selection portion 81*d* is selected, the setting value of the selected field selection portion 81 is applied.

The display device 50B displays the setting input portion 82 on the posture setting screen M5. The setting input portion 82 is a part that changes (inputs) setting values of the plurality of field selection portions 81. The setting input portion 82 includes an increase input portion 82*a* and a decrease input portion 82*b*.

The increase input portion 82 *a* is a portion that increases the setting value of the plurality of field selection portions 81. The reduction input portion 82 *b* is a portion that decreases the set values in the plurality of field selection portions 81.

In particular, when the increase input portion 82*a* is selected in a state in which any of the second field selection portion 81*b*, the third field selection portion 81*c* and the fourth field selection portion 81*d* is selected, the setting value of the selected field selection portion 81 is increased.

When the reduction input portion 82*b* is selected in a state in which any of the second field selection portion 81*b*, the third field selection portion 81*c*, and the fourth field selection portion 81*d* is selected, the setting value of the selected field selection portion 81 is decreased.

Figure 12:
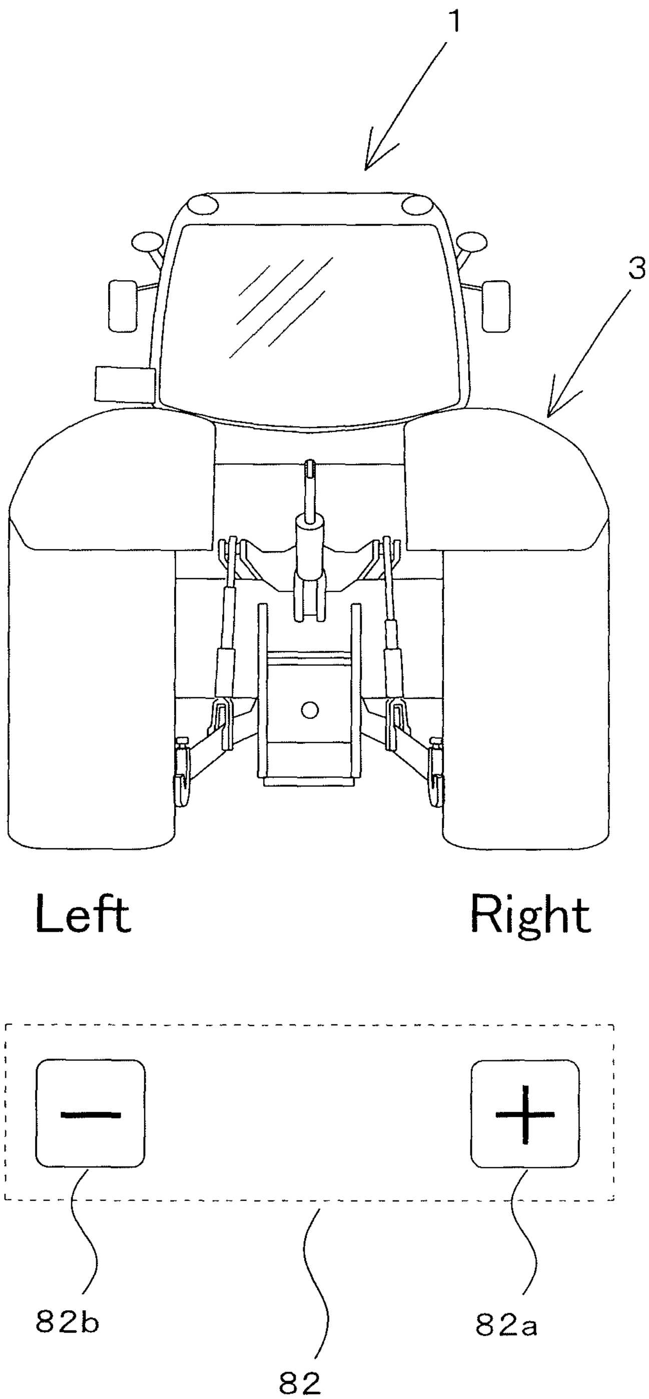
FIG. 12 is a view illustrating a positional relation between the setting input portion and a tractor (a machine body) according to the embodiments.

In addition, as shown in FIG. 12, the setting input portion 82 corresponds to the width direction of the tractor 1 (machine body 3), and the left portion of the setting input portion 82 corresponds to the left portion of the tractor 1 (machine body 3). The right portion of the setting input portion 82 corresponds to the right portion of the tractor 1 (machine body 3).

In addition, as shown in FIG. 12, the setting input portion 82 corresponds to the width direction of the tractor 1 (machine body 3), and the left portion of the setting input portion 82 corresponds to the left portion of the tractor 1 (machine body 3). The right portion of the setting input portion 82 corresponds to the right portion of the tractor 1 (machine body 3).

The display device 50B displays the operation display portion 83 on the posture setting screen M5. The operation display portion 83 is provided corresponding to the setting input portion 82, and changes the display of the operation mode of the posture changing device 25 based on the state of the tractor 1.

The operation display portion 83 changes the display based on the operation mode calculated by the calculation device. In this embodiment, the arithmetic portion is shared with the control portion 40. The calculation device and the control device 40 may be separate.

Hereinafter, assuming that the calculation device is shared by the control device 40, the operation mode and the display of the operation mode will be described.

The control device 40 (calculation device) calculates an operation mode based on the detection value of the inclination detection device 41*k* which is one of the detection devices 41. The inclination detection device 41*k* is provided on the machine body 3, and detects the inclination of the machine body 3 with respect to the horizontal direction.

The control device 40 (calculation device) calculates the operation mode of the posture change device 25 when the posture change device 25 is operated in the state of the inclination detected by the inclination detection device 41*k*.

That is, in the state where the control device 40 (calculation device) is the inclination detected by the inclination detection device 41*k*, any one of expansion and contraction of the change cylinder 25*a* when the inclination of the working device 2 is changed in a predetermined direction. The direction of the object is determined as the operation mode.

Figure 13A:
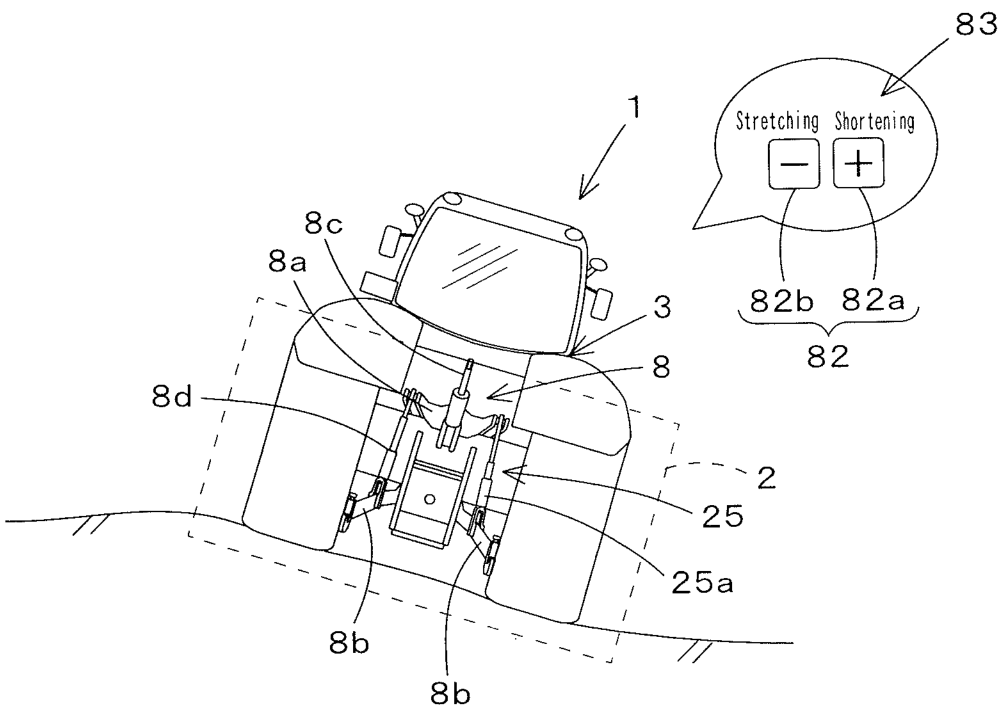
FIG. 13A is a view illustrating the tractor inclining rightward according to the embodiments.

As shown in FIG. 13A, when the right portion of the tractor 1 is lower than the left portion of the tractor 1, the working device 2 also becomes lower than the left portion. Here, when the working device 2 is kept horizontal by the horizontal mode, the change cylinder 25*a* of the posture change device 25 is stretched and the right portion of the working device 2 is raised.

As shown in FIG. 13A, when the inclination detecting device 41*k* detects that the right portion of the tractor 1 is falling (falling to the right) and the horizontal mode is set, the control device 40 (calculation device) calculates the movement mode in the direction of shortening the change cylinder 25*a*.

Thus, the control device 40 causes the operation display portion 83 on the side of the increase input portion 82*a* corresponding to the right portion of the tractor 1 (working device 2) to display "shortened" indicating that the change cylinder 25*a* is shortened, that is, to display "shortened" indicating the direction of the shortening.

In addition, the control device 40 causes the operation display portion 83 on the reduction inout portion 82*b* side corresponding to the left portion of the tractor 1 (working device 2) to display "stretched" which is opposite to the "shortened" of the change cylinder 25*a*.

Figure 13B:
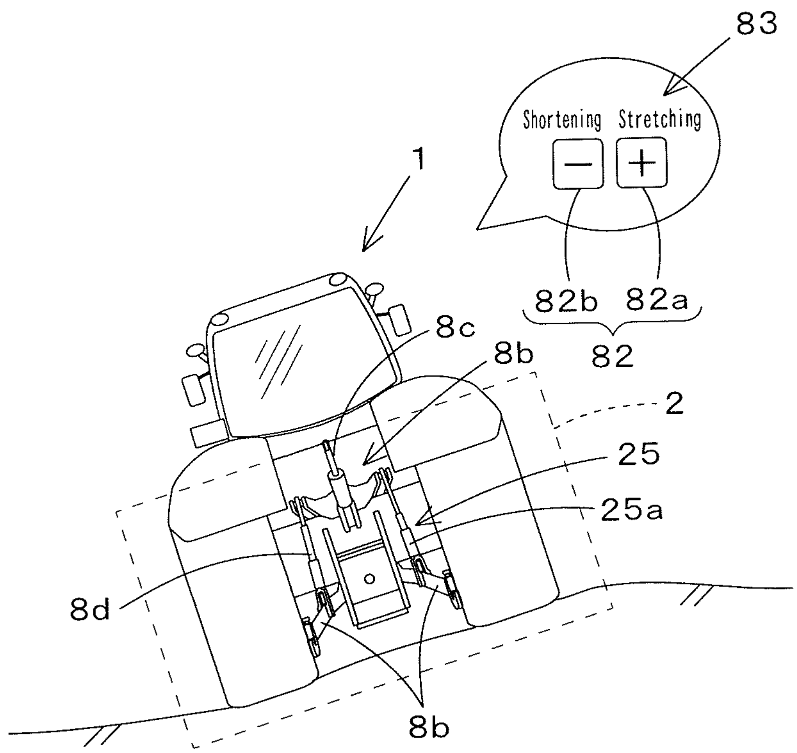
FIG. 13B is a view illustrating the tractor inclining leftward according to the embodiments.

In addition, as shown in FIG. 13B, in the case where the horizontal mode is set while the left portion of the tractor 1 (working device 2) is lower than the right portion of the tractor 1 (working device 2), the change cylinder 25*a* is extended, and the left portion of the working device 2 is raised.

As shown in FIG. 13B, when the inclination detecting device 41*k* detects that the left portion of the tractor 1 (working device 2) is down (downward left) and the horizontal mode is set, the control device 40 (an calculation device) calculates the movement mode in the direction of stretching the change cylinder 25*a*.

Thus, the control device 40 causes the operation display portion 83 on the side of the decrease input portion 82*b* "stretched" indicating that the change cylinder 25*a* is stretched, that is, to display "stretched" indicating the direction of the stretching.

In addition, the control device 40 causes the operation display portion 83 on the increase input portion 82*b* side corresponding to the right portion of the tractor 1 (working device 2) to display "shortened" which is opposite to the "stretched" of the change cylinder 25*a*.

That is, as described above, the operation display portion 83 switches and displays either the stretching or shortening direction according to the inclination of the tractor 1.

Figure 14A:
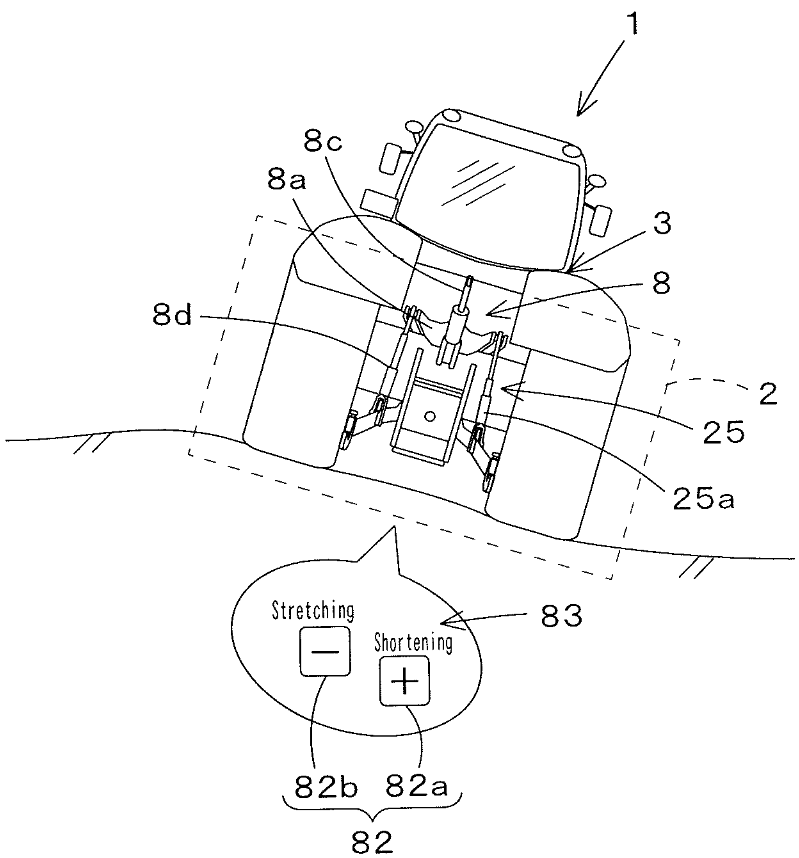
FIG. 14A is a view illustrating the setting input portion in a state where the tractor inclines rightward according to the embodiments.

The setting input portion 82 may change the display position to be displayed on the posture setting screen M5 according to the state of the tractor 1. As shown in FIG. 14A, when the tractor 1 is lowered to the right, the display position of the increase input portion 82*a* corresponding to the right portion of the tractor 1 is positioned below the decrease input portion 82*b* corresponding to the left portion of the tractor 1.

Figure 14B:
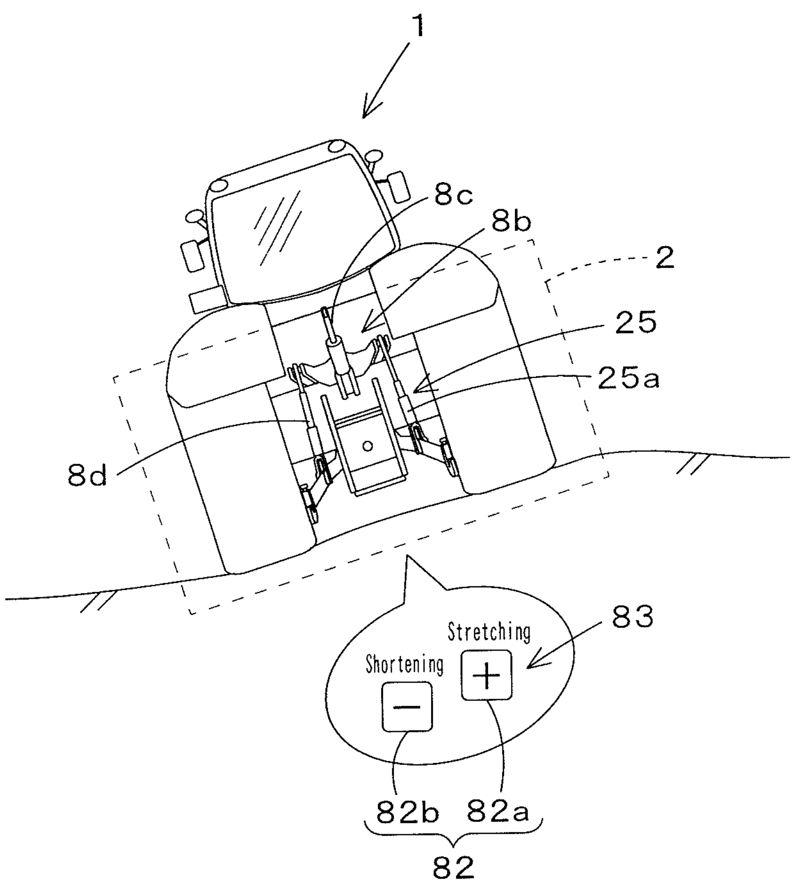
FIG. 14B is a view illustrating the setting input portion in a state where the tractor inclines leftward according to the embodiments.

In addition, as shown in FIG. 14B, when the tractor 1 is lowered to the left, the display position of the reduction input portion 82*b* corresponding to the left portion of the tractor 1 is lower than the increase input portion 82*a* corresponding to the right portion of the tractor 1. That is, the inclination of the tractor 1 may be indicated by the display position of the setting input portion 82 (the increase input portion 82*a*, the decrease input portion 82*b*) on the posture setting screen M5.

The working machine 1 includes the machine body 3, an operating portion (first operating portion) provided on the machine body 3 and operated based on the setting information, and the display device 50B having the setting input portion 82 for inputting the setting information and having the operation display portion 83 for displaying the operation mode of the operation portion, the operation display portion 83 being provided corresponding to the setting input portion 82. The operation display portion 83 changes the operation mode to be displayed based on the state of the machine body 3.

According to this, since the operation display portion 83 provided corresponding to the setting input portion 82 changes the operation mode based on the state of the machine body 3, the operation mode where the setting information is inputted to the setting input portion 82 can be easily known.

The working machine 1 has an inclination detection device 41*k* that detects the inclination of the machine body 3 as the state of the machine body 3 and an calculation device (control device 40) that calculates an operation mode based on the inclination detected by the inclination detection device 41*k*.

According to this, for example, in a situation where the machine body 3 is inclined, it is possible to easily know the operation mode of the operation portion when setting information is input.

The working machine 1 includes the working device 2 connected to the machine body 3, the operation portion has the posture change device 25 capable of changing the inclination of the working device 2. The calculation device (control device 40) calculates the operation mode of the posture change device 25 of the case where the posture change device 25 is operated at the inclination detected by the inclination detected at 41*k*.

According to this, it is possible to know the movement of the posture change device 25 when the setting information of the posture change device 25 is changed, for example, in a situation where the machine body 3 is inclined.

According to this, it is possible to know the movement of the posture change device 25 when the setting information of the posture change device 25 is changed, for example, in a situation where the machine body 3 is inclined.

According to this, when the setting information is changed in a state where the machine body 3 is inclined, it can be easily known whether the hydraulic cylinder (change cylinder 25*a*) extends in the direction of extension or in the direction of contraction.

The display device 50B changes the display mode of either the setting input portion 82 or the operation display portion 83 in accordance with the inclination of the machine body 3.

The setting input portion 82 includes an increase input portion 82*a* that increases a set value that is setting information, and includes a decrease input portion 82*b* that decreases a set value. The display device 50B changes the position between the increase input portion 82*a* and the decrease input portion 82*b* according to the inclination of the machine body 3.

According to this, it is possible not only to simply increase or decrease the setting value by the increase input portion 82*a* and the decrease input portion 82*b*, but also by looking at the positions of the increase input portion 82*a* and the decrease input portion 82*b* displayed on the display device 50. The inclined state of the machine body 3 can be easily known.

The setting input portion 82 includes an increase input portion 82*a* that increases the setting value, which is setting information, and a decrease input portion 82*b* that decreases the setting value. The operation display portion 83 alternately displays operation mode in which the setting value is inputted to the increase input portion 82*a* and the operation mode in which the set value is inputted to the decrease input portion 82*b*.

According to this, it is possible not only to simply increase or decrease the set value by the increase input part 82*a* and the decrease input part 82*b*, but also to easily know the inclined state of the machine body 3 by looking at the operation display part 83 displayed on the display device 50.

Now, the tractor 1 can automatically raise the working device 2 connected when the tractor 1 moves backward. For example, when reverse movement of the tractor 1 (the vehicle body 3) is detected by the speed sensor 41, the control device 40 causes the lifting device 8 to move upward by outputting a control signal to the control valve 34.

Figure 15:
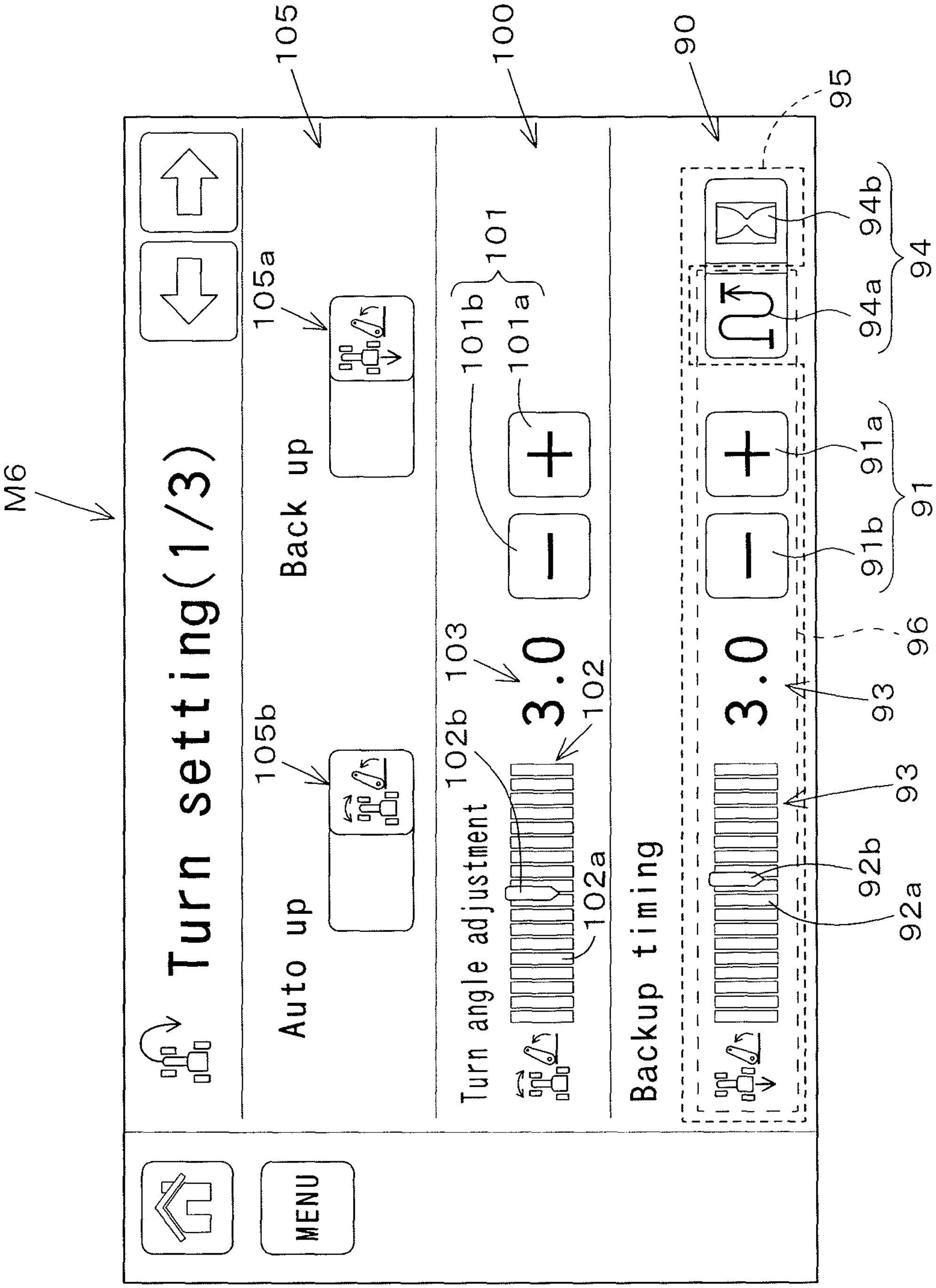
FIG. 15 is a view illustrating an example of a lift-up setting screen according to the embodiments.

As shown in FIG. 15, when a predetermined operation is performed on the display device 50B, the display device 50B displays a rising setting screen (sixth screen) M6. The elevation setting screen M6 is a screen for setting conditions for causing the lifting device 8 to automatically lift up.

The display device 50B displays the condition input portion 90 on the rising setting screen M6. The condition input portion 90 is a portion for inputting a condition under which the lifting device 8 automatically shifts to the lifting operation (automatic lifting operation) after the tractor 1 (machine body 3) moves backward.

More in particular, the condition input portion 90 is a portion that inputs a timing (backup timing) at which the automatic lifting operation is started after the tractor 1 starts reverse movement as a condition.

The condition input portion 90 includes a button input portion 91, a slide input portion 92, and a numerical value display portion 93. The button input portion 91 is a portion for inputting a condition by pressing operation, and includes an increase input portion 91*a* for increasing a condition set value indicating the condition, and a decrease input portion 91*b* for decreasing the condition set value.

The slide input portion 92 is a portion for inputting conditions by slide operation, and includes a scale portion 92*a* and an index portion 92*b*.

The scale portion 92*a* is a scale indicating the magnitude of the condition setting value in the setting information, and is configured, for example, by arranging a plurality of vertical bars (gauges) in the horizontal direction. In the scale portion 92*a*, one side in the parallel direction of the vertical bars, for example, the left side is the minimum value, and the other in the parallel direction, for example, the right side is the maximum value.

The index portion 92*b* is a part that indicates the condition setting value with respect to the scale portion 92*a*, and is movable along the parallel direction of the vertical bars. The index portion 92*b* can be moved along the scale portion 92*a* by a touch operation or the like.

In addition, the index portion 92*b* moves along the scale portion 92*a* in conjunction with the condition setting value input by the button input portion 91. For example, when the condition setting value is increased by the increase input portion 91*a*, the index portion 92*b* moves in the increasing direction along the scale portion 92*a*.

When the condition setting value is decreased by the decrease input portion 91*b*, the indicator 92*b* moves in the decreasing direction along the scale 92*a*. The numerical value display portion 93 displays the condition setting values set by the button input portion 91 and the slide input portion 92 in numbers.

The condition setting portion 90 has a portion setting portion 94 that sets a portion of the condition setting value. The portion setting portion 94 includes a distance setting portion 94*a* that sets a condition setting value as a distance, and a time setting portion 94*b* that sets a condition setting value as a time.

The distance setting portion 94*a* and the time setting portion 94*b* can be selected by the touch operation or the operation of the operation tool 57, and when the distance setting portion 94*a* is selected, the condition setting value becomes the distance, and when the time setting portion 94*b* is selected, the condition setting value is time.

For example, when either the button input portion 91 or the slide input portion 92 is operated in a state where the time setting portion 94*b* is selected, the condition setting value is set as the time (lifting start time) from the backward movement of the machine 3 to the start of the automatic lifting operation.

When one of the button input portion 91 and the slide input portion 92 is operated in a state where the distance setting portion 94*a* is selected, the condition setting value is set as the distance (lifting start distance) from the backward movement of the machine body 3 to the start of the automatic lifting operation.

That is, the input setting portion 90 has a distance input portion 95 for inputting a rise start distance and a time input portion 96 for inputting a rise start time.

In other words, when the distance setting portion 94*a* is selected, the button input portion 91, the slide input portion 92, and the numerical value display portion 93 are switched to the distance input portion 95. And, when the time setting portion 94*b* is selected, the button input portion 91, the slide input portion 92, and the numerical value display portion 93 are switched to the time input portion 96.

For example, under the state where the lifting start distance is set to "3.0 m" by the input setting portion 90, the lifting device 8 is moved by the lifting device 8 when it reaches a position 3.0 m ahead from the start position where the tractor 1 (machine body 3) starts backward traveling. The working device 2 can be automatically lifted from the current position.

In addition, under the state where the rising start time is set to "3.0 seconds" by the input setting unit 90, the lifting device 8 is moved by the lifting device 8 when 3.0 seconds have elapsed from the start time when the tractor 1 starts the backward traveling. The working device 2 can be automatically lifted from the current position.

In addition, the display device 50B displays the steering angle input portion 100 on the rising setting screen M6. The steering angle input portion 100 is a portion for inputting a steering angle as a condition for the lifting device 8 to shift to the automatic lifting operation. The steering angle input portion 100 is located in an area different from the input setting portion 90 on the rising setting screen M6.

The steering angle input portion 100 includes a button input portion 101, a slide input portion 102, and a numerical value display portion 103. The button input portion 101 includes an increase input portion 101*a* for increasing the set steering angle, that is, a portion for inputting a steering angle (set steering angle) by a pressing operation, and includes a decrease input portion 101*b* for reducing the set steering angle.

The slide input portion 102 is a portion for inputting a setting steering angle by a slide operation, and includes a scale portion 102*a* and an index portion 102*b*.

The scale portion 102*a* is a scale indicating the magnitude of the setting steering angle in the setting information, and is configured, for example, by arranging a plurality of vertical bars (gauges) in the horizontal direction. In the scale portion 102*a*, one side in the parallel direction of the vertical bars, for example, the left side is the minimum value, and the other in the parallel direction, for example, the right side is the maximum value.

The indicator portion 102*b* is a portion that indicates the set steering angle with respect to the scale portion 102*a*, and is movable along the parallel direction of the vertical bars. The indicator 102*b* can be moved along the scale 102*a* by touch operation or the like.

In addition, the index portion 102*b* moves along the scale portion 102*a* in conjunction with the set steering angle inputted by the button input portion 101. For example, when the setting steering angle is increased by the increase input portion 101*a*, the index portion 102*b* moves in the increasing direction along the scale portion 102*a*.

When the set steering angle is decreased by the decrease input portion 101*b*, the indicator 102*b* moves in the decreasing direction along the scale 102*a*. The numerical value display portion 103 displays the set steering angles set by the button input portion 101 and the slide input portion 102 in numbers.

For example, when the set steering angle is set to "15 degrees (deg)" by the steering angle input portion 100, the working device 2 can be raised automatically from the current position by the lifting device 8 when the steering angle of the tractor 1 (machine body 3) becomes equal to or greater than the set steering angle.

In addition, the display device 50B displays the switching portion 105 on the rising setting screen M6. It is a part that switches the automatic lifting operation of the lifting device 8 to be valid or invalid, and is configured by a graphic showing a switch.

The switching portion 105 can be switched ON or OFF by operation. When the switching portion 105 is ON, the automatic lifting operation is set to be valid, and when the switching portion 105 is OFF, the automatic lifting operation is set to be invalid.

The switching portion 105 has a first switch 105*a* that switches the automatic raising operation (first automatic raising operation) performed based on the condition setting value to be valid or invalid, and includes a second switch 105*b* for switching the automatic lifting operation (second automatic lifting operation) performed based on the set steering angle between valid and invalid.

The first switch 105 *a* can switch ON/OFF by sliding a figure such as an icon (symbol) on the rising setting screen M6. When the first switch 105*a* is ON and the first automatic raising operation is switched to be effective, the distance input portion 95 and the time input portion 96 are in an active state in which the input can be accepted.

In the active state, it is possible to input the condition setting value by the button input portion 91 and the slide input portion 92, and can input (change) the condition setting value by operating the increase input portion 91*a* and the decrease input portion 91*b*. By sliding the indicator part 92*b*, it is possible to input (change) the condition set value.

On the other hand, when the first switch 105*a* is turned off and the first automatic raising operation is switched to ineffective, the distance input portion 95 and the time input portion 96 are in an inactive state in which the input can not be accepted.

In the inactive state, it is impossible to input the condition setting value by the button input portion 91 and the slide input portion 92, and the increase input portion 91*a* and the decrease input portion 91*b* cannot be operated, and the indicator portion 92*b* cannot be slid.

In addition, the second switch 105*b* can also be switched ON/OFF by sliding a figure such as an icon (symbol) or the like on the rising setting screen M6. When the second switch 105*b* is ON and the second automatic raising operation is switched to be effective, the steering angle input portion 100 is in an active state in which the input can be accepted.

In the active state, the setting steering angle can be input by the button input portion 101 and the slide input portion 102, and the setting steering angle can be inputted (changed) by operating the increase input portion 101*a* and the decrease input portion 101*b*. The set steering angle can be inputted (changed) by sliding the indicator 102*b*.

On the other hand, when the second switch 105*b* is OFF and the second automatic raising operation is switched to ineffective, the steering angle input portion 100 is in an inactive state where reception of input cannot be performed.

In the inactive state, it is not possible to input the setting steering angle by the button input portion 101 and the slide input portion 102, and the increase input portion 101*a* and the decrease input portion 101*b* cannot be operated, and the indicator portion 102*b* cannot be slid.

Figure 31:
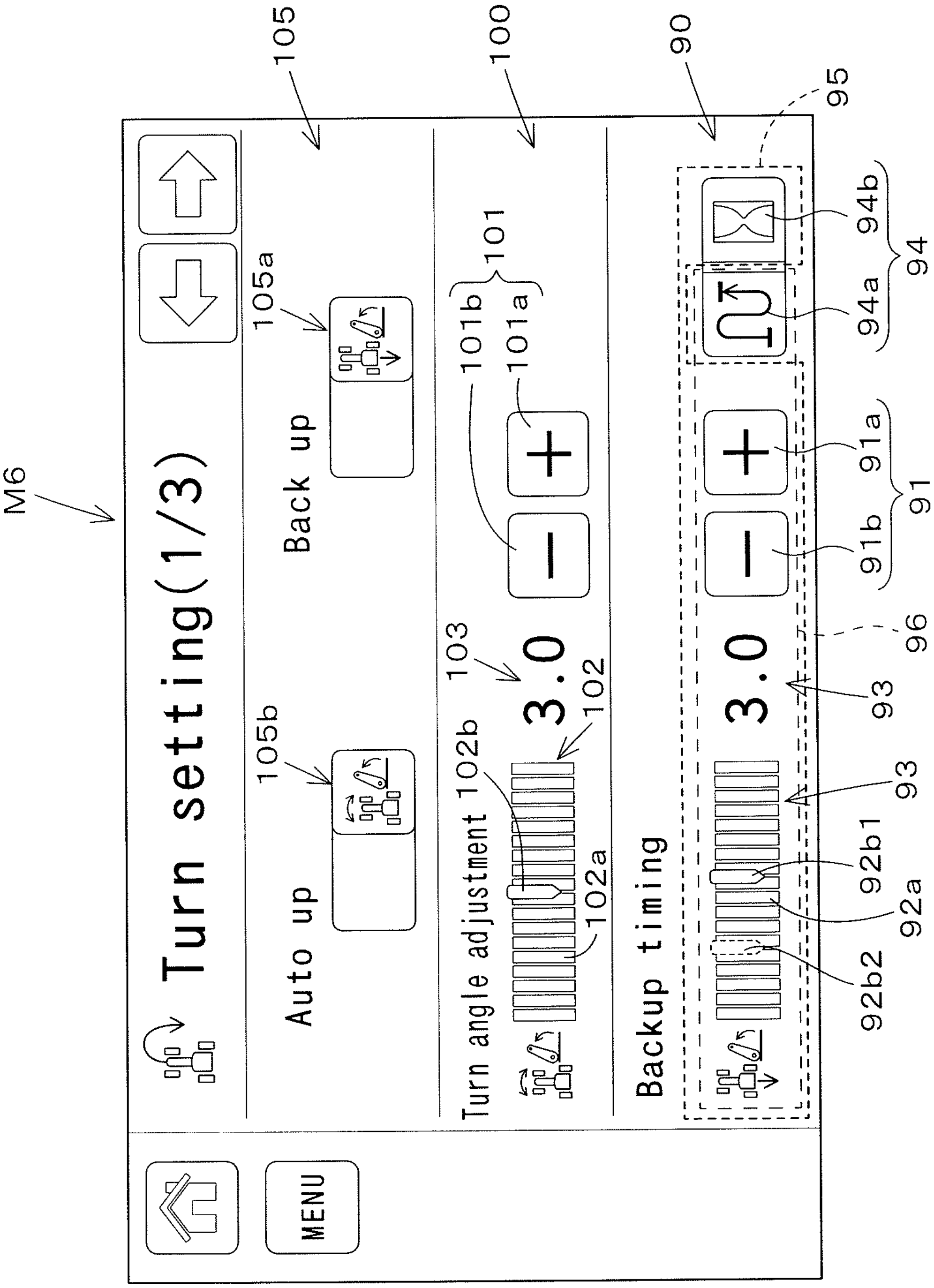
FIG. 31 is a view illustrating the lift-up setting screen in which a past condition setting value according to the embodiments.

It should be noted that the previous setting value may be displayed on the rising setting screen M6. As shown in FIG. 31, for example, the current condition set value is instructed to the scale portion 92*a* by the index portion 92*b*1, and the past condition set value is indicated to the scale portion 92*a* by the index portion 92*b*2.

In addition, the display of the condition setting value in the past is not limited to FIG. 31, and may be displayed by a numerical value or may be displayed by another method. According to this, when performing the condition setting, the operator or the like can confirm what the past condition setting value was.

The working machine 1 includes the machine body 3, the working device 2, the lifting device 8 to performs the lifting operation for lifting the working device 2 automatically when the backward traveling of the machine body 3 is detected, and a display device 50B capable of displaying a condition input portion 90 for inputting a condition for shifting to a lifting operation of the lifting device 8 after the backward traveling of the machine body 3.

According to this, since it is possible to input the conditions under which the lifting device 8 shifts to the lifting operation to the condition input portion 90, the working device 2 can be lifted automatically by the lifting device 8 at any timing after the machine body 3 moves backward. That is, according to the type of the working device 2 at the time of backward traveling of the machine body 3, the timing of lifting of the working device 2 can be changed arbitrarily.

That is, depending on the type of the working device 2, the working device 2 can be lifted at an appropriate position when the machine body 3 moves backward. For example, when the working device 2 is a plow, the tip of the plow is stuck in the field when advancing.

When switching from this state to reverse, the machine body 3 can move backward by a predetermined distance and can be raised at the point when the plow stab has been eliminated.

The condition input portion 90 has either one of a distance input portion 95 for inputting the distance from the backward traveling to the start of the lifting operation, and includes a time input portion 96 for inputting the time from the backward traveling of the machine body 3 to the start of the lifting operation.

According to this, the distance input portion 95 can set the distance from the start of reverse to the upward movement, and the time input portion 96 can easily set the time from the start of reverse to the upward movement.

The working machine 1 includes a steering device 11 for steering the vehicle body 3. The lifting device 8 performs an ascending operation based on the steering angle of the steering device 11. The display device 50B performs a steering operation in which the lifting device 8 shifts to an ascending operation. A steering angle input portion 100 for inputting a corner is provided.

According to this, it is possible to arbitrarily change the timing from the operation of the machine body 3 to the rising operation by the steering angle input to the steering angle input portion 100.

The display device 50B has a switching portion 105 that switches the lifting operation to valid or invalid. The distance input portion 95 and the time input portion 96 are in an active state in which the input can be accepted when the switching portion 105 is switched to be valid, and are in an inactive state in which the input cannot be accepted when the switching portion 105 is switched to be invalid.

According to this, the switching portion 105 can reflect the valid or invalid state of the ascending operation at the time of reverse movement on the distance input portion 95 and the time input portion 96. By looking at the distance input portion 95 and the time input portion 96, the worker can easily know whether or not the ascending operation at the time of reverse is enabled.

The steering angle input portion 100 is in an active state in which input can be accepted when the switching portion 105 is switched to be effective. In addition, the steering angle input portion 100 is in an inactive state in which the input can not be accepted when the switching portion 105 is switched to ineffective. According to this, it is possible to easily know the valid or invalid state of the raising operation at the steering angle by looking at the steering angle input portion 100.

The display device 50B can perform setting for associating the elevation height (height of the lift arm 8*a*) by the lifting device 8 with the drive of the PTO shaft 16, that is, PTO setting for the PTO shaft 16.

Figure 16:
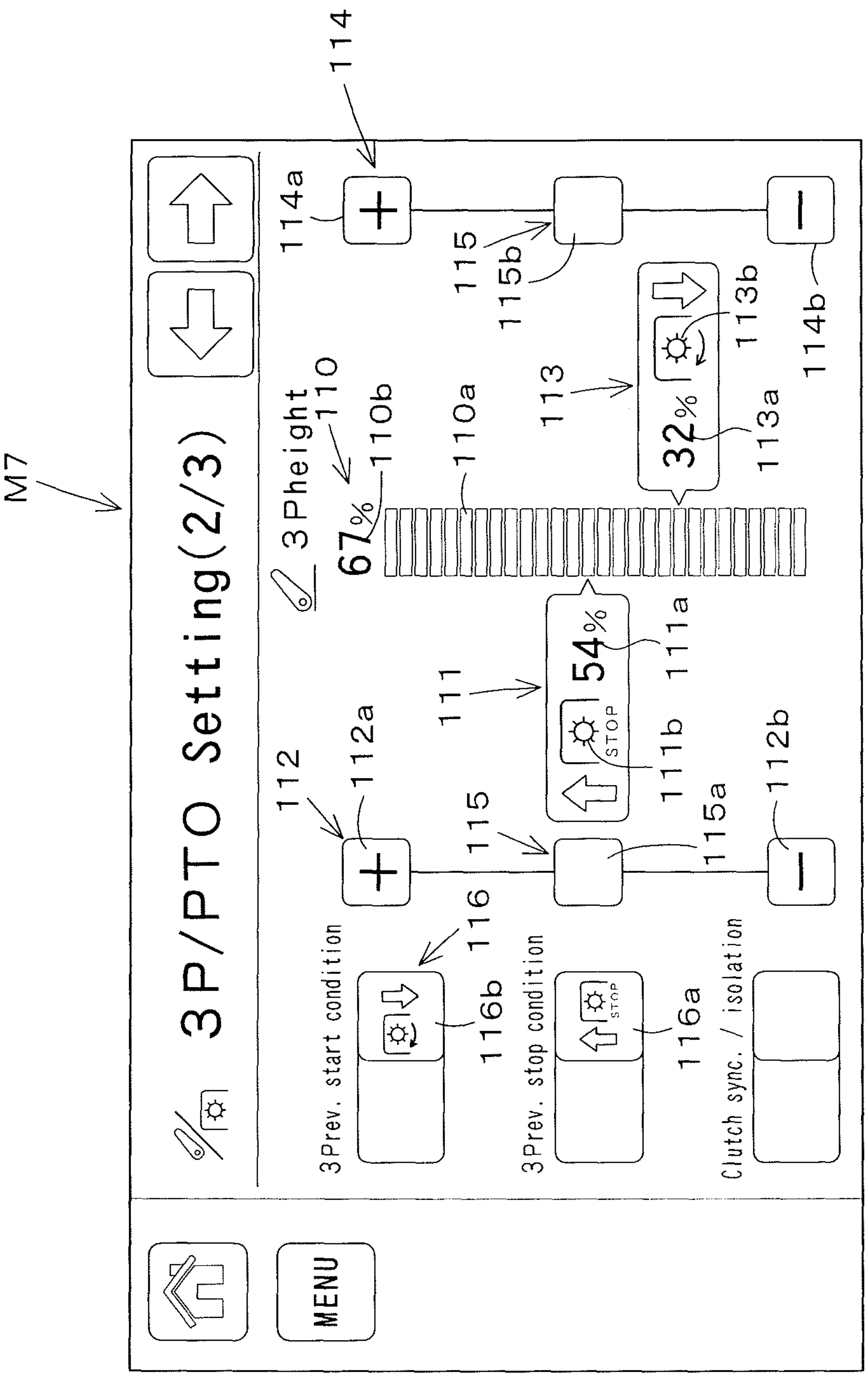
FIG. 16 is a view illustrating an example of a PTO setting screen according to the embodiments.

As shown in FIG. 16, when a predetermined operation is performed on the display device 50B, the display device 50B displays a PTO setting screen (seventh screen) M7 for performing PTO setting.

The display device 50B displays the height display portion 110 on the PTO setting screen M7. The height display portion 110 is a portion for displaying the elevation height (height of the lift arm 8*a*) by the lifting device 8.

The height display portion 110 includes a scale portion 110*a* and a numerical display portion 110*b*. The scale portion 110*a* is a scale indicating the size of the height of the lift arm 8*a*, and is configured, for example, by arranging a plurality of vertical bars (gauges) in the lateral direction.

In the scale portion 110*a*, one side in the parallel direction of the vertical bars, for example, the lower end is the minimum value, and the other in the parallel direction, for example, the upper end is the maximum value. The inside of the scale 110*a* is colored according to the current height of the lift arm 8*a*. The numerical value display portion 110*b* numerically displays the current height of the lift arm 8*a*.

In addition, the display device 50B displays the rising indicator portion 111, the first change display portion 112, the falling indicator portion 113, and the second change display portion 114 on the PTO setting screen M7.

The rising indicator portion 111 is a portion that indicates to the height display portion 110*a* height (rotation stop height) at which the rotation of the PTO shaft 16 is stopped when the lift arm 8 *a* is manually lifted. The rising indicator portion 111 is disposed on one side of the orthogonal direction orthogonal to the parallel direction of the scale portions 110*a*, for example, on the left side.

The lift index portion 111 includes a numerical display 111*a* displaying the height (rotation stop height) indicated by the lift index portion 111 in numbers and includes an icon 111*b* indicating that the rotation of the PTO shaft 16 is stopped when the lift arm 8*a* is manually lifted.

The first change display portion 112 is a portion that changes the position of the rising indicator portion 111 with respect to the height display portion 110, that is, the rotation stop height. The first change display portion 112 is disposed on the left side of the rising indicator portion 111. The first change display portion 112 includes an increase input portion 112*a* that increases the rotation stop height, and a decrease input portion 112*b* that decreases the rotation stop height.

The increase input portion 112*a* is disposed on the maximum value side of the scale portion 110*a* of the height display portion 110, and the decrease input portion 112*b* is disposed on the minimum value side of the scale portion 110*a* of the height display portion 110.

When the rotation stop height is increased by operating the increase input portion 112*a*, the increase indicator portion 111 moves to the maximum value side along the scale portion 110*a*. When the rotation stop height is reduced by operating the reduction input portion 112*b*, the rising indicator portion 111 moves to the minimum value side along the scale portion 110*a*.

According to the above, after setting the rotation stop height, the current height of the lift arm 8*a* is raised by the lift indicator portion 112 under a situation where the lift arm 8 is raised by manually operating the pompa switch 42*g* or the like. When it exceeds the rotation stop height indicated by, the rotation of the PTO shaft 16 is stopped by the control of the controller 40.

The lowering index portion 113 is a portion indicating the rotation start height at which the rotation of the PTO shaft 16 is started when the lift arm 8*a* is manually lowered, to the height display 110. The lowering index portion 113 is disposed on the other side of the orthogonal direction orthogonal to the parallel direction of the scale portions 110*a*, for example, on the right side.

The lowering index portion 113 includes the numerical display 113*a* displaying the height (rotation start height) indicated by the lowering index portion 113 in numbers, and includes an icon 113*b* indicating that the rotation of the PTO shaft 16 is started in the case of manually lowering the lift arm 8*a*.

The second change display portion 114 is a portion that changes the position of the lowering index portion 113 with respect to the height display portion 110, that is, the rotation start height. The second change display portion 114 is disposed on the right side of the lowering index portion 113.

The second change display portion 114 includes an increase input portion 114*a* that increases the rotation start height and a decrease input portion 114*b* that decreases the rotation start height. The increase input portion 114*a* is disposed on the maximum value side of the scale portion 110*a* of the height display portion 110, and the decrease input portion 114*b* is disposed on the minimum value side of the scale portion 110*a* of the height display portion 110.

When the rotation start height is increased by operating the increase input portion 114*a*, the lowering index portion 113 moves to the maximum value side along the scale 110*a*. When the rotation start height is decreased by operating the decrease input portion 114*b*, the lowering index portion 113 is moved to the minimum value side along the scale 110*a*.

According to the above, after setting the rotation start height, the current height of the lift arm 8*a* is the descent indicator portion 113 under the situation where the lift arm 8 is lowered by manually operating the pompa switch 42*g* and the like. When it falls below the rotation start height indicated by the arrow, rotation of the PTO shaft 16 is started by the control of the controller 40.

The display device 50B displays the PTO setting button 115. The PTO setting button 115 is a button that associates the current height of the lift arm 8*a* with the PTO setting. The PTO setting button 115 is a button which is displayed on the PTO setting screen M7 and can be selected.

When the PTO setting button 115 is selected, it is possible to set the rotation stop height indicated by the lifting index portion 111 to the current height of the lift arm 8*a*.

In addition, when the PTO setting button 115 is selected, it is possible to set the rotation start height indicated by the lowering indicator 113 to the current height of the lift arm 8*a*.

In particular, the PTO setting button 115 has a first height setting button 115 *a* and a second height setting button 115*b*. The first height setting button 115 *a* is disposed on the left side of the rising indicator portion 111 and between the increase input portion 112*a* and the decrease input portion 112*b*. The first height setting button 115*a* sets the current height of the lift arm 8*a* to the rotation stop height indicated by the lifting index portion 111.

When the current height of the lift arm 8*a* is set to the rotation stop height by the first height setting button 115*a*, the rising indicator portion 111 moves to a position corresponding to the rotation stop height in the scale portion 110*a*. In addition, the first height setting button 115*a* may move along the scale portion 110*a* corresponding to the current height of the lift arm 8*a*, or may be fixed at a predetermined position.

The second height setting button 115*b* is disposed on the right side of the lowering index portion 113 between the increase input portion 114*a* and the decrease input portion 114*b*. The second height setting button 115*b* sets the current height of the lift arm 8*a* to the rotation start height indicated by the lowering indicator 113.

When the current height of the lift arm 8*a* is set to the rotation start height by the second height setting button 115*b*, the lowering index portion 113 moves to a position corresponding to the rotation stop height of the scale 110*a*. In addition, the second height setting button 115*b* may move along the scale portion 110*a* corresponding to the current height of the lift arm 8*a*, or may be fixed at a predetermined position.

In addition, the display device 50B displays the switching portion 116 on the PTO setting screen M7. The switching portion 116 is a part that switches the operation of the PTO shaft 16 with respect to the height of the lift arm 8*a* to be valid or invalid, and is configured by a graphic showing a switch.

As described above, the operation of the PTO shaft 16 with respect to the height of the lift arm 8*a* is "the first PTO operation to stop the rotation of the PTO shaft 16 when the lift arm 8*a* is manually lifted", "the second PTO operation to start the rotation of the PTO shaft 16 when the lift arm 8*a* is manually lowered".

The switching portion 116 includes a first switch 116 *a* that switches the first PTO operation to be valid or invalid, and a second switch 116 *b* that switches the second PTO operation between to be valid or to be invalid.

The first switch 116*a* can be switched ON/OFF by sliding a figure such as an icon (symbol) on the PTO setting screen M7. Under the state where the first switch 116*a* is ON and the first PTO operation is effectively switched, the rotation of the PTO shaft 16 is automatically stopped when the height of the lift arm 8*a* exceeds the rotation stop height in the case where the lift arm 8*a* is manually raised.

When the first switch 116*a* is OFF and the first PTO operation is switched to ineffective, the height of the lift arm 8*a* exceeds the rotation stop height when the lift arm 8*a* is manually lifted even if it does not stop the rotation of the PTO shaft 16 automatically.

In addition, the second switch 116*b* can switch ON/OFF by sliding a figure such as an icon (symbol) on the PTO setting screen M7. When the second switch 116*b* is ON and the second PTO operation is switched effectively, the height of the lift arm 8*a* falls below the rotation stop height when the lift arm 8 is manually lowered. In this case, rotation of PTO shaft 16 is automatically started.

In addition, the second switch 116*b* can switch ON/OFF by sliding a figure such as an icon (symbol) on the PTO setting screen M7. Under the case where the second switch 116*b* is ON and the second PTO operation is switched effectively, the height of the lift arm 8*a* falls below the rotation stop height when the lift arm 8 is manually lowered. In this case, the rotation of PTO shaft 16 is automatically started.

The working machine 1 includes a machine body 3, a prime mover 4, a lift device 8 provided on the machine body 3 and having a lift arm 8*a* for moving the working device 2 up and down. And a display device for performing PTO setting on the PTO shaft 16 corresponding to the height of the lift arm 8*a*. The display device 50B displays a PTO setting button 115 that associates the current height of the lift arm 8*a* with the PTO setting.

According to this, when the PTO setting button 115 is operated, the actual position (the current height) of the lift arm 8*a* is associated with the PTO setting, so that the operation of the lift arm 8*a* can be performed simply by operating the PTO setting button 115. The current height can be reflected in the PTO setting.

The display device 50B includes a height display portion 110 for displaying the height of the lift arm 8*a*, and includes a lift indicator portion 111 for pointing the height display portion 110 to a height at which the PTO shaft 16 stops rotating when the lift arm 8*a* is lifted. When the PTO setting button 115 is selected, the display device 50B sets the height indicated by the rising indicator portion 111 with respect to the height display portion 110 to the current height of the lift arm 8*a*.

According to this, the current height of the lift arm 8*a* at the time when the PTO setting button 115 is selected can be set to the height at which the rotation of the PTO shaft 16 is stopped when the lift arm 8*a* is raised.

The display device 50B includes a height display portion 110 for displaying the height of the lift arm 8*a*, and includes a lowering indicator portion 113 for instructing the height display portion 110 to start rotating the PTO shaft 16 when the lift arm 8*a* is lowered. When the PTO setting button 115 is selected, the display device 50B sets the height indicated by the lowering index portion 113 with respect to the height display 110 to the current height of the lift arm 8*a*.

According to this, the current height of the lift arm 8*a* when the PTO setting button 115 is selected can be set to the height at which the rotation of the PTO shaft 16 is started when the lift arm 8*a* is lowered.

The display device 50B includes a height display portion 110 for displaying the height of the lift arm 8*a*, and a lowering indicator portion 113 for instructing the height display portion 110 to start rotating the PTO shaft 16 when the lift arm 8*a* is lowered.

The PTO setting button 115 includes a first height setting button 115*a* that sets the height indicated by the lifting index portion 111 with respect to the height display portion 110 to the current height of the lift arm 8*a*, and includes a second height setting button 115*a* that sets the height indicated by the lowering index portion 113 with respect to the height display portion 110 to the current height of the lift arm 8*a*.

According to this, when the first height setting button 115*a* is selected, the current height of the lift arm 8*a* can be set to a height at which the rotation of the PTO shaft 16 is stopped when the lift arm 8*a* is raised. When the second height setting button 115*b* is selected, the current height of the lift arm 8*a* can be set to a height at which the rotation of the PTO shaft 16 is started when the lift arm 8*a* is lowered.

In addition, by looking at the lifting index portion 111 and the falling indicator 113, the set height can be visually known.

The display device 50B has a first change display portion 112 that changes the height of the rising indicator portion 111 with respect to the height display portion 110. According to this, the height at which the rotation of the PTO shaft 16 is stopped when the lift arm 8*a* is raised can be easily set by the operation of the first change display portion 112.

The display device 50B includes a second change display portion 114 that changes the height of the lowering index portion 113 with respect to the height display portion 110. The height at which the rotation of the PTO shaft 16 is started when the lift arm 8*a* is lowered can be easily set by the operation of the second change display portion 114.

Figure 17:
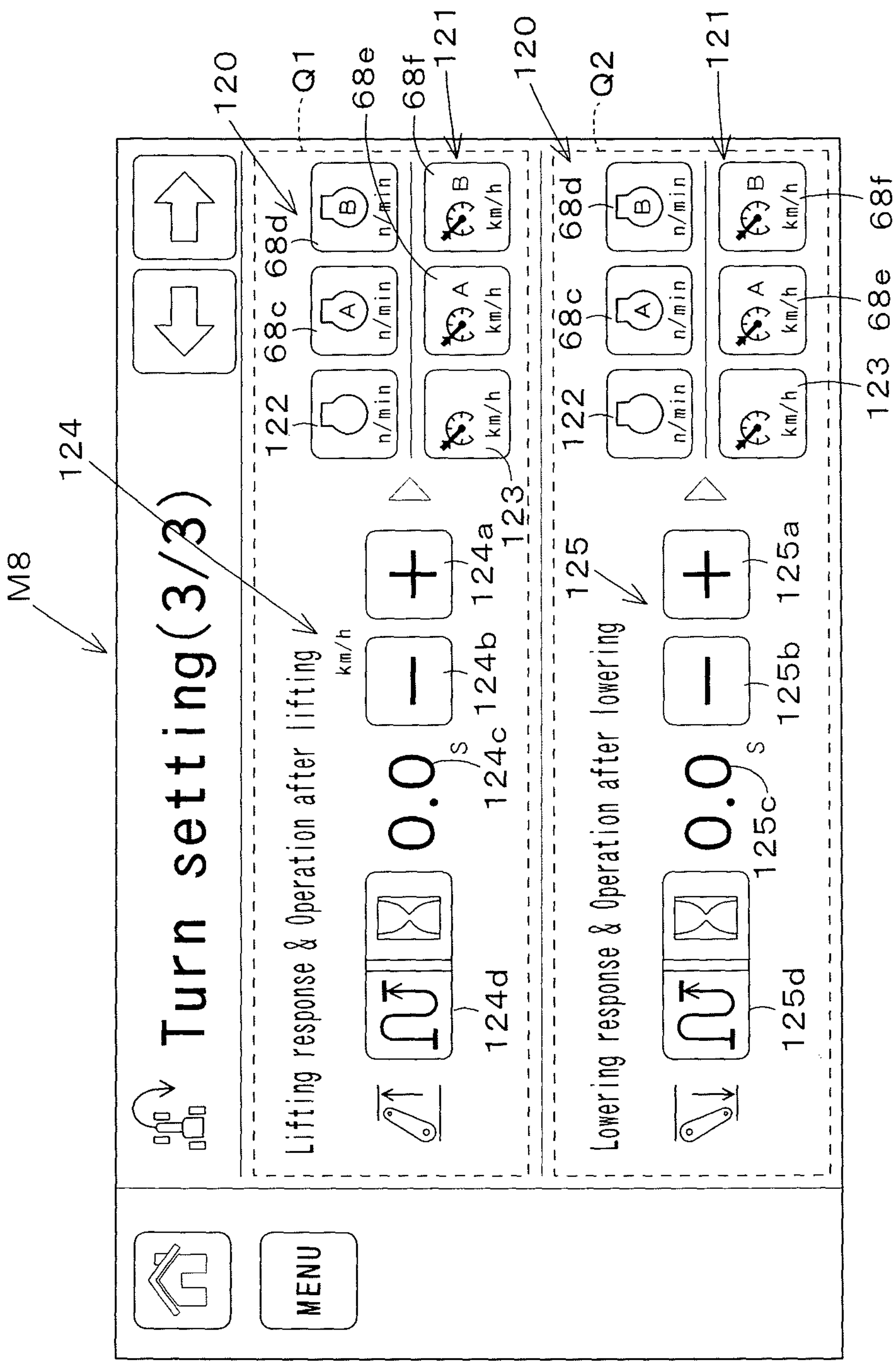
FIG. 17 is a view illustrating an example of a lifting setting screen according to the embodiments.

The display device 50B can set an operation after lifting and lowering in the lifting device 8. As shown in FIG. 17, when a predetermined operation is performed on the display device 50B, the display device 50B displays an elevation setting screen (eighth screen) M8 which can set an operation after the elevation.

In the elevation setting screen M8, it is possible to set an operation after the elevation when the operation member for operating the elevation of the lifting device 8, for example, the pompa switch 42*g*, is operated. The elevation setting screen M8 is divided into a first setting area Q1 and a second setting area Q2.

The first setting area Q1 is an area for setting an operation when the pompa switch 42*g* is operated to the side (raising side) to raise the lifting device 8. The second setting area Q2 is an area for setting an operation in the case where the pompa switch 42*g* is operated to the side (lowering side) in which the lifting device 8 is lowered.

In particular, in the first setting area Q1, the prime mover revolving speed and the vehicle speed can be set when the lifting device 8 is raised by the operation of the pompa switch 42*g*.

In addition, also in the second setting area Q2, it is possible to set the prime mover revolving speed and the vehicle speed when the lifting device 8 is lowered by the operation of the pompa switch 42*g*.

The display device 50B displays, on the elevation setting screen M8, a revolving speed setting portion 120 that sets the prime mover revolving speed and a speed setting portion 121 that sets the vehicle speed. In particular, the revolving speed setting portion 120 and the speed setting portion 121 are displayed in both the first setting area Q1 and the second setting area Q2.

The revolving speed setting portion 120 includes a plurality of prime mover icons. The plurality of prime mover icons are icons that can be selected by the touch operation or the operation of the operation tool 57 on the elevation setting screen M8, and are icons associated with the prime mover revolving speed stored in the storage portion 51.

In this embodiment, the plurality of prime mover icons are a third setting icon 68*c* associated with the first prime mover revolving speed, and a fourth setting icon 68*d* associated with the second prime mover revolving speed. Thus, when the third setting icon 68*c* is selected, the first prime mover revolving speed can be set, and when the fourth setting icon 68*d* is selected, the second prime mover revolving speed can be set.

In addition, the revolving speed setting portion 120 includes a prime mover manual icon 122 separately from the plurality of prime mover icons. The prime mover manual icon 122 is also an icon that can be selected and set to the prime mover revolving speed changed by the first change operation member. The first change operation member is an accelerator 42 *f* such as an accelerator pedal and an accelerator lever.

Thus, when the prime mover manual icon 122 is selected, the prime mover revolving speed (manual prime mover revolving speed) set by the accelerator 42 *f* can be set.

The speed setting portion 121 includes a plurality of speed icons. The plurality of speed icons are icons that can be selected by the touch operation or the operation of the operation tool 57 on the elevation setting screen M8, and are icons associated with the vehicle speed stored in the storage portion 51.

In this embodiment, the plurality of speed icons are a fifth setting icon 68*e* associated with the first vehicle speed and a sixth setting icon 68*f* associated with the second vehicle speed.

Thus, when the fifth setting icon 68*e* is selected, the first vehicle speed can be set, and when the sixth setting icon 68*f* is selected, the second vehicle speed can be set.

Also, the speed setting portion 121 includes a speed manual icon 123 separately from the plurality of speed icons. The speed manual icon 123 is also an icon that can be selected and set to the speed changed by the second change operation member. The second change operation member can be set to the vehicle speed (manual vehicle speed) set by the vehicle speed lever 42*i*.

The display device 50B displays the lifting condition input portion 124 in the first setting area Q1. The raising condition input portion 124 is a portion for inputting a condition (operating condition) under which the change of the prime mover revolving speed and the change of the vehicle speed are performed when the pompa switch 42*g* is operated to the rising side. The lifting condition input portion 124 is a portion for setting a time and a distance from when the pompa switch 42*g* is operated to the rising side until the change of the prime mover revolving speed and the change of the vehicle speed are performed.

The lifting condition input portion 124 includes an increasing input portion 124*a* for increasing the lifting condition setting value of time and distance, a decreasing input portion 124*b* for decreasing the lifting condition setting value, and a number display portion 124*c* for displaying the lifting condition setting value by numbers. In addition, the lifting condition input portion 124 includes a setting switching portion 124*d* that switches the lifting condition setting value to either time or distance.

Thus, after inputting the time or distance which is the lifting condition setting value to the lifting condition input portion 124, after operating the pompa switch 42*g* to the rising side, the actual number of rotations of the prime mover is set by the revolving speed setting portion 120. It is possible to set a time and a distance until changing to any one of the first prime mover revolving speed, the second prime mover revolving speed and the manual prime mover revolving speed.

In addition, by inputting the time or distance which is the lifting condition setting value to the lifting condition input portion 124, after operating the pompa switch 42*g* to the rising side, the actual vehicle speed of the tractor 1 (machine body 3) is set to the speed setting portion. It is possible to set a time or a distance until changing to any one of the first vehicle speed, the second vehicle speed, and the manual vehicle speed set in the speed setting portion 121.

In addition, the display device 50B displays the descent condition input portion 125 in the second setting area Q2. The descent condition input portion 125 is a portion for inputting a condition (operating condition) under which the change of the prime mover revolving speed and the change of the vehicle speed are performed when the pompa switch 42*g* is operated to the descent side. The descent condition input portion 125 is a portion for setting a time or a distance from when the pompa switch 42*g* is operated to the descent side until the change of the prime mover revolving speed and the change of the vehicle speed are performed.

The falling condition input portion 125 includes an increase input portion 125*a* that increases the falling condition setting value of time and distance, a decreasing input portion 125*b* that decreases the falling condition setting value, and a number display portion 125*c* that displays the falling condition setting value by numbers. In addition, the descent condition input portion 125 includes a setting switching portion 125*d* that switches the descent condition setting value to either time or distance.

Thus, after inputting the time or distance which is the descent condition setting value to the descent condition input portion 125, the pompa switch 42*g* is operated to the descent side, and then the actual number of revolutions of the prime mover is set by the revolution number setting portion 120. It is possible to set a time and a distance until changing to any one of the first prime mover revolving speed, the second prime mover revolving speed and the manual prime mover revolving speed.

In addition, by inputting the time or distance which is the descent condition setting value to the descent condition input portion 125, the actual vehicle speed of the tractor 1 (machine body 3) is set to the speed setting portion after the pompa switch 42*g* is operated downward. It is possible to set a time or a distance until changing to any one of the first vehicle speed, the second vehicle speed, and the manual vehicle speed set in the speed setting portion 121.

Now, as described above, the combination of the plurality of prime mover revolving speeds and the plurality of vehicle speeds can be set by selecting the plurality of prime mover icons of the revolution number setting portion 120 and selecting the plurality of speed icons of the speed setting portion 121.

Here, when a combination of a predetermined prime mover revolving speed among the plurality of prime mover revolving speeds and a predetermined vehicle speed among the plurality of vehicle speeds is not established, the display device 50B cannot select icons for which the combination is not established with each other.

In particular, when the first selection icon which is at least one of the plurality of prime mover icons is selected, the display device 50B can set the speed icon active, the speed icon being set corresponding to the first selection icon of the plurality of speed icons. In addition, the display device 50B inactivates the speed icon which cannot be set corresponding to the first selection icon.

Figure 18A:
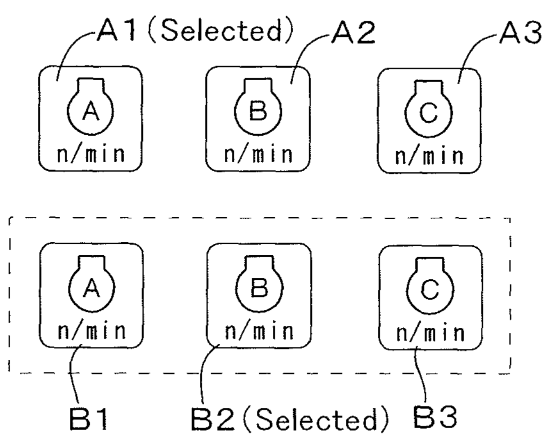
FIG. 18A is a view illustrating a state where a prime mover icon and a speed icon are displayed according to the embodiments.

As shown in FIG. 18A, it is assumed that the display device 50B displays the prime mover icons A1, A2 and A3 as the prime mover icons for setting the prime mover revolving speed, and displays the speed icons B1, B2 and B3 as the speed icons for setting the vehicle speed.

Here, in the case where any of the speed icons B1, B2 and B3 can be set when the prime mover icon A1 is the selected first selection icon, the display device 50B activates the speed icons B1, B2 and B3. In this case, any selection of the speed icons B1, B2 and B3 is accepted.

Figure 18B:
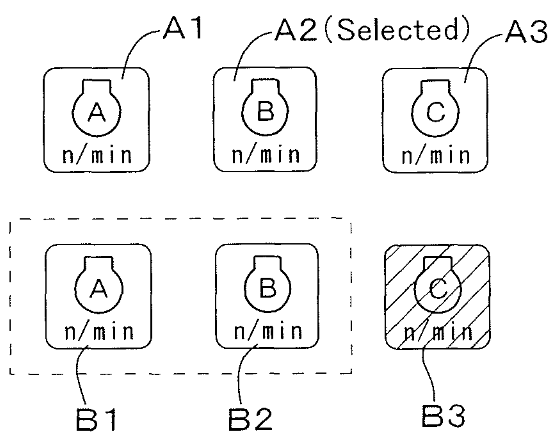
FIG. 18B is an explanation view explaining that the speed icon is in an inactive state according to the embodiments.

As shown in FIG. 18B, in the case where the speed icon B1 or B2 can be set and the speed icon B3 cannot be set when the prime mover icon A2 is the selected first selection icon, the display device 50B sets the speed icons B1 and B2 to be in the active state, the speed icon B3 is set to be in the inactive state, and thus the selection of the speed icon B3 is not accepted.

In addition, when the second selection icon, which is at least one speed icon, is selected among the plurality of speed icons, the display device 50B can select a prime mover icon that can be set corresponding to the second selection icon among the plurality of prime mover icons. In addition, the display device 50B deactivates the unsettable prime mover icon corresponding to the second selection icon.

Figure 18C:
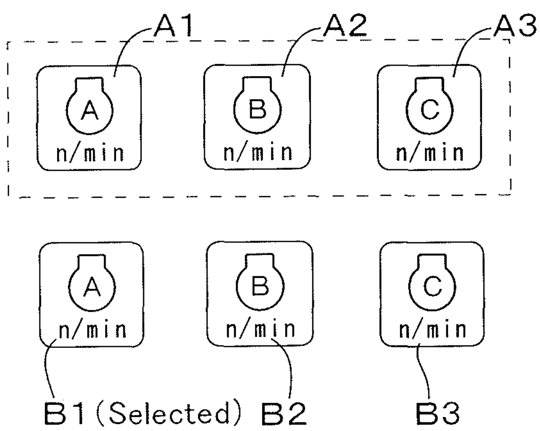
FIG. 18C is an explanation view explaining that the prime mover icon and the speed icon is in an active state according to the embodiments.

As shown in FIG. 18C, in the case where the display device 50B can set any one of the prime mover icons A1, A2, and A3 when the speed icon B1 is the selected second selection icon, the display device 50B is the prime mover. By activating the icons A1, A2 and A3, any selection of the prime mover icons A1, A2 and A3 is accepted.

Figure 18D:
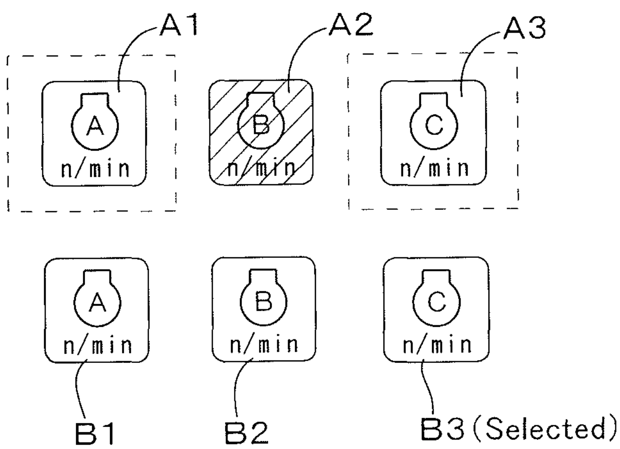
FIG. 18D is an explanation view explaining that the speed icon is in the inactive state according to the embodiments.

As shown in FIG. 18D, in the case where the speed icon C3 is the selected second selection icon, when the prime mover icons A1 and A3 can be set and the prime mover icon A2 can not be set, the display device 50B sets the prime mover icons A1 and A3 to be in the active state, but sets the prime mover icon A2 to be inactive state, and thus the selection of the prime mover icon A2 is not accepted.

In the embodiment described above, when the predetermined prime mover icon is set, the speed icon which can not be set is in the inactive state, but the reason why the unsettable speed icon cannot be set may be displayed on the lifting setting screen M8.

In addition, the unsettable prime mover icon is in the inactive state when the predetermined speed icon is set; however, the reason why the unsettable prime mover icon cannot be set may be displayed on the lift setting screen M8.

The working machine 1 includes the machine body 3, the prime mover 4 provided on the machine body 3, the working device 2, the lift device 8 for lifting and lowering the working device 2, and the operation member for operating the lift device 8 (pompa switch 42*g*), and a display device 50B to display the revolving speed setting portion 120 for setting the revolving speed of the prime mover 4 when the operation member (the pompa switch 42*g*) is operated and display the speed setting portion 121 for setting the speed of the machine body 3 when the operation member (the pompa switch 42*g*) is operated.

According to this, when the lifting device 8 is moved up and down (lifting and lowering operation) by the operation member (the pompa switch 42*g*), the revolving speed of the prime mover 4 can be set by the revolving speed setting portion 120 or the speed (the vehicle speed) can be set by the speed setting portion 121.

That is, since the number of rotations of the prime mover 4 and the vehicle speed can be automatically set when lifting and lowering the lifting device 8 by the operation of the operation member, the operation of the operator can be reduced.

The working machine 1 includes a storage portion 51 that stores the number of rotations of the prime mover 4 and the speed of the machine body 3. The revolving speed setting portion 120 includes a plurality of selectable prime mover icons which are associated with the number of turns of the prime mover 4 stored in the storage portion 51 and are displayed on the screen. The speed setting portion 121 includes a plurality of selectable speed icons which are associated with the vehicle speed of the machine body 3 stored in the storage portion 51 and are displayed on the screen.

According to this, it is possible to change the number of rotations of the prime mover 4 and the vehicle speed when lifting and lowering the lifting device 8 by the operation of the operation member only by selecting the prime mover icon and the speed icon.

When the first selection icon, which is at least one of the prime mover icons, is selected among the plurality of prime mover icons, the display device 50B activates the speed icon which can be set corresponding to the first selection icon among the plurality of speed icons, and inactivates the unsettable speed icon corresponding to the first selection icon.

According to this, when the predetermined prime mover icon (first selection icon) is selected, the speed icon at which the vehicle speed can be set is activated according to the number of revolutions of the prime mover 4 corresponding to the predetermined prime mover icon. Since the speed icon which can not be set is inactivated, the operator can easily know the vehicle speed that can be set for the set number of rotations of the prime mover 4 after setting the number of rotations of the prime mover 4.

When the second selection icon, which is at least one of the plurality of speed icons, is selected, the display device 50B activates the prime mover icon that can be set corresponding to the second selection icon among the plurality of prime mover icons, and deactivates the unsettable prime mover icon corresponding to the second selection icon.

According to this, when the predetermined speed icon (second selection icon) is selected, the prime mover icon capable of setting the revolving speed of the prime mover 4 is activated and the prime mover icon incapable of setting the revolving speed of the prime mover 4 is inactivated according to the vehicle speed corresponding to the predetermined speed icon, and thus the operator can easily know the revolving speed of the prime mover 4 that can be set for the set vehicle speed after setting the vehicle speed.

The display device 50B has a first setting area Q1 for setting the operation when the operation member (the pompa switch 42*g*) is operated on the rising side of the lifting device 8, and the operation member (the pompa switch 42*g*) on the lowering side of the lifting device 8. And, the second setting area Q2 for setting the operation when the user operates the second setting area Q2, and the revolving speed setting portion 120 and the speed setting portion 121 are displayed in the first setting area Q1 and the second setting area Q2.

According to this, setting of the number of rotations of the prime mover 4 and setting of the vehicle speed can be performed at any time when the lifting device 8 is moving up and down.

The display device 50B performs an operation after operating the operating member (pompa switch 42*g*) for moving up the operation condition (pompa switch 42*g*) and a lifting condition input portion 124 for inputting a condition for executing the operation after operating the operating member (pompa switch 42*g*) for moving up. It is possible to display a descending condition input portion 125 for inputting a condition.

According to this, when either the lifting operation or the lowering operation is manually performed by the operation member (the pompa switch 42*g*), the condition from the operation until the change of the number of rotations of the prime mover 4 is performed and the condition from the operation until the change of the vehicle speed is performed can be easily set by the lifting condition input portion 124 and the lowering condition input portion 125.

The lifting condition input portion 124 can input time or distance for setting the actual revolving speed of the driving prime mover to the revolving speed of the driving prime mover set by the revolving speed setting portion 120, and time or distance for setting the actual speed of the machine body 3 to the speed of the machine body 3 set by the speed setting portion 121. The descent condition input portion 125 can input time or distance for setting the actual revolving speed of the prime mover to the revolving speed of the prime mover set by the revolving speed setting portion 120, and time or distance for setting the actual speed of the machine body 3 to the speed of the machine body 3 set by the speed setting portion 121.

According to this, after performing either the raising operation or the lowering operation manually by the operation member (the pompa switch 42*g*), the time or distance until the change of the revolving speed of the prime mover 4 is performed, or the change of the vehicle speed is performed can be easily changed The working machine 1 includes a first change operation member that changes the number of rotations of the prime mover separately from the revolving speed setting portion 120, and a second change operation member that changes the speed of the machine body 3 separately from the speed setting portion 121. The revolving speed setting portion 120 has a prime mover manual icon for setting the revolving speed of the prime mover changed by the first change operation member separately from the plurality of prime mover icons. The speed setting portion 121 has a speed manual icon which is set to the speed of the machine body 3 set by the second change operation member separately from the plurality of speed icons.

According to this, the revolving speed of the prime mover 4 manually set by the operator with the first change operation member, in addition to the prime mover icon to which the revolution number of the prime mover 4 is associated in advance and the speed icon to which the vehicle speed is associated in advance can be set, and the vehicle speed manually set by the operator with the second change operation member can be set.

Figure 19:
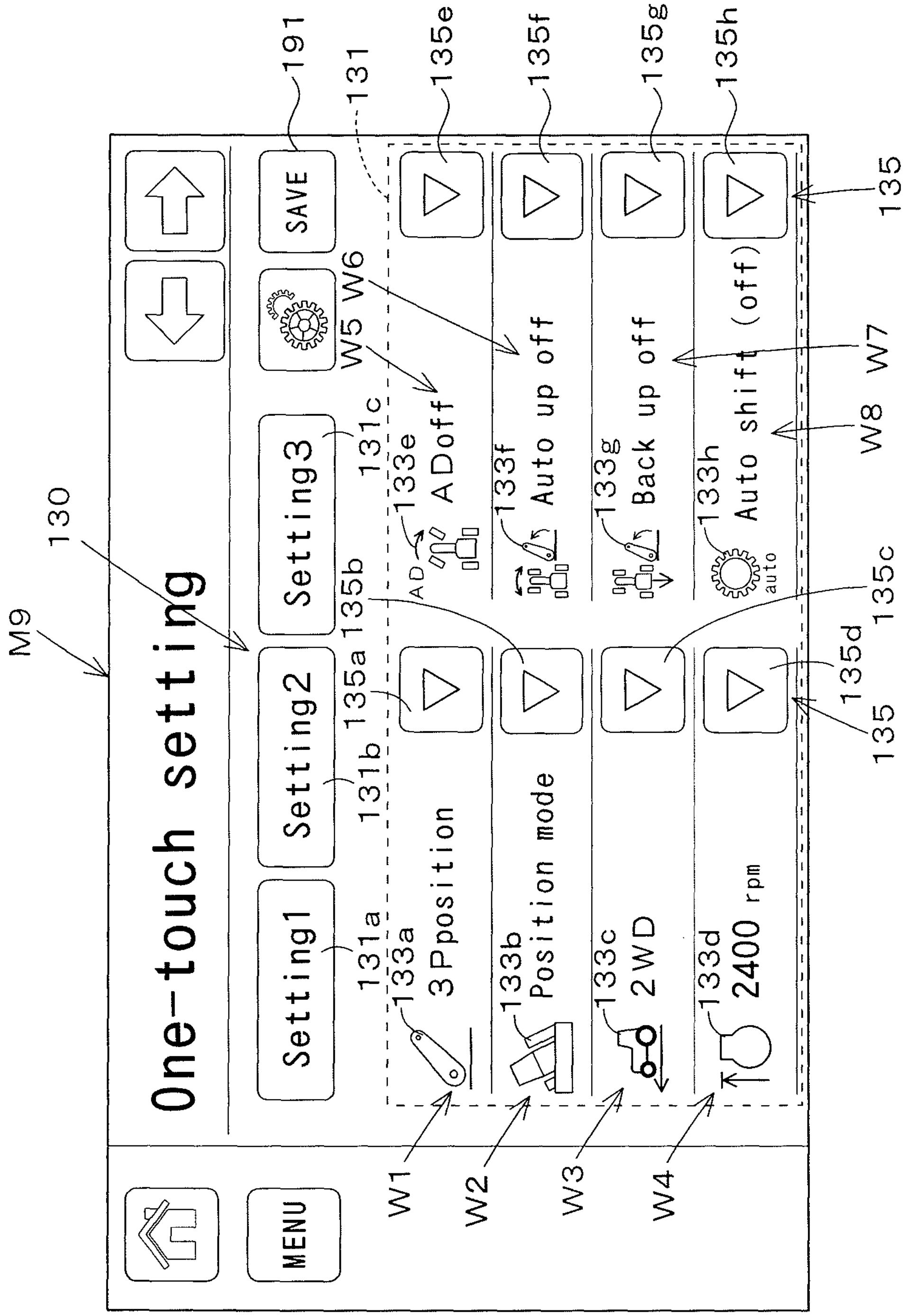
FIG. 19 is a view illustrating an example of a one-touch setting screen according to the embodiments.

Now, as shown in FIG. 19, when a predetermined operation is performed on the display device 50B, the display device 50B displays a one-touch setting screen (ninth screen) M9. The one-touch setting screen M9 is a screen on which a plurality of setting information assigned to each predetermined group can be read from the storage portion 51, and the plurality of setting information read can be displayed.

First, a plurality of setting items and a plurality of setting information in the one touch setting screen M9 will be described.

The plurality of setting items shown on the one touch setting screen M9 are, for example, items necessary for the working device 2 to perform work. The plurality of setting items are "lifting setting item W1" indicating the operation setting of the lifting device 8 at in forward traveling, "posture setting item W2" indicating the operation setting of the posture changing device 25, "traveling setting item W3" indicatying the operation setting of the machine body 3 in traveling, "revolving upper limit setting item W4" indicating the upper limit value of operation setting of the prime mover revolving speed, "double speed setting item W5" indicating the presence or absence of an increase of the revolving speed of the front wheel 7F in turning, "Auto-up item W6" indicating the operation setting of the second automatic lifting operation, "backup item W7" indicating the operation setting of the first automatic lifting operation, and "automatic shift setting item W8" indicating the operation setting of automatic shift of the transmission device.

The setting items to be displayed on the one-touch setting screen M9 may be items to be operated by the working device 2 and are not limited to the items described above.

On the one-touch setting screen M9, at least one of the lifting setting item W1, posture setting item W2, travel setting item W3, revolving upper limit setting item W4, double speed setting item W5, auto-up item W6, backup item W7, automatic shift setting item W8 is displayed, and not all setting items need to be displayed.

The setting information corresponding to the lifting setting item W1 is, for example, a mode (3P position) for manually raising and lowering, and a 3P mode (3P auto) for automatically lifting and lowering. The setting information corresponding to the posture setting item W2 is a position mode, a horizontal mode, and an inclination mode.

The setting information corresponding to the travel setting item W3 is 4WD, 4WD acceleration, and 2WD. The setting information corresponding to the revolving upper limit setting item W4 is the upper limit value of the prime mover revolving speed. The setting information corresponding to the double speed setting item W5 is valid (on) and invalid (off) of the double speed. The setting information corresponding to the auto-up item W6 is valid (on) or invalid (oft) of the second automatic raising operation.

The setting information corresponding to the backup item W7 is valid (on) or invalid (off) of the first automatic rising operation. The setting information corresponding to the automatic shift setting item W8 is valid (on) or invalid (off) of the automatic shift.

As shown in FIG. 20, the storage portion 51 has stores, in every groups, relations between a plurality of setting items (lifting setting item W1, posture setting item W2, traveling setting item W3, revolving upper limit setting item W4, double speed setting item W5, auto-up item W6, backup item W7, automatic shift setting item W8) and a plurality of setting information (3P position, 3P auto, position mode, horizontal mode, inclination mode, 4WD, 4WD acceleration, 2WD, upper limit of prime mover speed, validity of double speed, validity of the second automatic lifting operation (auto up), validity of the first automatic lifting operation (back up), and the validity of the auto shift change).

The display device 50B displays the group display portion 130 and the list display portion 131 on the one touch setting screen M9. The group display portion 130 is a part that displays a plurality of predetermined groups.

The group display portion 130 includes a plurality of name display portions 132, and a plurality of name display portions 132 indicate group names. In this embodiment, the plurality of name display portions 132 includes a name display portion 132*a* indicating a first group, a name display portion 132*b* indicating a second group, and a name display portion 132*c* indicating a third group.

Each of the name display portions 132*a*, 132*b*, and 132*c* can be selected by a touch operation or an operation of the operation tool 57.

The list display portion 131 displays a plurality of setting items and a plurality of setting information corresponding to the selected group among the plurality of groups displayed in the group display portion 130.

For example, when the name display portion 132*a* is selected, the list display portion 131 reads a plurality of setting items and a plurality of setting information corresponding to the first group from the storage portion 51, and a plurality of settings corresponding to the read first group. While displaying the icon 133 which shows an item in order on the one touch setting screen M9, the setting information read from the storage portion 51 is displayed on the one touch setting screen M9 next to the icon 133 in order.

That is, the list display portion 131 displays an icon 133*a* indicating the lifting setting item W1, an icon 133*b* indicating the posture setting item W2, an icon 133*c* indicating the travel setting item W3, an icon 133*d* indicating the revolving upper limit setting item W4, an icon 133*e* indicating a double speed setting item W5, an icon 133*f* indicating an auto-up item W6, an icon 133*g* indicating a backup item W7, and an icon 133*h* indicating an automatic shift setting item W8. In addition, setting information corresponding to each of the icons 133*a* to 133*h* are displayed.

Thus, when the operator (operator) selects a group corresponding to the work of work apparatus 2 from the plurality of groups displayed on group display portion 130, a plurality of setting information is displayed on one touch setting screen M9, The plurality of displayed setting information can be confirmed.

The list display portion 131 includes a change display portion 135. The change display portion 135 is a part that can change setting information. The change display portion 135 can change setting information for each setting item, and includes a change portion 135*a* corresponding to the lifting setting item W1, a change portion 133*b* corresponding to the posture setting item W2, a change portion 133*c* corresponding to the travel setting item W3, a change portion 133*d* corresponding to the revolving upper limit setting item W4, a change portion 133*e* corresponding to a double speed setting item W5, a change portion 133*f* corresponding to an auto-up item W6, a change portion 133*g* corresponding to a backup item W7, and a change portion 133*h* corresponding to an automatic shift setting item W8.

Each of the change portions 135*a* to 135*h* can be selected by a touch operation or an operation of the operation tool 57, and can change setting information displayed on the list display portion 131 by selection. For example, when the change portion 135*d* is selected, the upper limit value of the prime mover revolving speed can be changed. In addition, when the change portion 135*h* is selected, it is possible to change on/off of the automatic shift.

Thus, at least the setting information set corresponding to the group, that is, the setting information displayed on the one-touch setting screen M9 can be changed.

As shown in FIG. 1C, the tractor 1 is provided with a setting switch 137. The setting switch 137 is a switch that can be switched on or off. The setting switch 137 is provided around the operator seat 10.

When the setting switch 137 is turned on in the one-touch setting screen M9 with a plurality of setting information displayed on the list display portion 131, the plurality of setting information displayed on the list display portion 131 is regarded as valid setting information. The control device 40 of the tractor 1 is set. That is, when the setting switch 137 is turned on, the setting switch 137 permits using the plurality of setting information indicated in the list display portion 131 as information used for the control device 40.

Further in other words, when the setting switch 137 is turned on, the setting switch 137 notifies the control device 40 of a plurality of pieces of setting information indicated in the list display portion 131. When the plurality of setting information is set, the control device 40 executes control based on the set plurality of setting information.

The display device 50B performs switching of the list display portion 131 before setting the plurality of setting information in the control device 40 by the setting switch 137, and stops switching of the list display portion 131 after setting of the plurality of setting information.

For example, in a state where the setting display 137 is displayed with a plurality of setting information in the one touch setting screen M9 and the setting switch 137 is turned off (before setting), the display device 50B is displayed on the group display portion 130. The display of a plurality of setting information to be displayed on the list display portion 131 is switched each time the selection of the group is changed.

On the other hand, in the state (after setting) the setting display 137 displaying a plurality of setting information in the one-touch setting screen M9 and setting the setting switch 137 ON, the display device 50B is displayed on the group display portion 130. The group selection can not be changed, and the set display information is displayed on the list display portion 131.

As shown in FIG. 1C, the tractor 1 includes an operation switch 190. The operation switch 190 is a switch provided around the operator seat 10 and capable of setting information of predetermined setting items.

The operation switch 190 is a switch configured to set, for example, setting information (position mode, horizontal mode, inclination mode) corresponding to the posture setting item W2, setting information (4WD, 4WD acceleration, 2WD) corresponding to the traveling setting item W3, and the like.

After acquiring the plurality of setting information indicated in the list display portion 131, the control device 40 receives and accepts the setting information of the predetermined setting item changed by the operation switch 190 among the plurality of acquired setting information, and executes control with setting information.

After the plurality of setting information displayed on the list display portion 131 by the setting switch 137 is output to the control device 40, for example, the setting information corresponding to the traveling setting item W3 is switched from 2WD to 4WD by the operation switch 190. In that case, the control device 40 receives the setting information changed by the operation switch 190, and changes the tractor 1 from 2WD to 4WD.

When the setting information corresponding to the posture setting item W2 is switched from the position mode to the horizontal mode by the operation switch 190, the control device 40 receives the setting information changed by the operation switch 190, and changes from the position mode to the horizontal mode. It switches and controls the posture change device 25 in horizontal mode.

The display device 50B has a setting command portion 191. The setting command portion 191 instructs the storage portion 51 to store the current setting information set by the operation switch 190. In particular, the display device 50B displays a switch indicating the setting command portion 191 on the one-touch setting screen M9. When the setting command portion (switch) 191 is operated, it instructs the storage portion 51 to store current setting information.

For example, as described above, at least the plurality of setting information of the first group is transmitted to the control device 40, and the control device 40 controls the tractor 1 based on the setting information of the first group. It is assumed that the predetermined setting item, for example, the traveling setting item W3 is changed to 4WD and the posture setting item W2 is changed to the horizontal mode by operating 190.

Under such circumstances, when the setting command portion 191 is operated, "4 WD" which is setting information of the travel setting item W3 set by the operation switch 190 and "horizontal mode" which is setting information of the posture setting item W2 can be updated as setting information of the first group.

The working machine 1 includes a display device 50B for displaying, on the screen, a storage portion 51 storing a plurality of setting items related to the working machine and a plurality of setting information corresponding to the setting items in a predetermined group portion, a group display portion 130 displaying a plurality of groups, and a list display portion 131 for displaying a plurality of setting information a plurality of setting items corresponding to the selected group among the plurality of groups displayed on the group display portion 130.

According to this, when the worker operates the working machine 1 to perform work, it is possible to confirm a plurality of setting items and a plurality of setting information in each predetermined group. That is, it is possible to easily confirm a plurality of setting items and a plurality of setting information corresponding to the work or the like.

The list display portion 131 includes a change display portion 135 that changes setting information in accordance with an operation. According to this, the change display portion 135 can change the setting information displayed on the list display portion 131.

A setting switch 137 for setting a plurality of setting information indicated in the list display portion 131 on the screen in the control device 40 is provided. According to this, after the worker confirms the plurality of setting information corresponding to the plurality of setting items in the list display portion 131, the plurality of setting information corresponding to the plurality of setting items confirmed by the worker by the operator operating the setting switch 137 can be set (output) in the control device 40.

The display device 50B executes switching of the list display portion 131 displayed on the screen by selection of the group display portion 130 before setting of the plurality of setting information, and after setting of the plurality of setting information, the display device 50B stops switching the list display portion 131.

According to this, while setting information for each group can be confirmed by selection of the group display portion 130 before setting of a plurality of setting information, the plurality of outputted setting information can be fixed and displayed on the display device 50B by stopping the switching after outputting the plurality of setting information to the control device 40. In this manner, the operator can confirm, via the display device 50B, at least what the plurality of setting information output to the control device 40 is.

The working machine is provided with an operation switch 190 provided around the operator seat 10 and capable of setting information of predetermined setting items. After acquiring the plurality of setting information indicated in the list display portion 131, the control device 40 receives the setting information of the predetermined setting item changed by the operation switch 190 among the acquired plurality of setting information.

According to this, after the setting information of the predetermined group is read on the control device 40 side, when it is necessary to change the setting information of the predetermined setting item due to circumstances such as work, the operation switch 190 can easily change the setting information.

The display device 50B includes a setting command portion 191 that instructs the storage portion 51 to store current setting information of a predetermined setting item set by the operation switch 190. According to this, when a setting more suitable for work is found while actually performing the working, the current setting information whose setting has been changed by the operation switch 190 is stored in the storage portion 51, and can be read out in group portions from the next time.

The working machine 1 includes a prime mover 4 and a transmission device 5. The plurality of setting items include a revolving upper limit setting item indicating an upper limit value of the revolving speed of the prime mover 4, and an automatic shift setting item indicating an automatic shift of the transmission device 5. The plurality of setting information includes the upper limit value of the number of revolutions of the prime mover and the on/off of the automatic shift.

According to this, in the work of the working machine 1, the upper limit value of the revolving speed of the prime mover 4 can be set in the work portion, and the revolving speed of the prime mover 4 in the working device 2, that is, the revolving speed of the PTO shaft is limited. If there is an appropriate number of rotations, and the like, the operation will be easier. In addition, since the turning on and off of the automatic shift can be changed according to the work, it is possible to reduce the operation of the operator.

Figure 21:
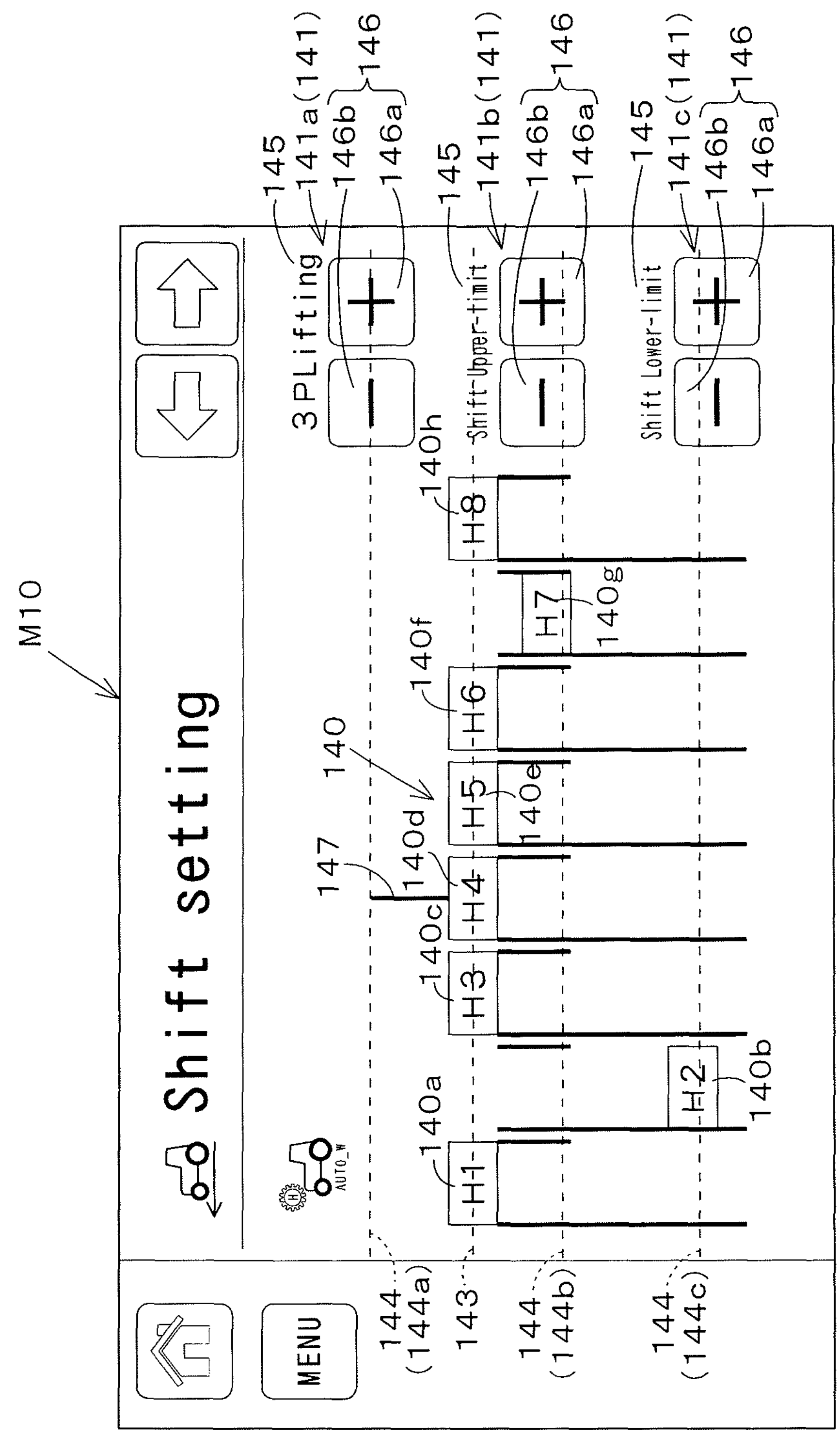
FIG. 21 is a view illustrating an embodiment of a box setting screen according to the embodiments.

Now, as shown in FIG. 21, when a predetermined operation is performed on the display device 50B, the display device 50B displays a box setting screen (tenth screen) M10. The box setting screen M10 is a screen on which predetermined settings can be performed by moving a box (candidate box) 140 in which setting information (candidate setting information) of a candidate is displayed. The box setting screen M10 is, for example, a shift setting screen for setting information on the shift.

The display device 50B displays a plurality of candidate boxes 140 on the box setting screen M10. In each of the plurality of candidate boxes 140, a gear is shown as setting candidate information.

The plurality of candidate boxes 140 include a first candidate box 140*a* indicating a first shift position, a second candidate box 140*b* indicating a second shift position, a third candidate box 140*c* indicating a third shift position, a fourth candidate box 140*d* indicating a fourth shift position, a fifth candidate box 140*e* indicating a fifth shift position, a sixth candidate box 140*f* indicating a sixth shift position, a seventh candidate box 140*g* indicating a seventh shift position, and an eighth candidate box 140*h* indicating an eighth shift position.

Figure 22A:
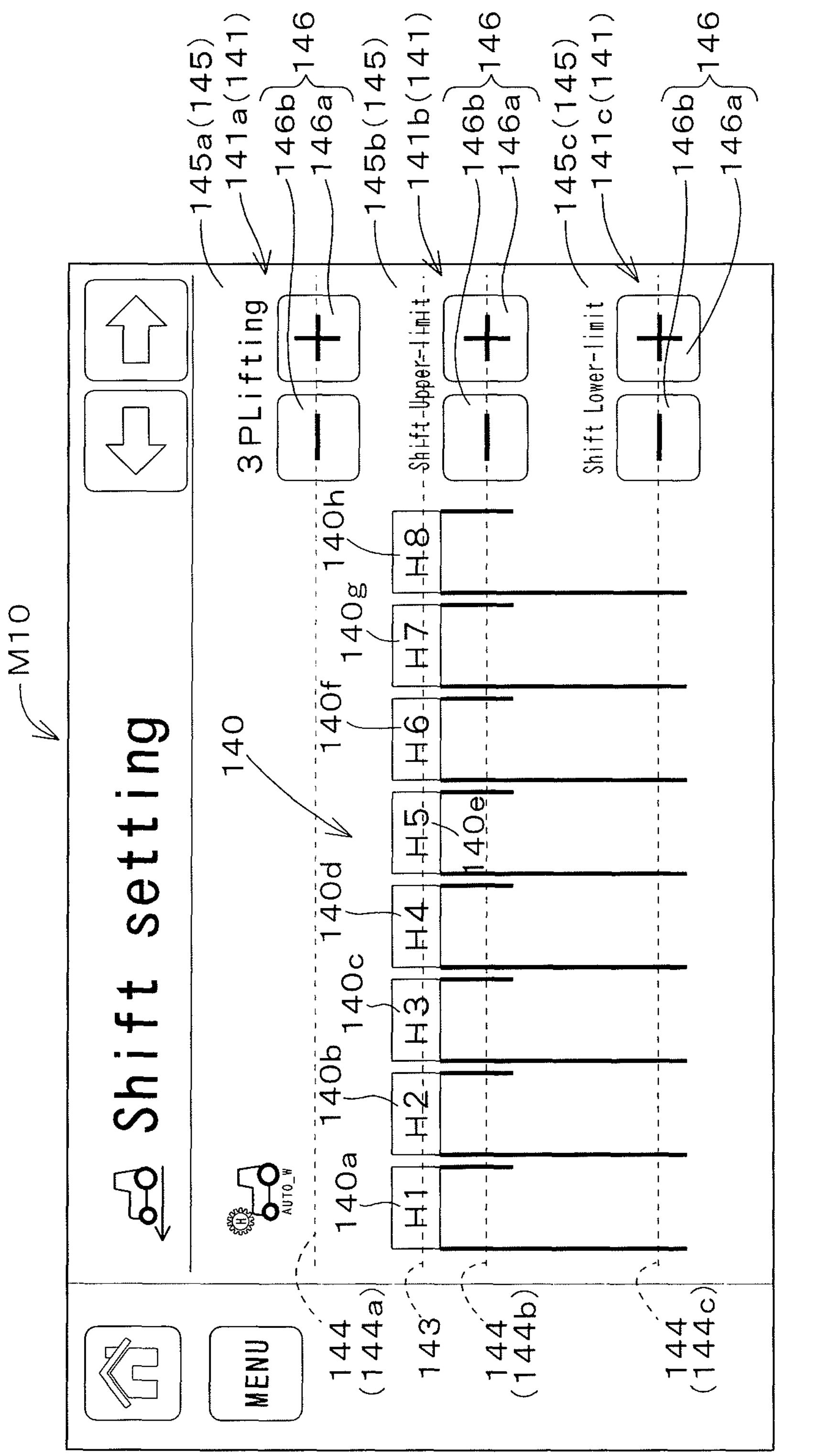
FIG. 22A is a view illustrating the box setting screen in which a plurality of candidate boxes are arranged according to the embodiments.

As shown in FIG. 22A, in the box setting screen M10, in the state where the gear is not set (default state), the plurality of candidate boxes 140 (140*a*, 140*b*, 140*c*, 140*d*, 140*e*, 140*f*, 140*g*) are respectively aligned in the horizontal direction of the box setting screen M10.

The display device 50B displays a plurality of contents display portions 141 on the box setting screen M10. The plurality of contents display portions 141 display setting items. In this embodiment, the plurality of contents display portions 141 display setting items relating to the shift by characters or the like.

The plurality of contents display portions 141 are arranged on one side (left side) or the other side (right side) of the plurality of candidate boxes 140. The plurality of contents display portions 141 are arranged in the orthogonal direction orthogonal to the arranging direction in which the plurality of candidate boxes 140 are arranged.

In particular, when the position where the plurality of candidate boxes 140 align in the default state is set as the reference line 143, the contents display portion 141 is disposed on the plurality of setting lines 144 parallel to the reference line 143. The setting line 144 may not be displayed on the box setting screen M10.

The plurality of contents display portions 141 include a first contents display portion 141*a*, a second contents display portion 141*b*, and a third contents display portion 141*c*. The first contents display portion 141*a*, the second contents display portion 141*b*, and the third contents display portion 141*c* each have an item display portion 145 for displaying setting items and a box selection portion 146 for selecting the candidate box 140.

The first contents display portion 141*a*, the second contents display portion 141*b*, and the third contents display portion 141*c*. The first contents display portion 141*a*, the second contents display portion 141*b*, and the third contents display portion 141*c* each have an item display portion 145 for displaying setting items and a box selection portion 146 for selecting the candidate box 140.

More in particular, the item display portion 145*a* of the first contents display portion 141*a* indicates that the gear is set when the lifting device 8 is moved up and down as a setting item. The item display portion 145 *b* of the second contents display portion 141 *b* indicates that the upper limit of the shift speed is set. The item display portion 145*c* of the third contents display portion 141*c* indicates that the lower limit of the shift speed is set.

The box selection portion 146 is a portion for selecting a predetermined candidate box, that is, a candidate box (display box) for which setting is desired, from the plurality of candidate boxes 140. The box selection portion 146 has an increase input portion 146*a* and a decrease input portion 146*b*.

The increase input portion 146*a* is a button for selecting the candidate box 140 located on the right side from the predetermined position as a display box when selecting the display box from among the plurality of candidate boxes 140. For example, as shown in FIG. 22A, when the increase input portion 146*a* is operated in a state in which no gear is set (default state), the first candidate box 140*a* is selected as a display box as shown in FIG. 22B.

Figure 22B:
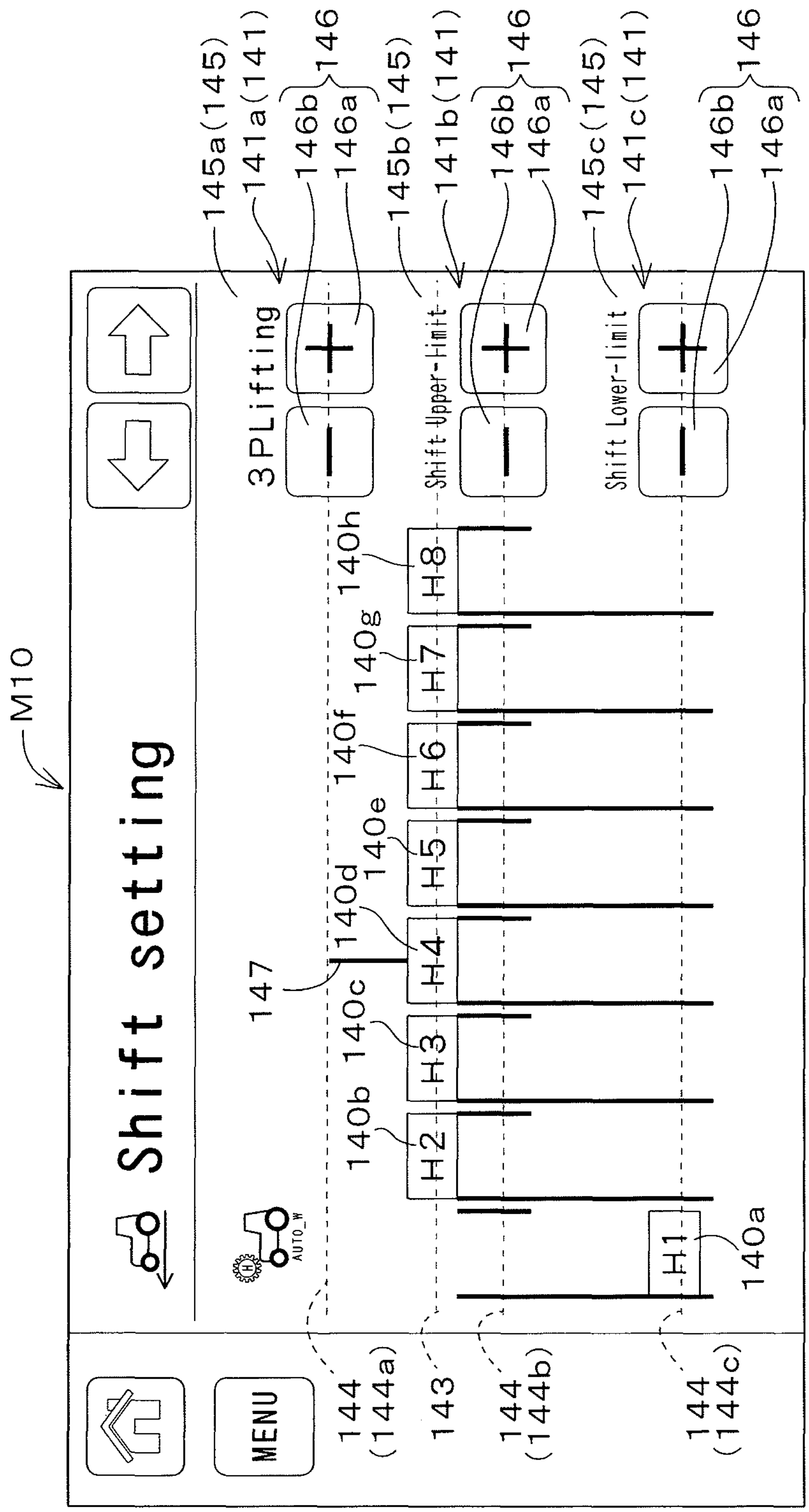
FIG. 22B is a view illustrating a state where a first candidate box is selected as a display box according to the embodiments.
Figure 22C:
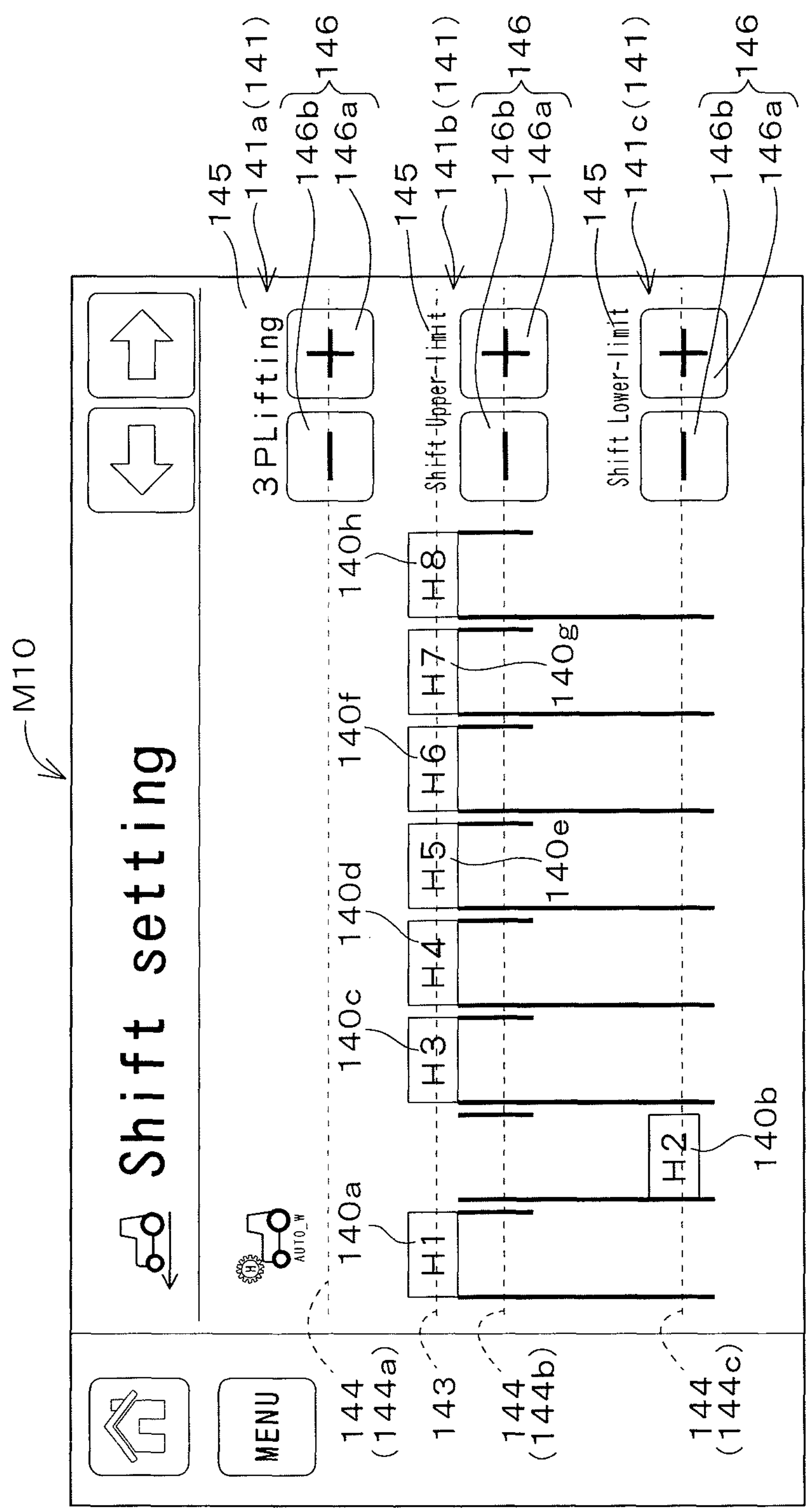
FIG. 22C is a view illustrating a state where a second candidate box is selected as the display box according to the embodiments.

Also, as shown in FIG. 22B, when the first candidate box 140*a* is selected as a display box, when the increase input portion 146*a* is operated, as shown in FIG. 22C, it is positioned to the right of the first candidate box 140*a*. The second candidate box 140*b* which is the candidate box 140 is selected as a display box.

When the second candidate box 140*b* is selected as a display box, the selection of the display box for the first candidate box 140*a* is cancelled.

The reduction input portion 146 *b* is a button for selecting the candidate box 140 located on the left side from the predetermined position as a display box when selecting a display box from among the plurality of candidate boxes 140. For example, as shown in FIG. 22A, when the decrease input portion 146*b* is operated in the default state, the eighth candidate box 140*h* is selected as a display box as shown in FIG. 22D.

Figure 22D:
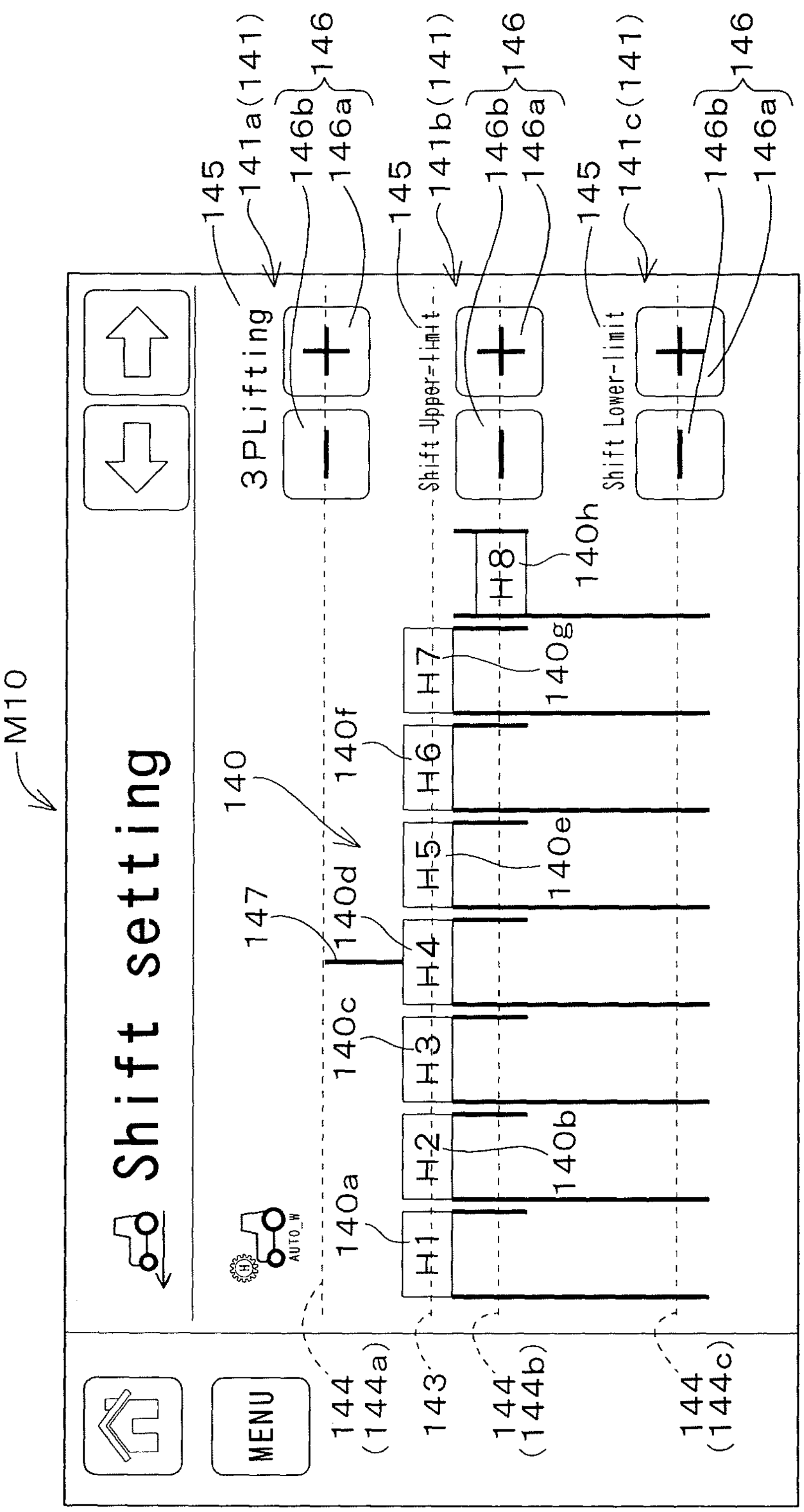
FIG. 22D is a view illustrating a state where an eighth candidate box is selected as the display box according to the embodiments.
Figure 22E:
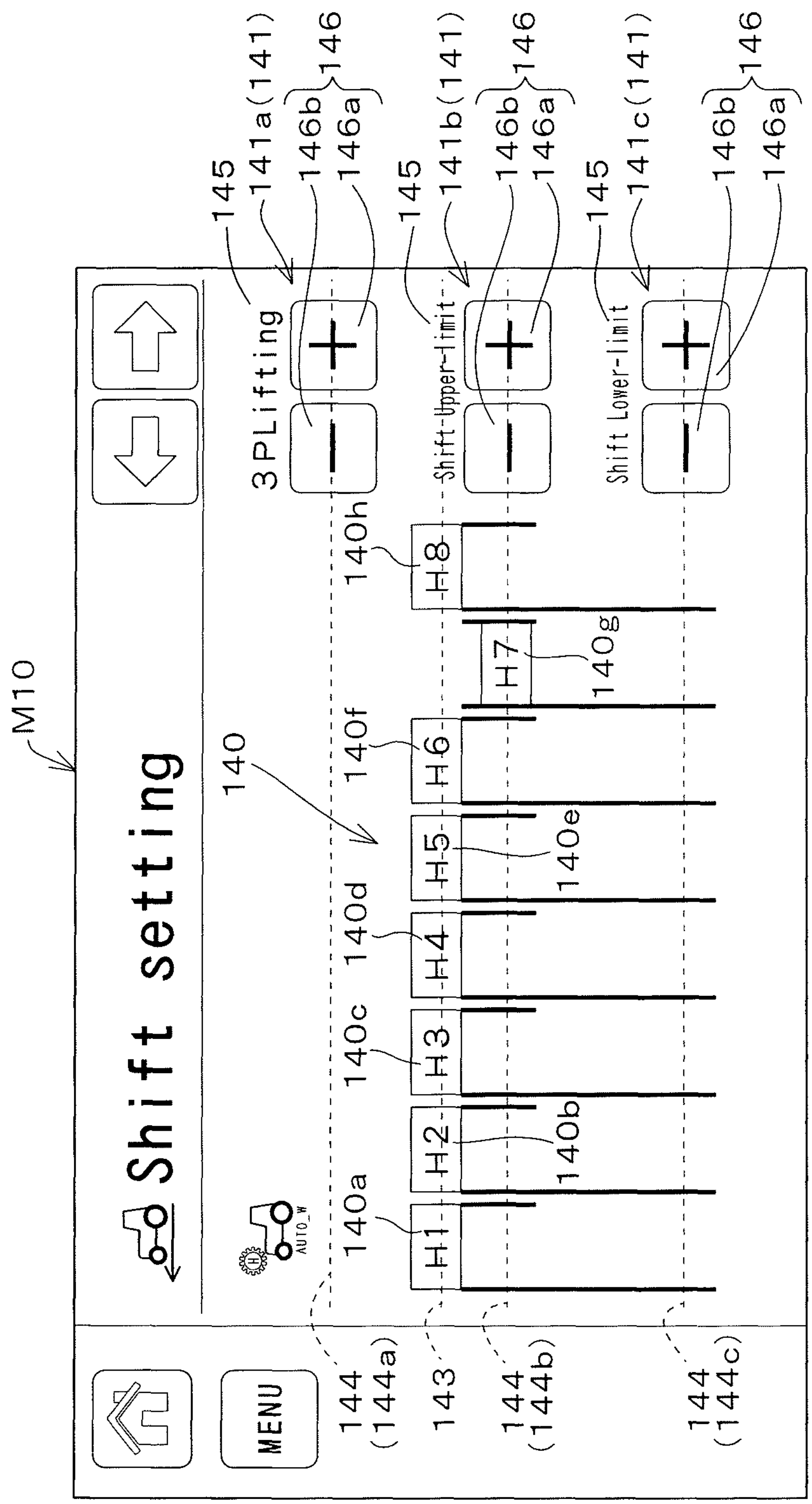
FIG. 22E is a view illustrating a state where a seventh candidate box is selected as the display box according to the embodiments.

In addition, as shown in FIG. 22D, when the eighth candidate box 140*h* is selected as a display box, when the reduction input portion 146*b* is operated, as shown in FIG. 22E, it is positioned on the left side of the eighth candidate box 140*h*. The seventh candidate box 140*g* which is the candidate box 140 is selected as a display box.

When the seventh candidate box 140*g* is selected as a display box, the selection of the display box for the eighth candidate box 140*h* is cancelled.

When setting the tractor 1, the display device 50B (display control portion 56) moves the display box, which is a predetermined candidate box, among the plurality of candidate boxes 140 to a position corresponding to the contents display portion 141.

For example, as shown in FIG. 22B and FIG. 22C, when the increase input portion 146*a* of the third contents display portion 141*c* is selected in the state where the display box is set as the first candidate box 140*a*, the display box is set. The second candidate box 140*b* is moved from the reference line 143 to the setting line 144*c* which is a position corresponding to the third contents display portion 141*c*.

That is, when the display box is changed from the first candidate box 140*a* to the second candidate box 140*b*, the second candidate box 140*b* is moved in the direction orthogonal to the reference line 143 to set the second candidate box 140*b* on the setting line 144*b* and to return the first candidate box 140*a* to the reference line 143.

Thus, the lower limit of the shift speed can be set to the two speeds indicated by the second candidate box 140*b*.

Also, as shown in FIGS. 22D and 22E, when the decrease input portion 146*b* of the second contents display portion 141*b* is selected in the state where the display box is set as the eighth candidate box 140*h*, the display box is set. The seventh candidate box 140*g* is moved from the reference line 143 to the setting line 144*b* which is a position corresponding to the second contents display portion 141*b*.

That is, when the display box is changed from the eighth candidate box 140*h* to the seventh candidate box 140*g*, the seventh candidate box 140*g* is moved in the direction orthogonal to the reference line 143 to set the seventh candidate box 140*g* on the setting line 144*b* and to return the eighth candidate box 140*h* to the reference line 143.

Thus, the upper limit of the shift position can be set to the seven positions indicated by the seventh candidate box 140*g*.

In the embodiment described above, the setting is performed by moving the candidate box set in the display box to the position corresponding to the contents display portion 141 among the plurality of candidate boxes 140. However, the display device 50B (display control portion 56) may display a setting bar 147 indicating that setting is performed from the display box to the position corresponding to the contents display portion 141.

For example, as shown in FIG. 22A, in the default state, the plurality of candidate boxes 140 are aligned, and the setting bar 147 is not extended from the plurality of candidate boxes 140.

As shown in FIG. 22B and FIG. 22D, when the increase input portion 146*a* of the first contents display portion 141*a* is selected in a state where the display box is set as the third candidate box 140*c*, the fourth set in the display box is selected. A setting bar 147 is extended from the candidate box 140*d* to a setting line 144*a* which is a position corresponding to the first contents display portion 141*a*.

That is, when the display box is changed from the third candidate box 140$c$ to the fourth candidate box 140$d$, the setting bar 147 is extended from the fourth candidate box 140$d$, and the setting bar 147 of the third candidate box 140$c$ is deleted. Thus, it is possible to set the fourth shift positions indicated by the fourth candidate box 140$d$ when the lifting device 8 is moving upward.

In the embodiment described above, the shift speed is set by moving the plurality of candidate boxes 140. However, the shift method in the transmission device 5 is not limited. For example, the main shift portion having steps (main speed-changing mechanism) may be applied to the setting in the gear position, or may be applied to the setting in the gear position of the auxiliary speed-changing portion (auxiliary speed-changing mechanism) having steps.

Alternatively, in the continuously variable transmission mechanism, the speed-changing level (magnitude of speed-changing) may be divided and indicated by a plurality of candidate boxes 140 (the minimum value and the maximum value are divided and displayed in a predetermined range), and the setting may be performed by moving the plurality of candidate boxes 140.

Figure 22F:
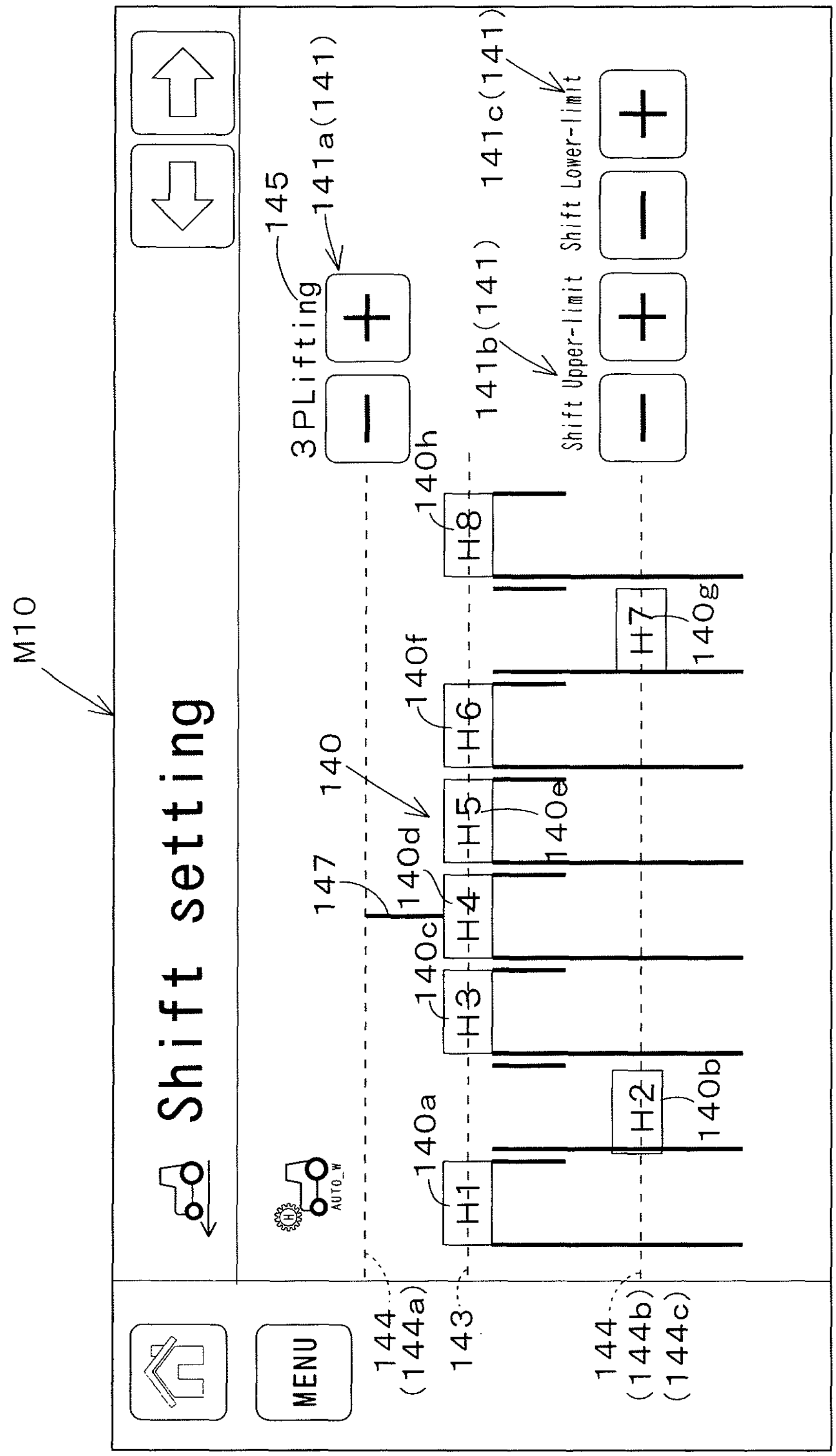
FIG. 22F is a view illustrating a state where the candidate boxes (the display boxes) are set by being arranged in line according to the embodiments.

In the embodiment described above, as shown in FIG. 21, the setting is performed by moving the second candidate box 140$b$ and the seventh candidate box 140$g$ among the plurality of candidate boxes 140 to different positions up and down. However, as shown in FIG. 22F, the setting may be performed by moving the second candidate box 140$b$ and the seventh candidate box 140$g$ to the same horizontal position. That is, the setting may be performed by arranging the candidate boxes 140 to be set among the plurality of candidate boxes 140 in the same straight line.

In addition, although setting is performed by extending the setting bar 147 to the contents display portion 141, when setting, a predetermined box (display box) 140 selected as a setting target out of the plurality of candidate boxes 140. Setting is performed by changing the color of the content display portion 141 corresponding to the content set in the display box 140 to the same color as the display box 140. For example, the color of the fourth candidate box 141$d$ and the color of the first contents display portion 141$a$ corresponding to the time of 3P rise are made the same color.

The display device 50B of the working machine has a plurality of candidate boxes 140 in which candidate setting information that can be set for the working machine is shown and displayed on the screen, the contents display portion 141 in which setting items related to the working machine are displayed, the display control portion 56 for moving the display box, which is the candidate box 140 in which the candidate setting information corresponding to the setting is displayed among the plurality of candidate boxes 140, to the position corresponding to the contents display portion 141.

According to this, display is performed by moving a predetermined candidate box (display box) 140 in which candidate setting information corresponding to the setting is displayed among the plurality of candidate boxes 140 to a position corresponding to the contents display portion 141, and thereby the candidate setting information in the display box 140 can be set. That is, since setting can be performed by moving the plurality of candidate setting information to another place corresponding to the contents display portion 141, it can be known more visually what is the predetermined candidate setting information selected for the setting from the plurality of candidate setting information.

The contents display portion 141 has a box selection portion 146 for selecting a display box from among a plurality of candidate boxes 140, and the display control portion 56 moves the display box selected by the box selection portion 146 to a position corresponding to the contents display portion 141.

According to this, the setting can be easily performed by selecting a box that is the display box from the plurality of candidate boxes 140 in the box selection portion 146.

The display control portion 56 arranges the plurality of candidate boxes 140 on the screen when the setting of the working machine is not performed, and when the setting of the working machine is performed, the display control portion 56 moves the candidate boxes 140 from the position where the display box is arranged to a position corresponding to the position corresponding to 141.

According to this, since a predetermined candidate box, which is a display box, is moved among the plurality of candidate boxes 140, candidate setting information can be visually known.

When setting of the working machine is performed, the display control portion 56 moves the display box in a direction intersecting the alignment direction in which the plurality of candidate boxes 140 are aligned.

According to this, it is easy to know the candidate box 140 not contributing to the setting and the display box contributing to the setting among the plurality of candidate boxes 140.

The display device of the working machine includes a plurality of candidate boxes 140 in which candidate setting information that can be set on the working machine is displayed, the candidate boxes 140 being displayed on the screen, a contents display portion 141 that displays the setting items related to the working machine, and a display control portion 56 to display a setting bar 147 indicating, in performing the setting of the working machine, that the setting is performed from the display box that is one of the candidate boxes 140 in which the candidate setting information corresponding to the setting is displayed toward the position corresponding to the contents display portion 141.

According to this, candidate setting information can be known also by the setting bar 147 out of a plurality of candidate setting information.

The contents display portion 141 has a box selection portion 146 for selecting a display box from among a plurality of candidate boxes 140, and the display control portion 56 displays the setting bar 147 extending from the display box selected by the box selection portion 146 toward the contents display portion 141.

According to this, when the display box is selected by the box selection portion 146, the setting bar 147 corresponding to the selected candidate setting information can be displayed.

The display control portion 56 arranges the plurality of candidate boxes 140 on the screen when the setting of the working machine is not performed, and the plurality of candidate boxes 140 is arranged when the setting of the working machine is performed. The setting bar 147 is extended in a direction intersecting the alignment direction.

According to this, by looking at the setting bar 147, it is easy to know the candidate box 140 not contributing to the setting and the display box contributing to the setting among the plurality of candidate boxes 140.

The plurality of candidate boxes 140 are boxes in which the gear position of the working machine is indicated as candidate setting information, and the display items are either the upper limit or the lower limit of the gear position or the gear position in lifting the working device 2. According to this, it is possible to easily set the upper limit and the lower limit of the shift position in the speed-changing and the shift position in lifting the working device 2.

The operation tool 57 capable of operating the display device 50B is capable of operating another display device. For example, the operation tool 57 can operate the display device 50A and the display device 50C. That is, the operation tool 57 can operate the plurality of display devices 50 (display devices 50A, 50B, and 50C).

In addition, the display device 50 which can be operated by the operation tool 57 is not limited to display devices 50A, 50B, and 50C mentioned above, and just may be the display device 50 provided in the tractor 1.

The control device 40 determines, based on the operation state of the tractor 1, the target display device which is the display device 50 configured to perform the operation with the operation tool 57 from among the plurality of display devices 50, and outputs the operation signal of the operation tool 57 (operation information) to the target display device, and thereby allowing the target display device to be operated by the operation tool 57.

Figure 23:
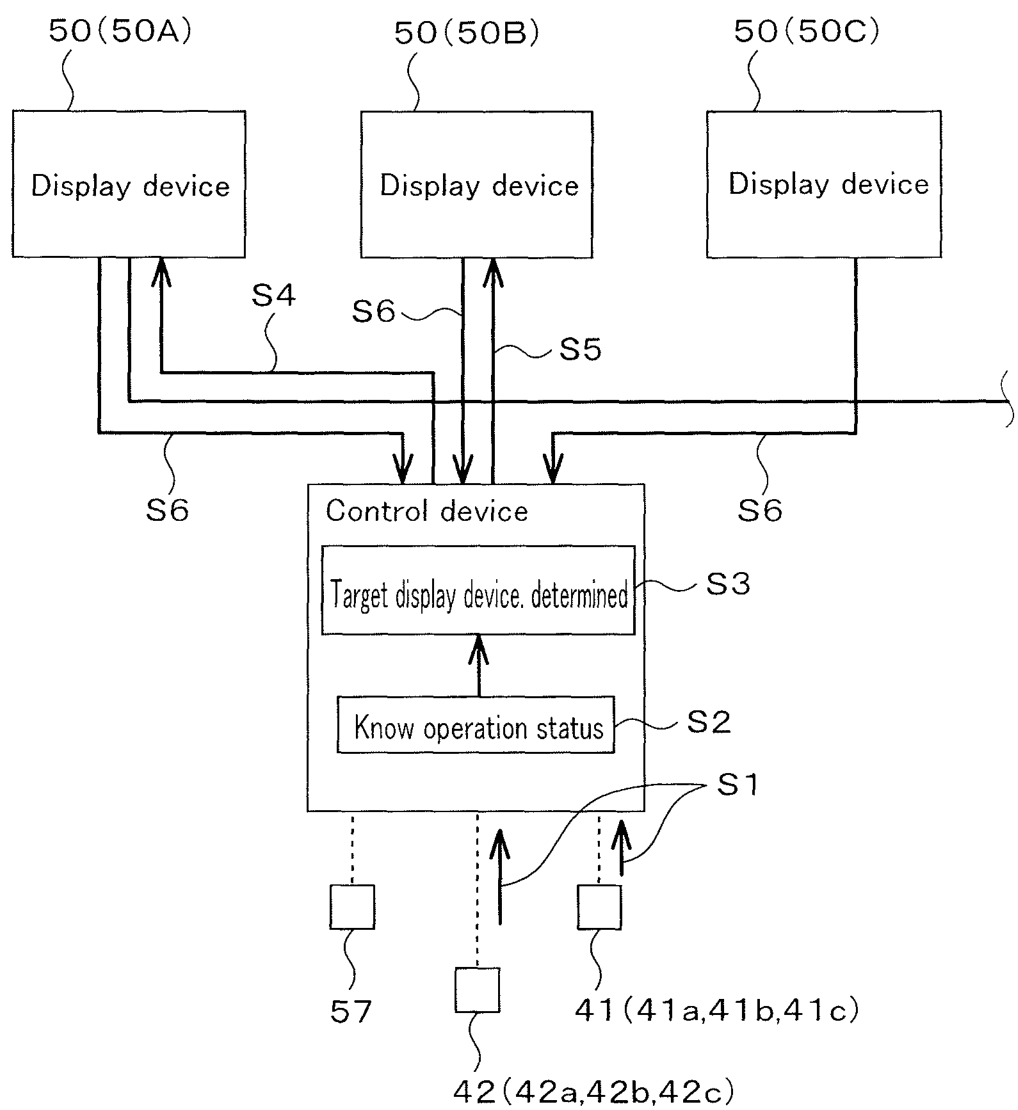
FIG. 23 is a schematic view illustrating a relation between a control device, a target display device, and an operation tool according to the embodiments.

In particular, as shown in FIG. 23, the control device 40 firstly acquires either the detection information detected by the detection device 41 or the operation information of the operation member 42 (step S1).

The control device 40 knows the operation state of tractor 1 based on either of the acquired detection information and operation information (step S2).

When the control device 40 knows the operation state of the tractor 1, the control device 40 determines the display device which gives the highest priority to the operation among the plurality of display devices 50 as the target display device based on the operation state (step S3).

After determining the target display device, when the control device 40 acquires the operation signal (operation information) of the operation tool 57, the control device 40 outputs the operation information to the target display device. The target display device which is a predetermined display device is operated from the inside (step S4).

When the control device 40 changes the target display device giving priority to the operation on the basis of change of the operation state of the tractor 1 during or after the operation by the operation tool 57, the control device 40 stops the operation of the operation tool 57 to the target display device before the change, and starts the operation of the operation tool 57 to the target display device after the change (step S5).

Figure 24:
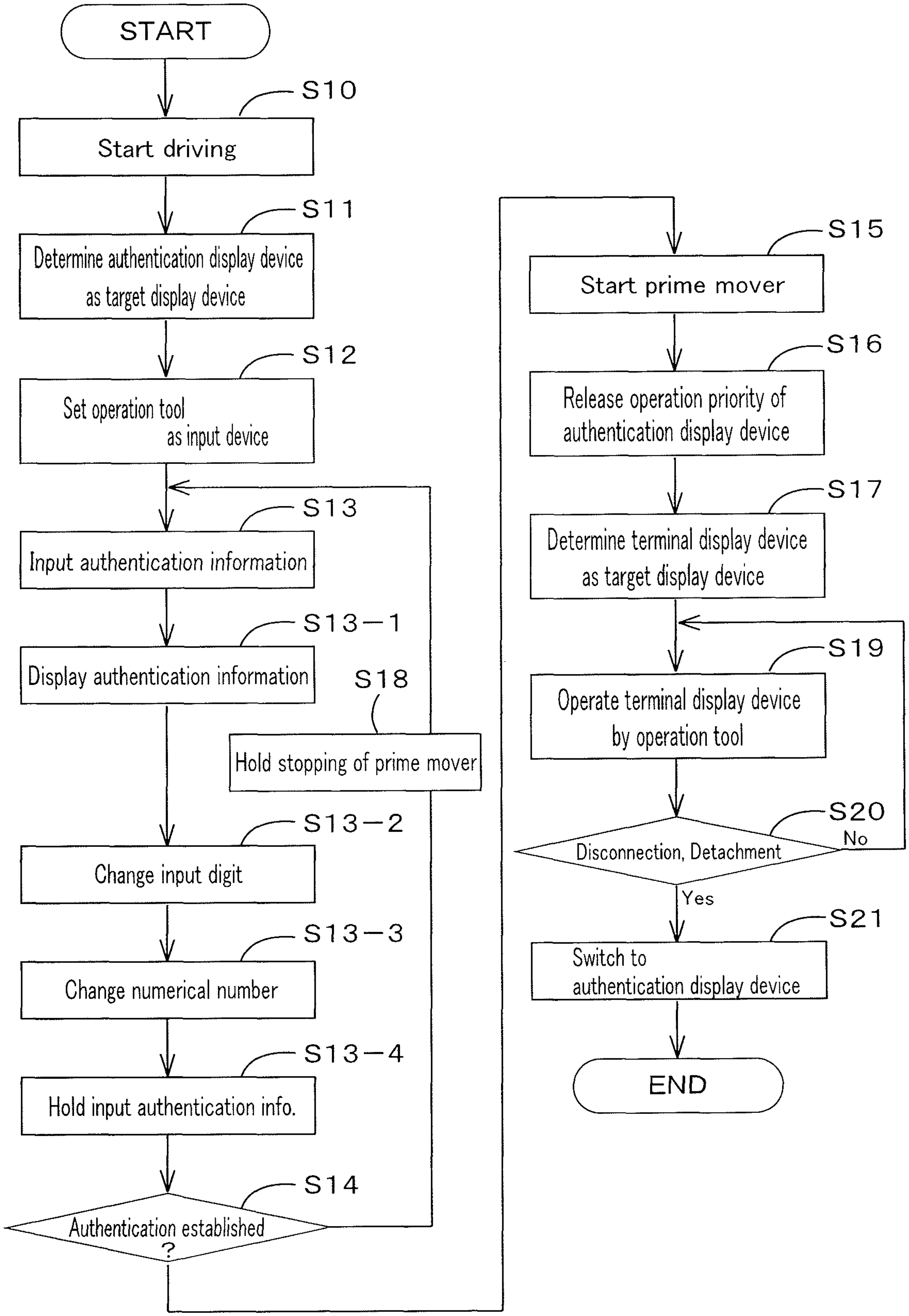
FIG. 24 is a view illustrating a flow in which a target display device is determined from among the plurality of display devices and an operation is carried out according to the embodiments.

FIG. 24 is a diagram showing a flow of determining a predetermined display device (target display device) from among the plurality of display devices 50 by the control device 40 and executing the operation of the operation tool 57.

As shown in FIG. 24, when the ignition switch 42*b* is turned ON and the operation state of the tractor 1 shifts from the driving-stopped processing to the driving-started processing (step S10), the control device 50 determined the display device (authentication display device) 50C as the target display device to prioritize the operation (step S11).

In addition, the control device 40 sets the operation tool 57 as an input device for inputting authentication information (step S12), and shifts to processing for inputting authentication information (step S13).

In the input process, the control device 40 outputs a command for inputting authentication information to the authentication display device 50C, and the authentication display device 50C displays authentication information such as a password that can be input (step S13-1).

In addition, when the control device 40 receives the rotation operation by the operation tool 57, the control device 40 instructs the authentication display device 50C to change the input digit for inputting the authentication information (step S13-2).

After the determination of the input digit, when the control device 40 receives the rotation operation by the operation tool 57, the control device 40 instructs the authentication display device 50C to change the number input to the input digit (step S13-3).

When step S13-2 and step S13-3 are repeated, and when the input of the authentication information receives the completion, the control device 40 holds the authentication information (the authentication information displayed on the authentication display device 50C) input by the operation tool 57 (input device) (step S13-4).

The control device 40 authenticates the memory authentication information stored in advance and the input authentication information, and when the authentication is established (step S14, Yes), the control device 40 permits the start of the prime mover 4 and starts the prime mover 4 step (S15).

In addition, the control device 40 releases the priority of the operation on the authentication display device 50C (step S16) together with the permission of starting of the prime mover 4 (step S16), and the control device 40 determines the display device (terminal display device) 50B as a target display device to which the operation is prioritized (step S17).

On the other hand, when the authentication is not established (step S14, No), the control device 40 does not permit the start of the prime mover 4 (does not permit the start of the prime mover 4), and holds the prime mover 4 in the stopping state (step S18).

In addition, when the start of the prime mover 4 is not permitted, the control device 40 does not release the priority of the operation on the display device 50C, and returns the process to the input process (step S13) again.

After determining the terminal display device 50B as the target display device, the control device 40 causes the operation tool 57 to operate the display device 50B by outputting an operation signal of the operation tool 57 to the terminal display device 50B (step S19).

The control device 40 monitors disconnection in the connection path to the operation tool 57 and the control device 40 or removal of the terminal display device 50B (step S20).

The control device 40 switches the information displayed on the terminal display device 50B to the authentication display device 50C (step S21) when there is either disconnection or removal of the terminal display device 50B (step S20, Yes).

In other words, the control device 40 switches the display of the authentication display device 50C so that the authentication display device 50C functions as the terminal display device 50B.

Although the terminal display device 50B and the authentication display device 50C are switched to the target display device in the embodiment described above, the meter display device 50A may be switched to the target display device. In addition, among the plurality of display devices 50, the display device 50 set in the target display device may display that the display device 50 can be operated by the operation tool 57.

Figure 25:
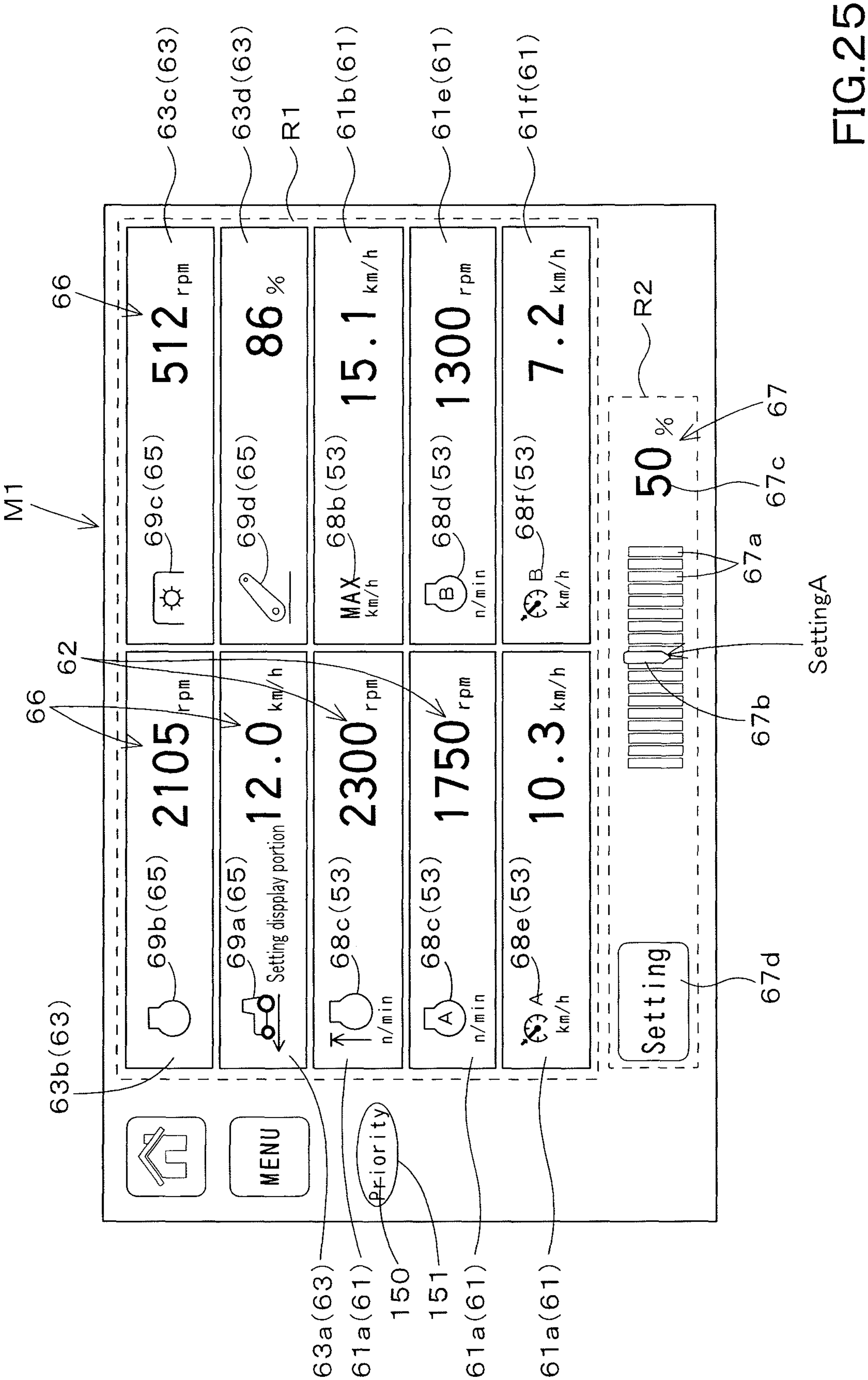
FIG. 25 is a view illustrating an example displaying on a terminal display device that the operation can be carried out by the operation tool according to the embodiments.

For example, as shown in FIG. 25, when the terminal display device 50B is set as the target display device, the character portion 150 or the mark portion 151 indicates that the display device 50 can be operated by the operation tool 57.

In addition to the operation information, the control device 40 may determine the target display device based on the operation availability information indicating the availability of the operation transmitted from the plurality of display devices 50. As shown in FIG. 23, the control device 40 periodically or irregularly acquires the operation availability information 152 from the plurality of display devices 50 (step S6).

For example, in the case where the operation availability information transmitted from the display devices 50A and 50C indicates that "Operation is not possible", and the operation availability information transmitted from the display device 50B indicates that "Operation is possible", the control device 40 sets the display device 50B as a target display device.

In addition, when the operation availability information transmitted from the display devices 50A, 50B, and 50C indicates that "the operation is not possible", the control device 40 does not set the target display device, and the display device by the operation tool 57 does not permit the operation of the display device 50.

Figure 32A:
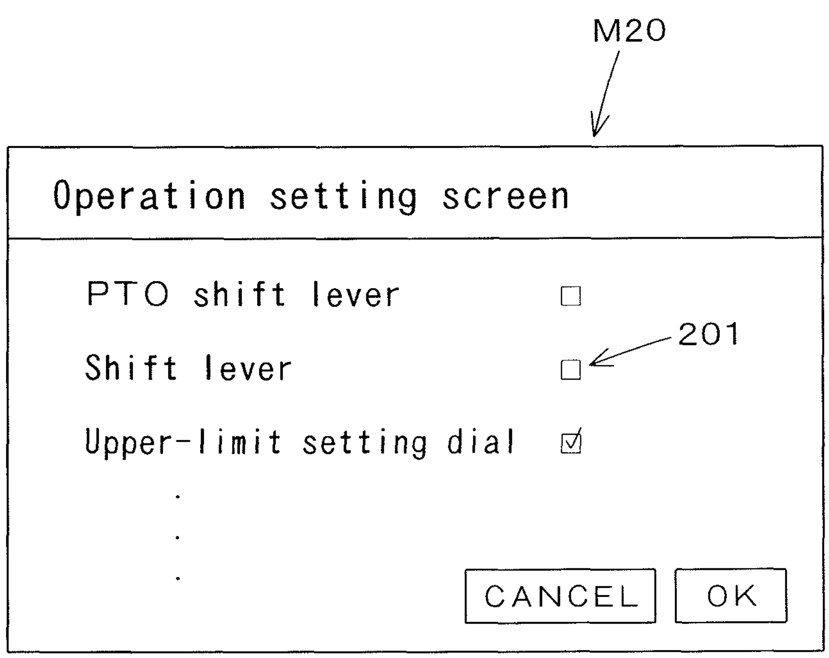
FIG. 32A is a view illustrating an example of an operation setting screen according to the embodiments.

Of the plurality of operation members 42 provided around the operator seat 10, a predetermined operation member 42 may be set to the operation tool 57 for operating the display device 50. As shown in FIG. 32A, for example, when a predetermined operation is performed, the display device 50B displays an operation setting screen M20 for setting the operation tool 57.

In the operation setting screen M20, a list of a plurality of operation members 42 (for example, a PTO shift lever, a shift lever, an upper limit setting dial, and the like) is displayed, and displays the selection portion 201 to specify the operation member 42 to be selected for the operation tool 57 from the list. In the operation setting screen M20, the operation member 42 set by the selection portion 201 is set to the operation tool 57.

Figure 32B:
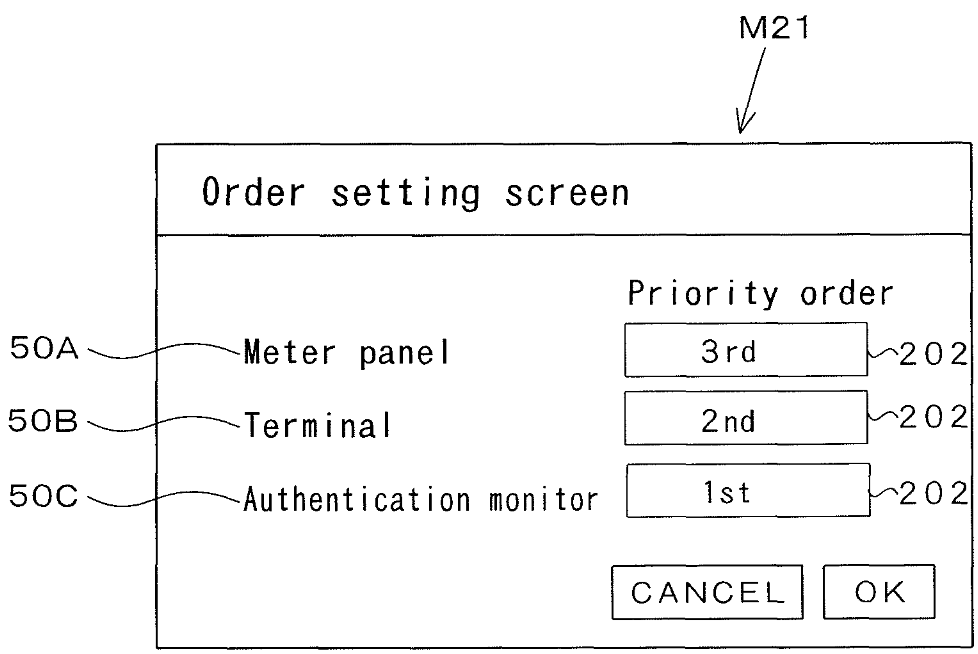
FIG. 32B is a view illustrating an example of an order setting screen according to the embodiments.

In addition, in the plurality of display devices 50, the priority to be operated by the operation tool 57 may be set. As shown in FIG. 32B, for example, when a predetermined operation is performed, the display device 50B displays a priority setting screen M21 for setting the priority of the display device 50. In the order setting screen M21, a list of a plurality of display devices 50 (for example, a meter panel, a terminal, an authentication monitor, . . . ) is displayed, and an input unit 202 for inputting a priority is displayed.

In the order setting screen M21, the display device 50 can be operated based on the priority input to the input portion 202.

When the priority of the display device 50 is set on the order setting screen M21, the operation by the operation tool 57 is sequentially performed. For example, when the operation on the display device 50 having the highest priority is completed, the display device 50 having the next highest priority can be operated.

The working machine 1 includes a plurality of display devices 50 for displaying information related to the working machine, an operation tool 57 capable of performing operations on the plurality of display devices 50, and the plurality of display devices 50 based on the operation state of the working machine. The control device 40 is provided to determine a target display device that is a display device 50 that can be operated by the operation tool 57 from the inside.

According to this, since the control device 40 can determine the target display device that can be performed by the operation tool 57 among the plurality of display devices 50, the plurality of display devices can be selected according to the operation state of the working machine 50 can be operated by the operation tool 57, and the load of operation of the display device 50 by the operation tool 57 can be reduced.

In addition, even when the display device 50 is added, the display device 50 added by the operation tool 57 already provided to the working machine 1 can also be operated.

The control device 40 determines the display device 50 that gives priority to the operation among the plurality of display devices 50 as the target display device based on the operation state of the working machine.

According to this, according to various operation states of the working machine 1, the operation of the display device 50 in which the operation should be prioritized can be easily performed using the operation tool 57.

The control device 50 determines the target display device based on the operation information of the working machine and the operation availability information indicating the operation availability transmitted from the plurality of display devices 50.

According to this, since the target display device is determined based on the operation availability information transmitted from the plurality of display devices 50, the switching of the target display device proceeds smoothly, and more display devices 50 are operated by the operation tool 57. It can be operated.

The target display device displays that the display device 50 can be operated by the operation tool 57. According to this, it is possible to easily know what display device the operator can operate with the operation tool 57.

The working machine 1 includes the ignition switch 42*b*, and the control device acquires the state of the ignition switch 42*b* as the operating state, and based on the acquired state of the ignition switch 42*b*, the target display device is selected from the plurality of display devices 50.

According to this, since the target display device is determined based on the state of the ignition switch 42*b* to be switched at the starting, the stopping, and the like of the prime mover 4, a target display that requires display at the starting, the stopping of the prime mover 4 can be operated efficiently.

The working machine 1 includes a prime mover 4, and the plurality of display devices 50 include an authentication display device 50C that displays authentication information, and a terminal display device 50B that displays information related to the setting of the working machine, and the control device 40 sets the operation tool 57 as an input device for inputting authentication information when the ignition switch 42*b* is on, and the authentication display device 50C is determined as a target display device.

In this manner, the authentication information can be shared as the operation tool 57 for inputting by the authentication display device 50C, and it is not necessary to separately provide the operating tool for inputting the authentication information, and the number of operating tools can be reduced.

The control device 40 determines the terminal display device 50B as the target display device when the authentication of the authentication information input to the input device is established, and sets the authentication display device 50C as the target display device when the authentication is not established. According to this, after the establishment of the authentication, the operation tool 57 for inputting the authentication information can be used as the operation tool of the terminal display device 50B.

The tractor 1 can be driven (activated) based on the priority value of the predetermined priority item.

Figure 26:
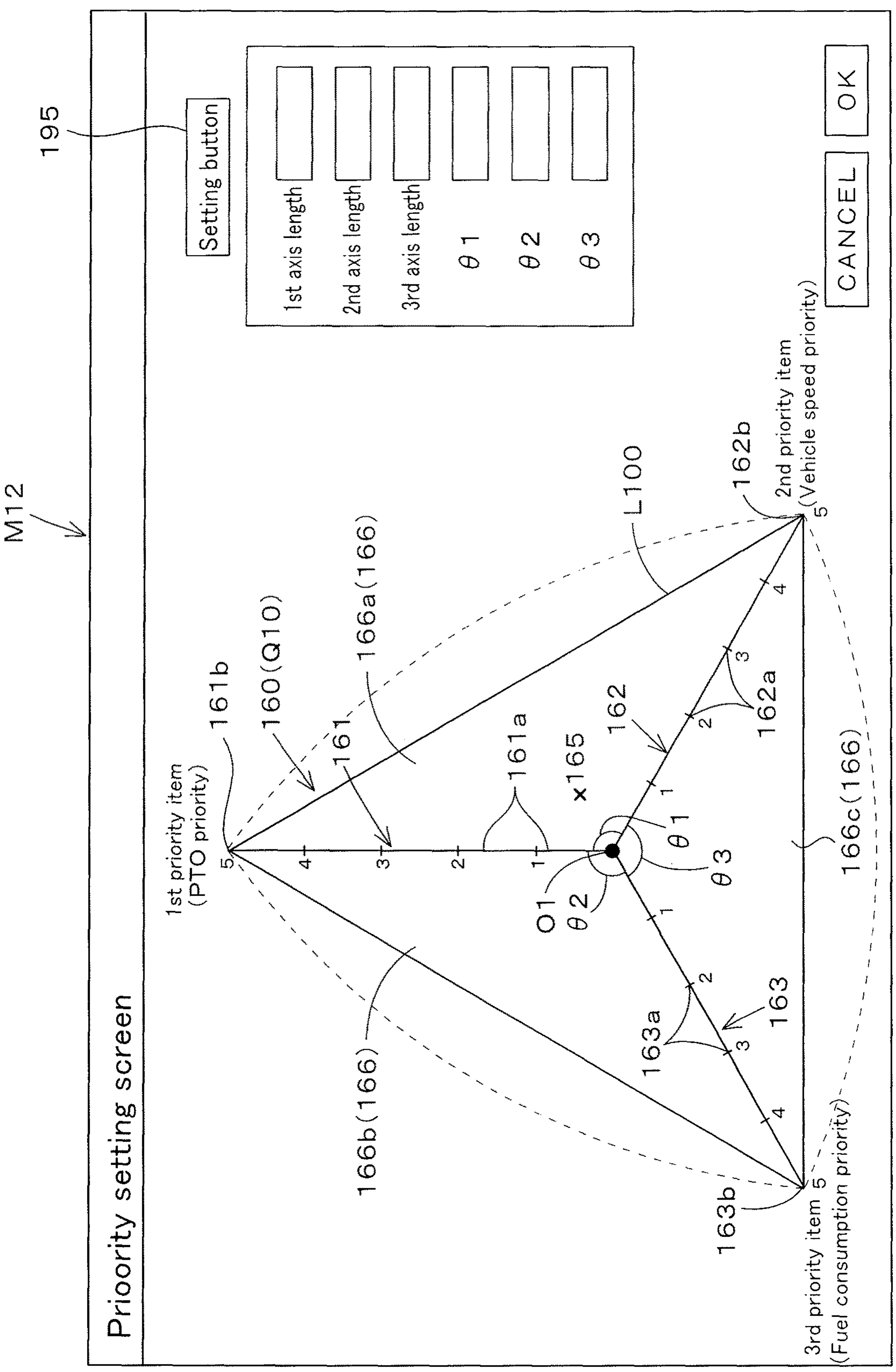
FIG. 26 is a view illustrating an example of a priority setting screen according to the embodiments.

As shown in FIG. 26, when a predetermined operation is performed on the display device 50B, the display device 50B displays a priority setting screen (12th screen) M12.

The display device 50B can set the priority values (first priority value, second priority value, third priority value) of the three priority items (first priority item, second priority item, third priority item) on the priority setting screen M12.

The priority value is a value indicating the strength of prioritizing the drive when driving the tractor 1 or the like, and as the priority value is higher, the drive based on the priority item is preferentially executed and the priority value is lower. The priority based drive is not prioritized.

The display device 50B displays the area display portion 160 on the priority setting screen M12. The area display portion 160 is a part that displays a setting area Q10 for setting a priority value. The setting area Q10 is an area for setting the first priority value of the first priority item, the second priority value of the second priority item, and the third priority value of the third priority item.

In the setting area Q10, the position (coordinates x, y) indicating the first priority value, the position (coordinates x, y) indicating the second priority value, and the position (coordinates x, y) indicating the third priority value is set in advance.

In particular, the setting area Q10 is a two-dimensional area indicating a priority value, and a reference point (origin) O1 having a priority value of zero is set in the area. In addition, in the setting area Q10, a first axis display portion 161, a second axis display portion 162, and a third axis display portion 163 passing through the reference point (origin) O1 are shown.

The first axis display portion 161 is an axis corresponding to the first priority item, and, for example, extends upward from the reference point O1. The first axis display portion 161 includes a first scale portion 161*a* that indicates a first priority value of the first priority item.

The first scale portion 161*a* is a portion indicating the first priority value based on the distance from the reference point O1. For example, the reference point O1 is set to the minimum value. At the position farthest from the reference point O1, that is, in the first axis display portion 161, the first end 161*b* which is the end opposite to the reference point O1 is set to the maximum value. The first scale portion 161*a* indicates the magnitude of the first priority value in one to five steps.

The second axis display portion 162 is an axis corresponding to the second priority item, and extends in a direction different from that of the first axis display portion 161. The second axis display portion 162 is extended, for example, to the lower right from the reference point O1. The second axis display portion 162 includes a second scale portion 162*a* indicating a second priority value of the second priority item.

The second scale portion 162*a* is a portion indicating the second priority value based on the distance from the reference point O1. For example, the reference point O1 is set to the minimum value. At the position farthest from the reference point O1, that is, in the second axis display portion 162, the second end 162*b* which is the end opposite to the reference point O1 is set to the maximum value. The second scale portion 162*a* indicates the magnitude of the second priority value in one to five steps.

The third axis display portion 163 is an axis corresponding to the third priority item, and extends in a direction different from the first axis display portion 161 and the second axis display portion 162. The third axis display portion 163 is, for example, extended downward to the left from the reference point O1. The third axis display portion 163 includes a third scale portion 163*a* indicating the third priority value of the third priority item.

The third scale portion 163*a* is a portion indicating the third priority value based on the distance from the reference point O1. For example, the reference point O1 is set to the minimum value. At the position farthest from the reference point O1, that is, in the third axis display portion 163, the third end 162*b* which is the end opposite to the reference point O1 is set to the maximum value. The third scale portion 163*a* indicates the magnitude of the third priority value in one to five steps.

Thus, in the setting area Q10, when the position corresponding to the first scale portion 161*a* of the first axis display portion 161 and the position corresponding to the second scale portion 161*b* of the second axis display portion 162 are selected, the first priority value and the second priority value can be set.

In the setting area Q10, when the position corresponding to the first scale portion 161*a* of the first axis display portion 161 and the position corresponding to the third scale portion 163*b* of the third axis display portion 163 are selected, the first priority value and the third priority value can be set.

In addition, in the setting area Q10, when the position corresponding to the second scale portion 162*a* of the second axis display portion 162 and the position corresponding to the third scale portion 163*b* of the third axis display portion 163 are selected, the second priority value and third priority value can be set.

As described above, when the priority value is set, the marker display portion 165 is displayed in the setting area Q10. The marker display portion 165 indicates at least two of the first priority value, the second priority value, and the third priority value (the first priority value and the second priority value, the first priority value and the third priority value, and the second priority value and the third priority value).

Hereinafter, the display of the marker display portion 165 will be described in detail along with the configuration of the setting area Q10.

The setting area Q10 is composed by linearly connecting between two of the first end 161*b* of the first axis display portion 161, the second end 162*b* of the second axis display portion 162, and the third end 163*b* of the third axis display portion 163, and thus has a triangle shape.

Meanwhile, a length of the first axis display portion 161 (a length from the reference point O1 to the first end portion 161*b*), a length of the second axis display portion 162 (a length from the reference point O1 to the second end portion 162*b*), and a length of the third axis display portion 163 (a length from the reference point O1 to the third end portion 161*b*) are identical.

An opening angle θ1 between the first axis display portion 161 and the second axis display portion 162, an opening angle θ2 between the first axis display portion 161 and the third axis display portion 163, and an opening angle θ2 between the second axis display portion 162 and the third axis display portion 163 are predetermined angles, and is set to, for example, 120 degrees. Thus, the setting area Q10 is an equilateral triangle.

When the setting button 195 displayed on the priority setting screen M12 is selected on the display device 50B, a window for changing the lengths of the first axis display portion 161, the length of the second axis display portion 162, and the length of the third axis display portion 163 or a window for changing the opening angles θ1 to θ3 is displayed. The shape of the setting area Q10 can be changed by changing the lengths of the first axis display portion 161, the second axis display portion 162, and the third axis display portion 163 and changing the opening angles θ1 to θ3.

The shape of the line L100 connecting the first end 161*b*, the second end 162*b*, and the third end 163*b* may be changed to an arbitrary shape such as a circular arc as indicated by a dotted line, for example. According to this, it is possible to change the range of priority values to be set by changing the opening angles θ1 to θ3 and the lengths.

The setting area Q10 also includes a divided area 166 divided by the first axis display portion 161, the second axis display portion 162, and the third axis display portion 163.

The division area 166 is an area corresponding to at least two axis display portions among the first axis display portion 161, the second axis display portion 162, and the third axis display portion 163. In particular, the division area 166 is any of the first partial area 166*a*, the second partial area 166*b*, and the third partial area 166*c*.

The first partial area 166*a* is an area divided by the first axis display portion 161 and the second axis display portion 162, and the second partial area 166*b* is divided by the first axis display portion 161 and the third axis display portion 163. The third area 166*c* is an area divided by the second axis display portion 162 and the third axis display portion 163.

The marker display portion 165 is a marker for displaying the priority value set in the partial area 166, and is displayed in the first partial area 166*a* when the first priority value and the second priority value are set. And, the marker display portion 165 is displayed when the first priority value and the third priority value are set, and is displayed in the third partial area 166*c* when the second priority value and the third priority value are set.

Thus, in a state where the priority setting screen M12 is displayed on the display device 50B, an arbitrary part of the setting area Q10 (the first partial area 166*a*, the second partial area 166*b*, the third partial area 166*c*) is operated by touch operation, and any portion of the setting area Q10 is selected by operating the operation tool 57. In this manner, at least two of the first priority value corresponding to the first priority item, the second priority value corresponding to the second priority item, and the third priority value corresponding to the third priority item can be set simultaneously.

Now, on the priority setting screen M12, "PTO priority" giving priority to rotation of the PTO axis is represented as the first priority item, and "vehicle speed priority" giving priority to the vehicle speed is represented as the second priority item. As the third priority item, "fuel efficiency priority" giving priority to fuel consumption consumed by the prime mover 4 at the time of driving is represented on the priority setting screen M12.

The operating portion (second operating portion) of the prime mover 4 and the transmission device 5 is variably driven based on a first priority value corresponding to PTO priority, a second priority value corresponding to vehicle speed priority, and a third priority value corresponding to fuel efficiency priority.

PTO priority indicates that control to maintain the rotation of the PTO axis is prioritized. The first scale portion 161*a* of the first axis display portion 161 indicates a value giving priority to the PTO revolving speed as the first priority value. The higher the numerical value is, the stronger the control for maintaining the PTO revolving speed is, and the lower the numerical value is, the weaker the control to maintain the PTO speed is.

For example, when the rotation of the PTO shaft (PTO revolving speed) is set to a predetermined revolving speed, the control device 40 varies intensity to maintain the actual PTO revolving speed at the set revolving speed according to the first priority value.

The vehicle speed priority indicates that the control for maintaining the vehicle speed is prioritized. The second scale portion 162*a* of the second axis display portion 162 shows a value giving priority to the vehicle speed as the second priority value, and the control for maintaining the vehicle speed is strong as the numerical value is high, and the control for maintaining the vehicle speed is weak as the numerical value is low.

For example, when the vehicle speed is set to a predetermined number of revolutions, the control device 40 changes the strength of maintaining the actual vehicle speed at the set vehicle speed according to the second priority value.

The fuel efficiency priority indicates that the control for maintaining the fuel efficiency is prioritized. The third scale portion 163*a* of the third axis display portion 163 indicates a value that gives priority to maintaining of fuel consumption as a third priority value. The higher the numerical value is, the stronger the control for maintaining the fuel consumption is, and the lower the numerical value is, the weaker the control form maintaining the vehicle speed is. For example, when the fuel consumption is set to a predetermined number of revolutions, the control device 40 changes the strength for maintaining the actual fuel consumption to the set fuel consumption according to the third priority value.

For example, when the first priority value of PTO priority is higher than the other second priority value and the third priority value, the control device 40 causes the prime mover revolving speed to be such that the PTO revolving speed becomes a predetermined revolving speed. Or the combination of the prime mover revolving speed and the gear position of the PTO transmission portion 5*e*3 holds the PTO revolving speed at a predetermined revolving speed.

For example, when the second priority value for vehicle speed priority is higher than the other first and third priority values, the control device 40 corresponds to the vehicle speed for which the number of revolutions of the front axle 21F or the rear axle 21R is predetermined. The gear position (shift level) of the main speed-changing portion 5*c*, the gear position (shift level) of the auxiliary speed-changing portion 5*d*, the prime mover revolving speed, and the like are changed so as to match the revolving speed.

The change of the gear position (shift level) of the main speed-changing portion 5*c* is performed by the change of the swash plate angle of the swash plate 12 of the hydraulic pump 5*c*1, the change of the revolving speed outputted from the hydraulic prime mover 5*c*2 to the planetary gear mechanism 5*c*3 (the change of the hydraulic motor 5*c*2, the change of the revolving speed in a passage to input from the hydraulic prime mover 5*c*2 to the planetary gear mechanism 5*c*3), the change of the flow rate of the hydraulic oil supplied to the hydraulic pump 5*c*1 (the change of opening aperture of the control valve in the hydraulic circuit of the hydraulic pump 5*c*1), and the like.

For example, when the third priority value for fuel efficiency priority is higher than the other second and third priority values, the controller 40 controls the fuel consumption consumed by the prime mover 4 to be equal to or less than a predetermined value. The gear position (gear shift level) of the main speed-changing portion 5*c*, the gear position (gear shift level) of the auxiliary speed-changing portion 5*d*, the number of revolutions of the prime mover, and the like, are changed.

The working portion 1 has an operating portion (second operating portion) that operates based on the first priority value of the first priority item, the second priority value of the second priority item, and the third priority value of the third priority item, and the display device 50B configured to set the first priority value, the second priority value, and the third priority value.

The display device 50B includes the area display portion 160 to display the setting area Q10 for setting the first priority value, the second priority value, and the third priority value, a first axis display portion 161 passing the reference point O1 shown in the setting area Q10 and including the first scale portion 161*a* indicating a first priority value based on a distance from the reference point O1, a second axis display portion 162 including the second scale portion 162*a* indicating a second priority value based on a distance from a reference point O1 and extending in a direction different from the first axis display portion 161 through the reference point O1, a third axis display portion 163 including the third scale portion 162*a* indicating a third priority value based on a distance from a reference point O1 and extending in a direction different from the second axis display portion 162 through the reference point O1, and a marker display portion 165 indicated in the partial area 166 corresponding at least two of the first axis display portion 161, the second axis display portion 162, and the third axis display portion 163, that is, in the setting area Q10, the marker display portion 16 indicating at least two of the first priority value, the second priority value, and third priority value.

According to this, the marker display portion 166 indicating at least two of the first priority value, the second priority value, and the third priority value can be displayed in the partial area 166 corresponding to the first axis display portion 161 corresponding to the first priority value, a second axis display portion 162 corresponding to the second priority value, and a third axis display portion 163 corresponding to the third priority value.

Thus, for example, the relationship between the first priority value and the second priority value, the relationship between the first priority value and the second priority value, and the relationship between the second priority value and the third priority value can be visually known.

The area display portion 160 displays, as the setting area Q10, an area composed by connecting a first end 161*b* opposite to the reference point O1 in the first axis display portion 161, a second end 162*b* opposite to the reference point O1 in the second axis display portion 162, and a third end 163*b* opposite to the reference point O1 in the third axis display portion 163.

According to this, since the area connecting the ends of the three axes (the first axis display portion 161, the second axis display portion 162, and the third axis display portion 163) is set in the setting area Q10, it is easy to set two values (priority values) inside the setting area Q10.

Opening angles θ1 to θ3 of the first axis display portion 161, the second axis display portion 162, and the third axis display portion 163 with respect to the reference point O1 are set to preset angles.

According to this, the area of the partial area 166 can be set by the opening angles θ1 to θ3 of the respective axis display portions (the first axis display portion 161, the second axis display portion 162, and the third axis display portion 163). The relationship (ratio of priority values, ratio) of at least two values can be determined.

The division area 166 is a first partial area 161*a* divided by the first axis display portion 161 and the second axis display portion, and a second partial area divided by the first axis display portion 161 and the third axis display portion 163. The third partial area 166 *c* is divided by the second axis display portion 162 and the third axis display portion 163.

According to this, the first partial area 161*a* can set the first priority value and the second priority value, the second partial area 166*b* can set the first priority value and the third priority value, and the third partial area 166*c* can set the second priority value and the fourth priority value.

The operating portion includes a prime mover 4 and a transmission device 5 including a PTO shaft 16 rotated by power from the prime mover 4 and shifting the power from the prime mover 4. The prime mover 4 and the transmission device 5 changes driving modes thereof based on the first priority value, the second priority value, and the third priority value.

According to this, it is possible to change the drive of the prime mover 4 and the drive of the PTO axis according to the first priority value, the second priority value, and the third priority value.

The first scale portion 161*a* indicates a value that prioritizes the rotation of the PTO shaft 16 as a first priority value, the second scale portion 161*b* indicates a value that prioritizes the vehicle speed as a second priority value, and the third scale portion 161*c* indicates a value that prioritizes the fuel consumption consumed by the prime mover 4 as a third priority value.

According to this, the priority of the rotation of the PTO shaft 16, the vehicle speed, and the fuel consumption can be determined.

The transmission device 5 is provided with a continuously variable transmission mechanism for continuously changing the power.

According to this, since the transmission device 5 is a continuously variable transmission mechanism, it is possible to set a fine priority value.

Figure 27:
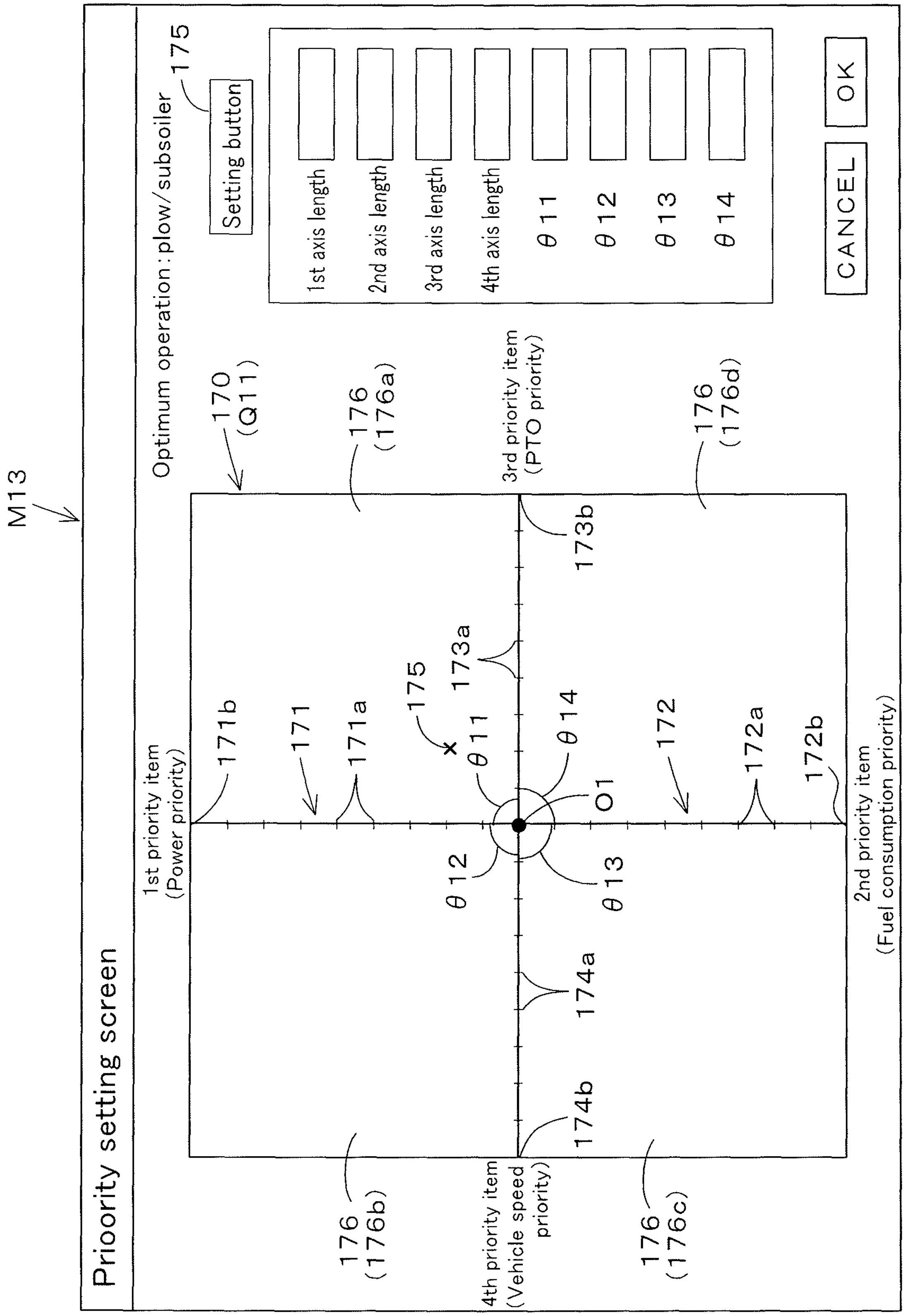
FIG. 27 is a view illustrating an example of the priority setting screen according to the embodiments.

FIG. 27 shows a priority setting screen (13th screen) M13 which is a modification of the above-described priority setting screen (12th screen) M12. The display device 50B of the tractor 1 displays either the priority setting screen M12 or the priority setting screen M13.

When a predetermined operation is performed on the display device 50B, the display device 50B displays the priority setting screen M13.

The display device 50B displays, in the priority setting screen M13, priority values (first priority value, second priority value) of four priority items (first priority item, second priority item, third priority item, fourth priority item). The third priority value and the fourth priority value can be set.

The display device 50B displays the area display portion 170 on the priority setting screen M13. The area display portion 170 is a part that displays a setting area Q11 in which priority values are set. The setting area Q11 is an area to set the first priority value of the first priority item, the second priority value of the second priority item, the third priority value of the third priority item, and the fourth priority value of the fourth priority item.

In the setting area Q11, a position (coordinates x, y) indicating a first priority value, a position (coordinates x, y) indicating a second priority value, a position (coordinates x, y) indicating a third priority value, and a position (coordinates x, y) indicating a fourth priority value are set in advance. In particular, a reference point (origin) O1 is also set in the setting area Q11.

In the setting area Q11, a first axis display portion 171 having a first scale portion 171*a*, a second axis display portion 172 having a second scale portion 172*a*, a third axis display portion 173 having a third scale portion 173*a*, and a fourth axis display portion 174 having a fourth scale portion 174*a* are displayed. The first axis display portion 171, the second axis display portion 172, the third axis display portion 173, and the fourth axis display portion 174 pass through the reference point O1.

The first axis display portion 171 is extended upward from the reference point O1. The first scale portion 171*a* is a portion that indicates the first priority value according to the distance from the reference point O1, for example, the reference point O1 is set to the minimum value, and the position farthest from the reference point O1 (first The end 171*b*) is set to the maximum value. The first scale portion 171*a* indicates the magnitude of the first priority value in one to five steps.

The second axis display portion 172 is an axis extending to the opposite side to the first axis display portion 171, and is extended downward from the reference point O1. The second axis display portion 172 includes a second scale portion 172*a* indicating a second priority value of the second priority item.

The second scale portion 172*a* is a portion showing a second priority value according to the distance from the reference point O1, for example, the reference point O1 is set to the minimum value, and the position farthest from the reference point O1 (second The end 172*b*) is set to the maximum value. The second scale portion 172*a* indicates the magnitude of the second priority value in one to five steps.

The third axis display portion 173 is an axis extending in a direction different from the first axis display portion 171 and the second axis display portion 172, and is extended rightward from the reference point O1. The third axis display portion 173 includes a third scale portion 173*a* indicating a third priority value of the third priority item.

The third graduation portion 173*a* is a portion showing a third priority value according to the distance from the reference point O1, for example, the reference point O1 is set to the minimum value, and the position farthest from the reference point O1 (third The end portion 173*b*) is set to the maximum value. The third scale portion 173*a* indicates the magnitude of the third priority value in one to five steps.

The fourth axis display portion 174 is an axis extending to the opposite side to the third axis display portion 173, and is extended leftward from the reference point O1. The fourth scale portion 174*a* is a portion that indicates the second priority value according to the distance from the reference point O1, for example, the reference point O1 is set to the minimum value, and the position farthest from the reference point O1 (the fourth end portion 174*b*) is set to the maximum value. The fourth scale portion 174*a* indicates the magnitude of the fourth priority value in 1 to 5 steps.

Thus, in the setting area Q11, when the position corresponding to the first scale portion 171*a* of the first axis display portion 171 and the position corresponding to the third scale portion 173*b* of the third axis display portion 173 are selected, the first priority values and third priority values can be set.

When the position corresponding to the first scale portion 171*a* of the first axis display portion 171 and the position corresponding to the fourth scale portion 174*b* of the fourth axis display portion 174 are selected in the setting area Q11, the first priority value and the fourth priority value can be set.

When the position corresponding to the second scale portion 172*a* of the second axis display portion 172 and the position corresponding to the fourth scale portion 174*b* of the fourth axis display portion 174 are selected in the setting area Q11, the second priority value and the fourth priority value can be set.

In addition, in the setting area Q11, when the position corresponding to the second scale portion 172*a* of the second axis display portion 172 and the position corresponding to the third scale portion 173*b* of the third axis display portion 173 are selected, the second priority value and third priority value can be set.

As described above, when the priority value is set, the marker display portion 175 is displayed in the setting area Q11. The marker display portion 175 represents at least two of the first priority value, the second priority value, the third priority value, and the fourth priority value (the first priority value and the third priority value, the first priority value and the fourth priority value, the second priority value and the fourth priority value, and the second priority value and the third priority value).

Hereinafter, the display of the marker display portion 175 will be described in detail along with the configuration of the setting area Q11.

The setting area Q11 is composed by connecting a first end 171*b* of the first axis display portion 171, a second end 172*b* of the second axis display portion 172, a third end 173*b* of the third axis display portion 173, and a fourth end 174*b* of the fourth axis display portion 174, and has a quadrangle shape.

The lengths of the first axis display portion 171, the second axis display portion 172, the third axis display portion 173, and the fourth axis display portion 174 are set to be the same. The opening angle θ11 between the first axis display portion 171 and the third axis display portion 173, the opening angle θ12 between the first axis display portion 171 and the fourth axis display portion 174, the opening angle θ13 between the second axis display portion 172 and the fourth axis display portion 174, and the opening angle θ14 between the second axis display portion 172 and the fourth axis display portion 174 are predetermined angles, and are set to, for example, 90 degrees. Thus, the setting area Q11 is a square.

In the display device 50B, when the setting button 195 displayed on the priority setting screen M13 is selected, a window for changing the length of the first axis display portion 171, the length of the second axis display portion 172, and the length of the third axis display portion 173, or a window for changing the opening angles θ11 to θ14 is displayed.

The lengths of the first axis display portion 171, the second axis display portion 172, the third axis display portion 173, and the fourth axis display portion 174 are changed, the opening angles θ11 to θ14 are changed, and thereby the shape of the setting area Q11 can be changed.

In addition, the setting area Q11 includes a divided area 176 divided by the first axis display portion 171, the second axis display portion 172, the third axis display portion 173, and the fourth axis display portion 174. The division area 176 is an area corresponding to at least two axis display portions among the first axis display portion 171, the second axis display portion 172, the third axis display portion 173, and the fourth axis display portion 174.

In particular, the division area 176 is any one of the first partial area 176*a*, the second partial area 176*b*, the third partial area 176*c*, and the fourth partial area 176*d*.

The first partial area 176*a* is an area divided by the first axis display portion 171 and the third axis display portion 173, and the second partial area 176*b* is an area divided by the first axis display portion 171 and the fourth axis display portion 174. The third part area 176*c* is an area divided by the second axis display part 172 and the fourth axis display part 174. The fourth part area 176*d* is an area divided by the second axis display part 172 and the third axis display part 173.

The marker display portion 175 is a marker that displays the priority value set in the partial area 176. The marker is displayed in the first partial area 176*a* when the first priority value and the third priority value are set, and is displayed in the second partial area 176*b* when the first priority value and the fourth priority value are set. In addition, the marker is displayed in the third partial area 176*c* when the second and fourth priority values are set, and is displayed in the fourth partial area 176*d* when the second priority value and the third priority value are set.

Thus, in a state where the priority setting screen M13 is displayed on the display device 50B, at least two of the first priority value corresponding to the first priority item, the second priority value corresponding to the second priority item, and the third priority value corresponding to the third priority item, and the fourth priority value corresponding to the fourth priority item can be set at the same time by selecting an arbitrary part of the setting area Q11 through touch operation to an arbitrary part of the setting area Q1 (the first partial area 176*a*, the second partial area 176*b*, the third partial area 176*c*) or through operation of the operation tool 57.

Now, on the priority setting screen M13, "power priority" to prioritize output is indicated as the first priority item, "fuel efficiency priority" is indicated as the second priority item, "vehicle speed priority" is indicated as the third priority item, and "PTO priority" is indicated as the fourth priority item.

Also in the case of the modification, the prime mover 4 and the operating portion (second operating portion) of the transmission device 5 change driving modes thereof based on the first priority value corresponding to the power priority, the second priority value corresponding to the fuel efficiency priority, the third priority value corresponding to the vehicle speed, and the fourth priority value corresponding to the PTO priority.

Power priority indicates that control to maintain the output is prioritized. The first scale portion 171*a* of the first axis display portion 171 indicates a value that gives priority to the output of the prime mover revolving speed and the PTO revolving speed as the first priority value. And, the higher the numerical value is, the stronger the control for increasing the output is, and the control for increasing the output of the prime mover revolving speed and the PTO revolving speed becomes weaker as the numerical value becomes lower.

The control device 40 executes control in a direction to increase the actual prime mover revolving speed and the PTO revolving speed according to the first priority value so that the work in the working device 2 can be performed with a high output. The fuel consumption priority, the vehicle speed priority, and the PTO priority are the same as those in the embodiment described above.

An example of a suitable operation is displayed on the priority setting screen M13. Since the first partial area 176*a* is power priority and vehicle speed priority, it is displayed that the heavy load work is suitable. Since the second partial area 176 *b* is power priority and PTO priority, the working device 2 of "rotary" is displayed as being suitable for ground work and as PTO work.

Since the third partial area 176*c* is PTO priority and fuel consumption priority, it is displayed that the spraying operation is suitable and the working device 2 of the "sprayer/harvester" is displayed. Since the fourth partial area 176*c* is fuel efficiency priority and vehicle speed priority, it is displayed that the light load operation is suitable, and the operation device 2 of "Tedder" is displayed as the light load operation, for example.

The working machine 1 includes the operating portion (the second operating portion) to be operated based on the first priority value of the first priority item, the second priority value of the second priority item, the third priority value of the third priority item, and the fourth priority value of the fourth priority item, and the display device 50B for setting the first priority value, the second priority value, the third priority value, and the fourth priority value. The display device 50B includes the area display portion 170 for displaying the setting area Q11 for setting the first priority value, the second priority value, the third priority value, and the fourth priority value, the first axis display portion 171 including the first scale portion 171*a* indicating the first priority value based on a distance from the reference point O1 and passing through the reference point O1 shown in the setting area Q11, the second axis display portion 172 including the second scale portion 172*a* indicating the second priority value based on a distance from the reference point O1 and extending in a direction opposite to the first axis display portion 171 through the reference point O1, the third axis display portion 173 including the third scale portion 173*a* indicating the third priority value based on a distance from the reference point O1 and extending in a direction opposite to the first axis display portion 171 and the second axis display portion 172 through the reference point O1, the fourth axis display portion 174 including the fourth scale portion 174*a* indicating the fourth priority value based on a distance from the reference point O1 and extending in a direction opposite to the third axis display portion 173 through the reference point O1, and the marker display portion 175 indicated in the setting area Q11, that is, in a partial area corresponding to at least two of the first axis display portion 171, the second axis display portion 172, the third axis display portion 173, and the fourth axis display portion 174, the marker display portion 175 indicating at least two of the first priority value, the second priority value, the third priority value, and the fourth priority value.

According to this, the marker display portion 175 indicating at least two of the first priority value, the second priority value, the third priority value, and the fourth priority value can be displayed in the partial area 176 corresponding to the first axis display portion 171 corresponding to the first priority value, the second axis display portion 172 corresponding to the second priority value, the third axis display portion 173 corresponding to the third priority value, and the fourth axis display portion 174 corresponding to the fourth priority value.

Thus, for example, the relationship between the first priority value and the third priority value, the relationship between the first priority value and the fourth priority value, the relationship between the second priority value and the fourth priority value, and the relationship between the second priority value and the third priority value can be known visually.

The area display portion 170, as the setting area Q11, displays an area connecting the first end portion 171*b* opposite to the reference point O1 in the first axis display portion 171, the second end portion 172*b* opposite to the reference point O1 in the second axis display portion 172, the third end portion 173*b* opposite to the reference point O1 in the third axis display portion 173, and the fourth end portion 174*b* opposite to the reference point O1 in the fourth axis display portion 174.

According to this, an area connecting the ends of four axes (first axis display portion 171, second axis display portion 172, third axis display portion 173 and fourth axis display portion 174) is set in setting area Q11. Thus, it is easy to set two values (priority values) in the setting area Q11.

The opening angles θ11 to θ14 of the first axis display portion 171, the second axis display portion 172, the third axis display portion 173, and the fourth axis display portion 174 with respect to the reference point O1 are set to preset angles.

According to this, according to the opening angles θ11 to θ14 of the respective axis display portions (the first axis display portion 171, the second axis display portion 172, the third axis display portion 173 and the fourth axis display portion 174), the area of the partial area 176 can be set, and the relationship of at least two values (rate of priority values, ratio) can be determined.

The divided area 176 is any one of the first partial area 176*a* divided by the first axis display portion 171 and the third axis display portion 173, the second partial area 176*b* divided by the first axis display portion 171 and the fourth axis display portion 174, the third partial area 176*c* divided by the second axis display portion 172 and the fourth axis display portion 174, and the fourth partial area 176*d* divided by the second axis display portion 172 and the third axis display portion 173.

According to this, the first partial area 176*a* sets the first priority value and the third priority value, the second partial area 176*b* sets the first priority value and the fourth priority value, the third partial area 176*c* sets the second priority value and the fourth priority value, and the fourth partial area 176*d* sets the second priority value and the third priority value.

The operating portion includes the prime mover 4 and the transmission device 5 including the PTO shaft 16 rotated by power from the prime mover 4 and shifting the power from the prime mover 4. The prime mover 4 and the transmission device 5 change the driving modes thereof based on the first priority value, the second priority value, the third priority value, and the fourth priority value.

According to this, the drive of the prime mover 4 and the drive of the PTO axis can be changed according to the first priority value, the second priority value, the third priority value, and the fourth priority value.

The first scale portion 171*a* indicates a value that gives priority to the output of the PTO axis as the first priority value, and the second scale portion 172*a* indicates a value that gives priority to fuel consumption consumed by the prime mover as the second priority value. The third scale portion 173*a* indicates a value that gives priority to the vehicle speed as the third priority value, and the fourth scale portion 174*a* indicates a value that gives priority to the rotation of the PTO axis as the fourth priority value. In FIG. 27, the display positions of the "vehicle speed priority" and the "PTO priority" may be switched each other.

According to this, the output of the PTO shaft 16, the fuel consumption, the vehicle speed, and the rotation of the PTO shaft can be determined.

The transmission device 5 is provided with a continuously variable transmission mechanism for continuously changing the power.

According to this, since the transmission device 5 is a continuously variable transmission mechanism, it is possible to set a fine priority value.

Second Embodiment

The second embodiment shows a modification of the first embodiment. In the second embodiment, the control device 40 determines permission/non-permission of operation of the display device 50 based on the relationship between the establishment (the authentication establishment) of the authentication information and the display device 50 previously associated with the authentication.

In the embodiment described above, the plurality of display devices 50 are operated by the operation tool 57. However, the display device 50 may be operated individually by another operation tool.

FIG. 28A is a diagram showing the relationship between the matter relating to the authentication of the authentication information and the operation of the display device 50. As shown in FIG. 28A, when authentication is established among the meter display device 50A, the terminal display device 50B and the authentication display device 50C, the control device 40 permits the operation of the meter display device 50A and the terminal display device 50B (Operation is allowed).

When the operation is permitted, the meter display device 50A and the terminal display device 50B receive the operation of the operation tool 57 or the touch operation.

In addition, among the meter display device 50A, the terminal display device 50B, and the authentication display device 50C, the control device 40 disallows the operation of the meter display device 50A and the terminal display device 50B when the authentication is not established (the operation is not possible). When the operation is not permitted, the meter display device 50A and the terminal display device 50B do not receive the operation of the operation tool 57 or the operation of the touch operation.

That is, when authentication of the authentication information is established, the control device 40 permits operation of the setting display devices 50A and 50B which are display devices set in advance among the plurality of display devices 50, and authentication is performed when authentication is not established. The operation of the setting display devices 50A and 50B other than the display device (authentication display device) 50C for displaying information is not permitted.

Here, the relationship between the matter relating to the authentication of the authentication information and the operation of the display device 50, that is, the setting display device among the plurality of display devices 50 can be arbitrarily set.

As shown to FIG. 1C, the tractor 1 is provided with the setting part 155 which sets a setting display device and. The setting portion 155 is provided in any of the plurality of display devices 50 and the control device 40.

The setting portion 155 is constituted of electrical/electronic components provided in a plurality of display devices 50, programs incorporated in the plurality of display devices 50, electrical/electronic components provided in a control device 40, and computer programs incorporated in the control device 40.

Figure 29:
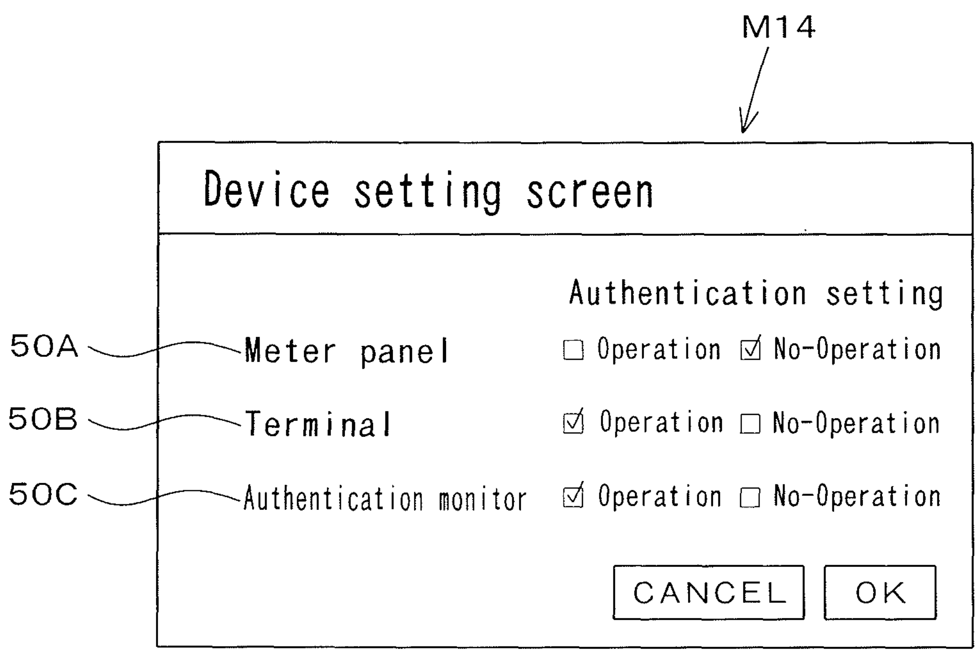
FIG. 29 is a view illustrating an example of a device setting screen according to the embodiments.

When there is a setting display device at least for which authentication has been established and the operation is permitted, the setting portion 155 displays a device setting screen (14th screen) M14 on the setting display device as shown in FIG. 29.

The setting portion 155 displays, on the device setting screen M14, the name and the like of the display devices 50 (a meter display device 50A, a terminal display device 50B, and an authentication display device 50C) mounted on the tractor 1, and displays matters (authentication setting information) relating to authentication of authentication information.

The setting portion 155 can change, on the device setting screen M14, the authentication setting information corresponding to the meter display device 50A and the authentication setting information corresponding to the terminal display device 50B based on the operation tool of the operation tool 57.

For example, as shown in FIG. 28B, in the authentication setting information corresponding to the meter display device 50A, the content that was not operable when authentication is not established is changed to the content of being operable.

That is, the setting portion 155 can exclude the meter display device 50A set in the setting display device in FIG. 28A from the setting display device as shown in FIG. 28B. The authentication setting information set by the setting portion 155 can be stored in the non-volatile storage portion 156 provided in the control device 40.

Figure 30:
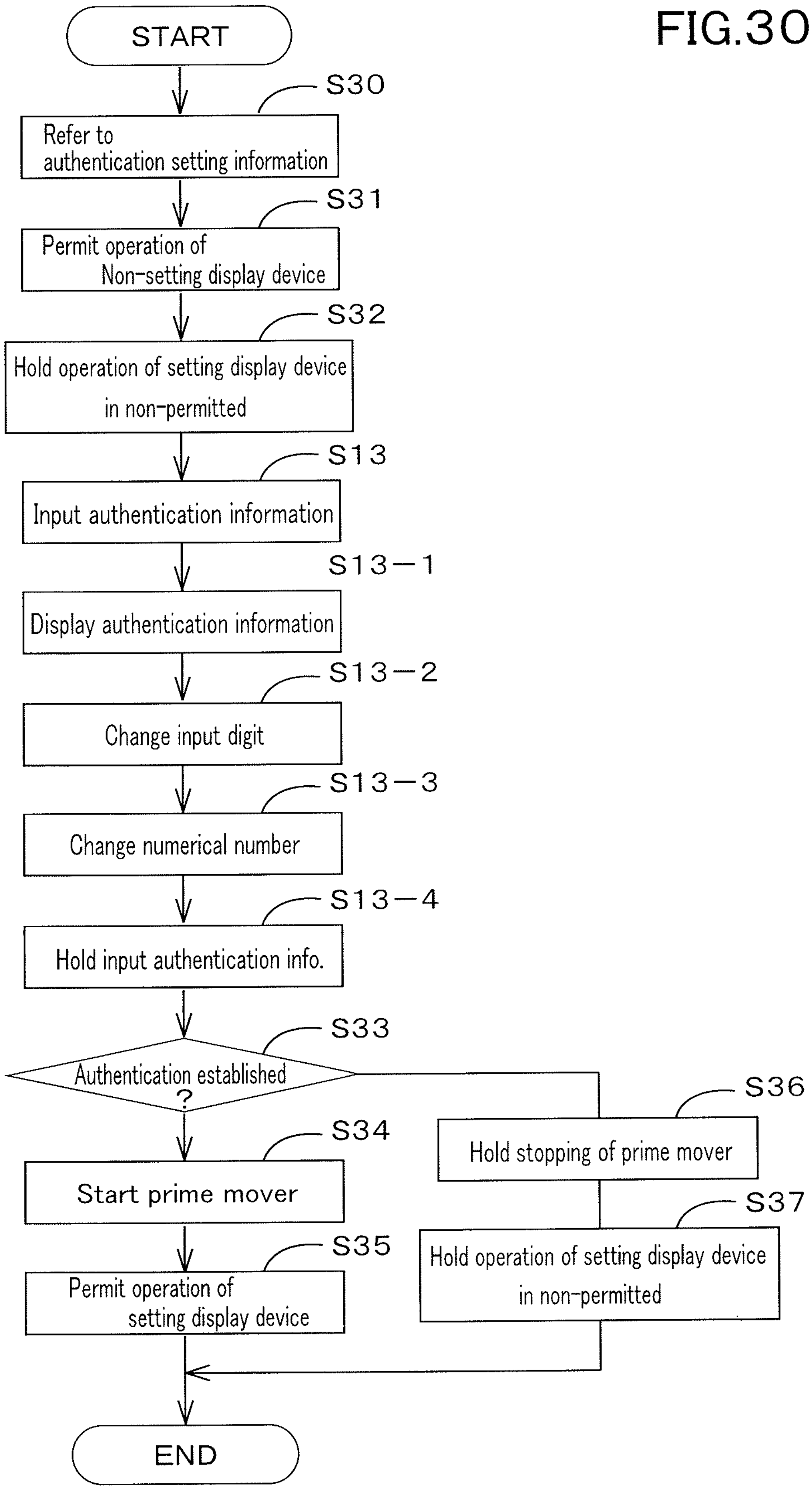
FIG. 30 is a view illustrating a flow of operation of a plurality of display devices based on the certification of certification information according to the embodiments.

FIG. 30 is a diagram showing a flow of operation of the plurality of display devices 50 based on the authentication of the authentication information.

As shown in FIG. 30, when the ignition switch 42*b* is turned on, the control device 40 refers to the authentication setting information of the storage portion 156 (step S30).

After referring to the authentication setting information, the control device 40 permits the operation of the display device 50 not set in the setting display device, for example, the operation of the meter display device 50A (step S31).

In addition, the control device 40 holds the operation of the display device 50 set in the setting display device, for example, the terminal display device 50B in an unauthorized manner (step S32).

The authentication display device 50C can be operated regardless of whether the authentication is established. Next, the control device 40 shifts to input processing (step S13).

The input process is the same as step S13-1 to step S13-4 described above.

The control device 40 authenticates the memory authentication information stored in advance and the input authentication information, and when the authentication is established (step S33, Yes), permits the start of the prime mover 4 and starts the prime mover 4 (step S34).

In addition, the control device 40 permits the operation of the setting display device (the terminal display device 50B) together with the permission of the start of the prime mover 4 (step S35).

For example, the control device 40 outputs a permission signal for permitting operation to the setting display device (terminal display device 50B). When the setting display device (terminal display device 50B) receives the permission signal, the setting display device receives operation information such as a touch operation and the operation tool 57, and displays various information on the display portion 55 based on the received operation information.

On the other hand, when the authentication is not established (step S33, No), the control device 40 does not permit the start of the prime mover 4 and holds the prime mover 4 in the stop state (step S36).

In addition, the control device 40 holds the operation of the setting display device (terminal display device 50B) in an unauthorized manner (step S37).

For example, the control device 40 outputs a non-permission signal for disallowing an operation to the setting display device (terminal display device 50B). When the setting display device (terminal display device 50B) receives the non-permission signal, the setting display device does not receive touch information or operation information of the operation tool 57 or the like, and does not execute display according to the operation.

When the setting display device (terminal display device 50B) can not acquire either the permission signal or the non-permission signal, the setting display device (terminal display device 50B) stops receiving an input from outside of the touch operation or the operation tool 57 or the like. Alternatively, the setting display device (terminal display device 50B) stops the operation even when the touch operation or the operation of the operation tool 57 or the like is performed.

In addition, after the authentication is established, the control device 40 continuously transmits the permission signal to the setting display device every predetermined time, and the setting display device may be permitted to operate while the permission signal is received (the operation is accepted), and may be not permitted to operate while the permission signal can not be received (the operation is not accepted).

The control device 40 sets the length for transmitting the permission signal to about five times the length for not transmitting the permission signal.

In addition, in FIG. 30, although processing of permission/non-permission of starting of the prime mover 4 (anti-theft processing) is linked with processing of permission/non-permission of operation of the setting display device (operation processing), the anti-theft processing may be performed separately from the operation processing. For example, the antitheft process may be performed after performing the operation process, or the operation process may be performed after performing the antitheft process.

The working machine 1 includes the input device to accept an input of the authentication information, the plurality of display devices 50 to display information relating to the working machine, and the control device 40 to permit the operation of the setting display device that is the display device 50 preliminarily set when the authentication of the authentication information inputted to the input device is established and not to permit the operation of the setting display device when the authentication is not established.

According to this, when the plurality of display devices 50 are provided, the display device set in the setting display device can be operated when the authentication is established, and can not be operated when the authentication is not established.

That is, even when a plurality of display devices are provided, it is possible to temporarily disable the operation of the setting display device which is a predetermined display device.

The working machine 1 includes a setting portion 155 that sets a display device to be a setting display device among the plurality of display devices 50. According to this, the setting portion 155 can set an arbitrary display device among the plurality of display devices 50 as a setting display device that requires authentication.

The setting portion 155 is provided in any of the plurality of display devices 50 and the control device 40. According to this, the configuration can be simplified as compared with the case of being provided in another device of the working machine 1.

The working machine 1 includes the prime mover 4, and the control device 40 permits the start of the prime mover 4 when the authentication of the authentication information is established, and disallows the start of the prime mover 4 when the authentication is not established. According to this, it is possible to coordinate the permission/non-permission of the operation of the setting display device with the permission/non-permission of the start of the prime mover 4.

The control device 40 outputs a permission signal for permitting the operation of the setting display device and a non-permission signal for disallowing the operation of the setting display device, and the plurality of display devices 50 stop accepting the external input when the permission signal and the non-permission signal cannot be obtained.

According to this, for example, when the permission signal/non-permission signal cannot be acquired due to a failure such as a disconnection or a communication failure, the plurality of display devices 50 stop the reception of the input, so it can be prevented from being carelessly operated at the time of failure.

The work implement 1 includes the operation tool 57 configured to perform the operations of the plurality of display devices 50. The setting display device operates based on the operation of the operation tool 57 when the operation is permitted. And, the working device 1 stops the operation even when the operation tool 57 is operated under the state where the operation is not permitted.

According to this, not only the plurality of display devices 50 can be operated by the operation tool 57, but also in the setting display device, the operation by the operation tool 57 can be performed after the establishment of the authentication.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A display device for a working machine, comprising:
a screen configured to display:
a plurality of candidate boxes representing respective plural sorts of candidate setting information to be set to the working machine, and
a contents display portion in which a setting item relating to the working machine is displayed; and
a display control portion to move a display box from a predetermined reference position on the screen to a position corresponding to a position of the contents display portion in performing the setting to the working machine, the display box being one of the plurality of candidate boxes in which candidate setting information corresponding to the setting is displayed,
wherein the contents display portion has a box selecting portion for selecting the display box from among the plurality of candidate boxes,
wherein the display control portion arranges the plurality of candidate boxes on a reference line set at the reference position in a case where the setting to the working machine is not performed,
and wherein the display control portion moves the display box from the reference line to a setting line set at the position corresponding to the position of the contents display portion in a case where the setting to the working machine is performed, the setting line being parallel to the reference line and the display box being selected by the box selecting portion.

2. The display device according to claim 1,
wherein in a case where the setting to the working machine is performed, the display control portion moves the display box in a direction intersecting with an arrangement direction in which the plurality of candidate boxes are arranged.

3. The display device according to claim 1,
wherein in a case where the setting to the working machine is performed under a state where the plurality of candidate boxes are arranged on the reference line set on the screen, the display control portion moves the display box in a direction orthogonal to the reference line.

4. The display device according to claim 1,
wherein the plurality of candidate boxes are boxes in which a shift position of the working machine is indicated as the candidate setting information,
wherein a plurality of the contents display portions are displayed on the screen, and a plurality of the setting items are displayed in the respective plurality of contents display portions,
wherein the plurality of setting items include an upper limit and lower limit of the shift position and the shift position at which a working device attached to the working machine is moved upward, and
wherein the display control portion moves, from the reference position to a position corresponding to a position of one of the plurality of contents display portions in which a specific one of the plurality of setting items is displayed, the display box in which candidate setting information corresponding to the specific one of the plurality of setting items is displayed.

5. The display device according to claim 1,
wherein the position corresponding to the position of the contents display portion is a position closer to the position of the contents display portion than the reference position is to the position of the contents display portion.

6. A display device for a working machine, comprising:
a plurality of candidate boxes in which candidate setting information to be set to the working machine is represented, the candidate boxes being displayed on a screen;
a contents display portion in which a setting item relating to the working machine is displayed; and
a display control portion to move a display box to a position corresponding to the contents display portion in performing the setting to the working machine, the display box being one of the plurality of candidate boxes in which candidate setting information corresponding to the setting is displayed,
wherein the display control portion arranges the plurality of candidate boxes on the screen in a case where the setting to the working machine is not performed,
wherein the display control portion moves the display box from an arrangement position of the candidate boxes to a position corresponding to the contents display portion in a case where the setting to the working machine is performed, wherein in a case where the setting to the working machine is performed under a state where the plurality of candidate boxes are arranged on a reference line set on the screen, the display control portion moves the display box in a direction orthogonal to the reference line, and wherein in a case where the setting to the working machine is performed under a state where a setting line is set, on the screen, at a position separating from the reference line and extending through the contents display portion, the display control portion moves the display box from the reference line to the setting line.

7. A display device for a working machine, comprising:

a plurality of candidate boxes in which candidate setting information to be set to the working machine is represented, the candidate boxes being displayed on a screen;

a contents display portion in which a setting item relating to the working machine is displayed; and a display control portion to move a display box to a position corresponding to the contents display portion in performing the setting to the working machine, the display box being one of the plurality of candidate boxes in which candidate setting information corresponding to the setting is displayed, wherein in a case where one of the plurality of candidate boxes different from the candidate box corresponding to the display box is selected under a state where the display box has moved to the position corresponding to the contents display portion, the display control portion returns the display box to an original position.

8. A display device for a working machine, comprising:

a screen configured to display:

a plurality of candidate boxes representing respective plural sorts of candidate setting information to be set to the working machine, and a contents display portion in which a setting item relating to the working machine is displayed; and a display control portion to display a setting bar in performing the setting to the working machine, the setting bar connecting, on the screen, a display box and a position corresponding to a position of the contents display portion to indicate that the setting to the working machine is performed, and the display box being one of the plurality of candidate boxes in which candidate setting information corresponding to the setting is displayed, wherein the contents display portion has a box selecting portion for selecting the display box from among the plurality of candidate boxes, and wherein the display control portion:

displays the setting bar extending from the display box selected by the box selecting portion toward a setting line set at the position corresponding to the position of the contents display portion, and in a case where one of the plurality of candidate boxes, different from the candidate box corresponding to the display box, is selected as another display box, displays another setting bar extending from the another display box toward the setting line and deletes the setting bar extending from the display box toward the setting line.

9. The display device according to claim 8, wherein the display control portion arranges the plurality of candidate boxes on a reference line set on the screen in a case where the setting to the working machine is not performed, and wherein the display control portion arranges the setting bar such that the setting bar extends in a direction orthogonal to the reference line in a case where the setting to the working machine is performed.

10. A working machine comprising the display device according to claim 1.

11. The working device according to claim 10, comprising:

a machine body having a traveling device; and a lifting device arranged on a rear portion of the machine body and configured to be coupled to a working device.

* * * * *